(12) United States Patent
Hayashita et al.

(10) Patent No.: US 10,006,394 B2
(45) Date of Patent: Jun. 26, 2018

(54) METHOD OF DETECTING ABNORMALITY OF AIR-FUEL RATIO SENSOR

(71) Applicant: TOYOTA JIDOSHA KABUSHIKI KAISHA, Toyota-shi, Aichi (JP)

(72) Inventors: Go Hayashita, Chigasaki (JP); Hidenori Moriya, Nagoya (JP); Koji Ide, Gotenba (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days. days.

(21) Appl. No.: 15/325,221

(22) PCT Filed: Jul. 21, 2015

(86) PCT No.: PCT/JP2015/003655
§ 371 (c)(1),
(2) Date: Jan. 10, 2017

(87) PCT Pub. No.: WO2016/013211
PCT Pub. Date: Jan. 28, 2016

(65) Prior Publication Data
US 2017/0191438 A1   Jul. 6, 2017

(30) Foreign Application Priority Data
Jul. 23, 2014 (JP) .................. 2014-149723

(51) Int. Cl.
*F01N 3/00* (2006.01)
*F02D 41/24* (2006.01)
(Continued)

(52) U.S. Cl.
CPC ......... *F02D 41/2454* (2013.01); *F01N 3/101* (2013.01); *F01N 11/00* (2013.01);
(Continued)

(58) Field of Classification Search
CPC ...... F01N 3/101; F01N 11/00; F02D 41/0295; F02D 41/1402; F02D 41/1441; F02D 41/1456; F02D 41/1495; F02D 41/2454
(Continued)

(56) References Cited

U.S. PATENT DOCUMENTS

| | | | |
|---|---|---|---|
| 4,739,614 A * | 4/1988 | Katsuno | F01N 11/007 123/688 |
| 2004/0182379 A1* | 9/2004 | Yamada | F02D 41/1456 123/688 |

(Continued)

FOREIGN PATENT DOCUMENTS

| | | |
|---|---|---|
| JP | 2006-125252 | 5/2006 |
| JP | 2015-71963 | 4/2015 |
| WO | WO 2014/118892 A1 | 8/2014 |

*Primary Examiner* — Jason Shanske
(74) *Attorney, Agent, or Firm* — Finnegan, Henderson, Farabow, Garrett & Dunner LLP

(57) ABSTRACT

Downstream side air-fuel ratio sensor signal based adaptive air-fuel ratio control. When the air-fuel ratio detected by the downstream side air-fuel ratio sensor is maintained lean unduly, a stuck learning control is performed to decrease a learning value to lower the air-fuel ratio. Adaptive learning value update control is performed based on the downstream side air-fuel ratio sensor signal to increase the learning value when an upstream air-fuel ratio deviates to the rich side and to decrease the learning value when the upstream air-fuel ratio deviates to the lean side. It is judged that the downstream side air-fuel ratio sensor is abnormal when a certain value or more of decrease of the learning value and a certain value or more of increase of the learning value are repeated.

7 Claims, 22 Drawing Sheets

(51) Int. Cl.
*F01N 3/10* (2006.01)
*F02D 41/02* (2006.01)
*F02D 41/14* (2006.01)
*F01N 11/00* (2006.01)

(52) U.S. Cl.
CPC ........ *F01N 11/007* (2013.01); *F02D 41/0295* (2013.01); *F02D 41/1402* (2013.01); *F02D 41/1441* (2013.01); *F02D 41/1456* (2013.01); *F02D 41/1495* (2013.01); *F01N 2550/00* (2013.01); *F01N 2550/02* (2013.01); *F01N 2900/1402* (2013.01); *F01N 2900/1624* (2013.01); *F02D 41/2441* (2013.01); *F02D 2041/1418* (2013.01); *F02D 2200/0814* (2013.01); *Y02T 10/22* (2013.01); *Y02T 10/47* (2013.01)

(58) Field of Classification Search
USPC .......................................................... 60/274
See application file for complete search history.

(56) References Cited

U.S. PATENT DOCUMENTS

2016/0061084 A1  3/2016  Okazaki et al.
2016/0245145 A1  8/2016  Okazaki et al.

\* cited by examiner

METHOD OF DETECTING ABNORMALITY OF AIR-FUEL RATIO SENSOR

CROSS-REFERENCE TO RELATED APPLICATIONS

This application is a national phase application of International Application No. PCT/JP2015/003655, filed Jul. 21, 2015, and claims the priority of Japanese Application No. 2014-149723, filed Jul. 23, 2014, the content of both of which is incorporated herein by reference.

TECHNICAL FIELD

The present invention relates to a method of detecting an abnormality of an air-fuel ratio sensor.

BACKGROUND ART

Known in the past has been an air-fuel ratio control system of an internal combustion engine, in which an exhaust purification catalyst is arranged inside an exhaust passage of the engine, an upstream side air-fuel ratio sensor is arranged upstream of the exhaust purification catalyst inside the engine exhaust passage, a downstream side oxygen sensor is arranged downstream of the exhaust purification catalyst inside the engine exhaust passage, and the amount of feed of fuel to the engine is feedback controlled, based on the output signals of the upstream side air-fuel ratio sensor and the downstream side oxygen sensor, so that the air-fuel ratio of the exhaust gas flowing into the exhaust purification catalyst becomes the target air-fuel ratio, for example, the stoichiometric air-fuel ratio (for example, see PTL 1). In this air-fuel ratio control system, the basic fuel injection amount which is required for making the air-fuel ratio the stoichiometric air-fuel ratio is stored in advance. For example, this basic fuel injection amount is multiplied with a feedback correction coefficient to calculate the actual injection amount.

In this case, this feedback correction coefficient is controlled based on the output of the upstream side air-fuel ratio sensor so that the air-fuel ratio of the exhaust gas flowing into the exhaust purification catalyst becomes the stoichiometric air-fuel ratio. On the other hand, sometimes, even if performing such feedback control, the air-fuel ratio of the exhaust gas flowing into the exhaust purification catalyst deviates from the stoichiometric air-fuel ratio. In this case, in order to correct the deviation in the air-fuel ratio from the stoichiometric air-fuel ratio, a correction value of the feedback correction coefficient which is required for making the air-fuel ratio of the exhaust gas flowing into the exhaust purification catalyst the stoichiometric air-fuel ratio is obtained, as a learning value, based on an output signal of the downstream side oxygen sensor. This learning value is used to correct the feedback correction coefficient.

In the meantime, in this air-fuel ratio control system, when the downstream side oxygen sensor is normal, the air-fuel ratio detected by the downstream side oxygen sensor does not continue to deviate to the rich side. Therefore, when the air-fuel ratio detected by the downstream side oxygen sensor continues to deviate to the rich side, it is judged that the downstream side oxygen sensor is abnormal. Similarly, in this air-fuel ratio control system, when the downstream side oxygen sensor is normal, the air-fuel ratio which is detected by the downstream side oxygen sensor does not continue to deviate to the lean side. Therefore, when the air-fuel ratio detected by the downstream side oxygen sensor continues to deviate to the lean side, it is judged that the downstream side oxygen sensor is abnormal.

CITATION LIST

Patent Literature

PTL 1: Japanese Patent Publication No. 2006-125252A

SUMMARY OF INVENTION

Technical Problem

However, in fact, sometimes even if the downstream side oxygen sensor is normal, the air-fuel ratio detected by the downstream side oxygen sensor continues to deviate to the lean side or rich side. For example, the air-fuel ratio varies among the cylinders. Sometimes the air-fuel ratios of specific cylinders will greatly deviate to the rich side from other cylinders, and the shape of the exhaust passage, etc., will cause the upstream side air-fuel ratio sensor not to uniformly contact exhaust gas flowing out from the cylinders but to mainly contact the exhaust gas which flows out from the cylinders deviated to the rich side. In such a case, if the air-fuel ratio is feedback controlled to the stoichiometric air-fuel ratio, based on the output signal of the upstream side air-fuel ratio sensor, the fuel injection amount to each cylinder is decreased and thus the average air-fuel ratio becomes lean. In this case, even if the downstream side oxygen sensor is normal, the air-fuel ratio detected by the downstream side oxygen sensor continues to deviate to the lean side. Similarly, even if the downstream side oxygen sensor is normal, sometimes the air-fuel ratio detected by the downstream side oxygen sensor continues to deviate to the rich side. Therefore, even if the air-fuel ratio detected by the downstream side oxygen sensor continues to deviate to the lean side or rich side, it cannot be judged that the downstream side oxygen sensor is abnormal.

The present invention provides a method of detecting an abnormality of an air-fuel ratio sensor which can reliably detect an abnormality in the downstream side air-fuel ratio sensor.

Solution to Problem

According to the present invention, there is provided a method of detecting an abnormality of an internal combustion engine, comprising: alternately switching a target air-fuel ratio of exhaust gas flowing into an exhaust purification catalyst which has an oxygen storage ability, between a rich set air-fuel ratio, which is richer than a stoichiometric air-fuel ratio, and a lean set air-fuel ratio, which is leaner than the stoichiometric air-fuel ratio; detecting the air-fuel ratio of the exhaust gas flowing out from the exhaust purification catalyst by a downstream side air-fuel ratio sensor which is arranged at a downstream side of the exhaust purification catalyst; learning an air-fuel ratio correction value which is required for making the air-fuel ratio of the exhaust gas flowing into the exhaust purification catalyst approach the target air-fuel ratio based on the air-fuel ratio which was detected by the downstream side air-fuel ratio sensor; controlling the air-fuel ratio of the exhaust gas flowing into the exhaust purification catalyst to the target air-fuel ratio by feedback control by using the learning value of the air-fuel ratio correction value which was obtained by learning; when the target air-fuel ratio is set to the rich set air-fuel ratio, if the air-fuel ratio detected by the downstream side air-fuel ratio sensor is maintained lean for a predetermined time period, performing stuck leaning control for lowering the learning value so as to make the air-fuel ratio of the exhaust gas flowing into the exhaust purification catalyst smaller; performing leaning value update control for making the learning value increase when it is judged that the air-fuel ratio of the exhaust gas flowing into the exhaust purification catalyst deviates from the target air-fuel ratio to the rich side, and making the learning value decrease when it is judged that the air-fuel ratio of the exhaust gas flowing into the exhaust purification catalyst deviates from the target air-fuel ratio to the lean side as learning value update control, based on the air-fuel ratio which was detected by the downstream side air-fuel ratio sensor; and judging the downstream side air-fuel ratio sensor is abnormal when a certain value or more of decrease of the learning value and a certain value or more of increase of the learning value are repeated.

Advantageous Effects of Invention

According to the present invention, when a downstream side air-fuel ratio sensor has an abnormality, the abnormality can be reliably detected.

DESCRIPTION OF EMBODIMENTS

Figure 1:
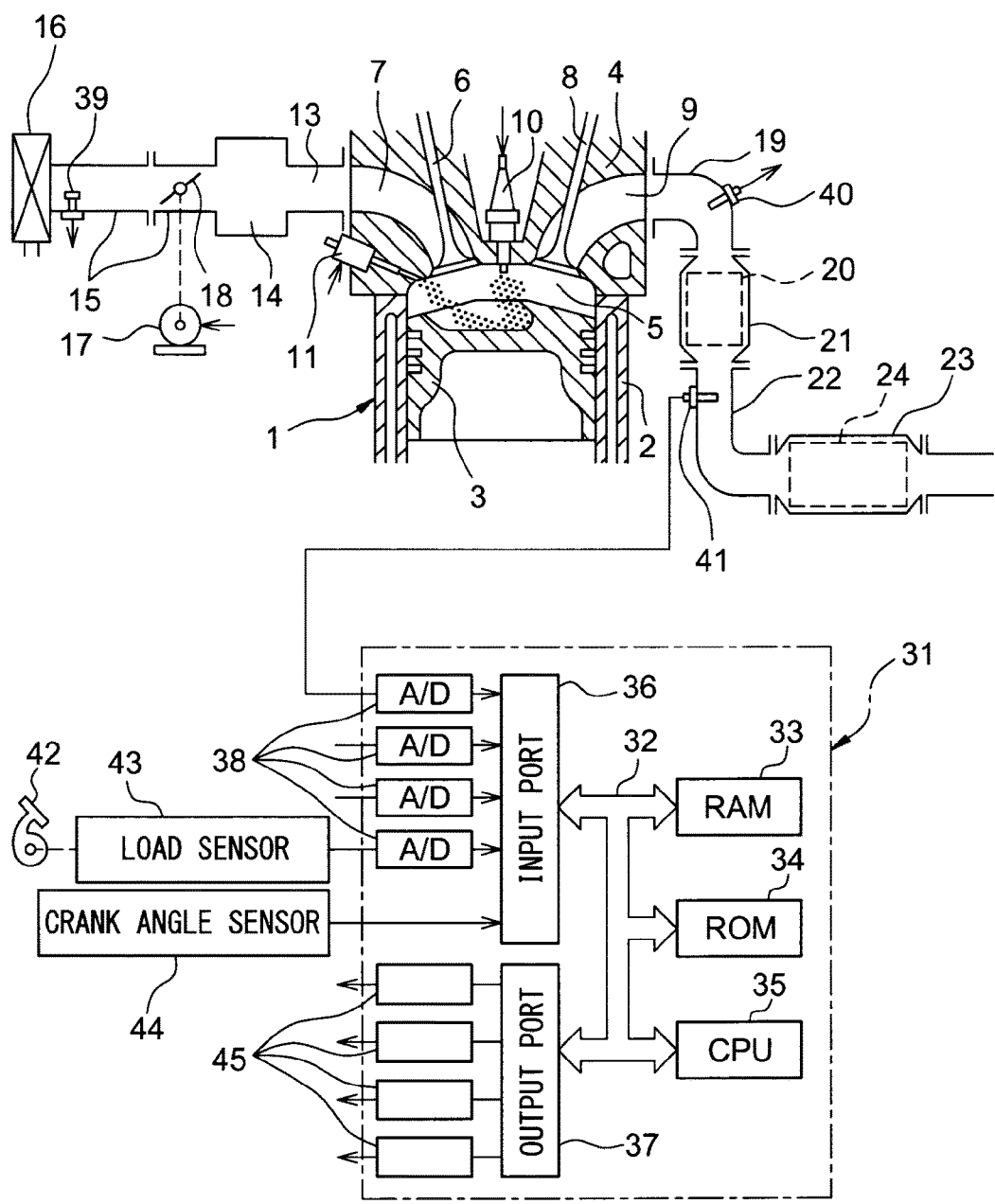
FIG. 1 is a view which schematically shows an internal combustion engine in which a control device of the present invention is used.

Below, referring to the drawings, embodiments of the present invention will be explained in detail. Note that, in the following explanation, similar component elements are assigned the same reference numerals.

<Explanation of Internal Combustion Engine as a Whole>

FIG. 1 is a view which schematically shows an internal combustion engine which performs an abnormality detection method of an air-fuel ratio according to the present invention. Referring to FIG. 1, 1 indicates an engine body, 2 a cylinder block, 3 a piston which reciprocates inside the cylinder block 2, 4 a cylinder head which is secured to the cylinder block 2, 5 a combustion chamber which is formed between the piston 3 and the cylinder head 4, 6 an intake valve, 7 an intake port, 8 an exhaust valve, and 9 an exhaust port.

As shown in FIG. 1, a spark plug 10 is arranged at a center part of an inside wall surface of the cylinder head 4, while a fuel injector 11 is arranged at a side part of the inner wall surface of the cylinder head 4. The fuel injector 11 injects fuel into the combustion chamber 5. Note that, in the embodiment of the present invention, as the fuel, gasoline with a stoichiometric air-fuel ratio of 14.6 is used. However, fuel other than gasoline, or mixed fuel with gasoline can be used.

The intake port 7 of each cylinder is connected to a surge tank 14 through a corresponding intake runner 13, while the surge tank 14 is connected to an air cleaner 16 through an intake pipe 15. Further, inside the intake pipe 15, a throttle valve 18 which is driven by an actuator 17 is arranged. On the other hand, the exhaust port 9 of each cylinder is connected to an exhaust manifold 19, and a header of the exhaust manifold 19 is connected to an upstream side casing 21 which houses an upstream side exhaust purification catalyst 20. The upstream side casing 21 is connected through an exhaust pipe 22 to a downstream side casing 23 which houses a downstream side exhaust purification catalyst 24. The exhaust port 9, exhaust manifold 19, upstream side casing 21, exhaust pipe 22, and downstream side casing 23 form an exhaust passage.

The electronic control unit (ECU) 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an intake air flow detecting device 39 is arranged for detecting the flow rate of air which flows through the intake pipe 15. The output of this intake air flow detecting device 39 is input through a corresponding AD converter 38 to the input port 36. Further, at the header of the exhaust manifold 19, an upstream side air-fuel ratio sensor 40 is arranged for detecting the air-fuel ratio of the exhaust gas which flows through the inside of the exhaust manifold 19. Further, in the exhaust pipe 22, a downstream side air-fuel ratio sensor 41 is arranged for detecting the air-fuel ratio of the exhaust gas which flows through the inside of the exhaust pipe 22. The outputs of these air-fuel ratio sensors 40 and 41 are also input through the corresponding AD converters 38 to the input port 36.

An accelerator pedal 42 has a load sensor 43 connected to it which generates an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17.

<Explanation of Exhaust Purification Catalyst>

The upstream side exhaust purification catalyst 20 and the downstream side exhaust purification catalyst 24 are formed from three-way catalysts which comprises a carrier made of ceramic on which a precious metal (for example, platinum Pt) and a substance which has an oxygen storage ability (for example, ceria $CeO_2$) are carried. A three-way catalyst has the function of simultaneously purifying unburned HC, CO and $NO_X$ when the air-fuel ratio of the exhaust gas flowing into the three-way catalyst is maintained at the stoichiometric air-fuel ratio, but when the exhaust purification catalysts 20 and 24 have an oxygen storage ability, the unburned HC and CO and $NO_X$ are simultaneously purified even if the air-fuel ratio of the exhaust gas flowing into the exhaust purification catalysts 20 and 24 somewhat deviates from the stoichiometric air-fuel ratio to the rich side or lean side.

That is, if the exhaust purification catalysts 20 and 24 have an oxygen storage ability, when the air-fuel ratio of the exhaust gas flowing into the exhaust purification catalysts 20, 24 becomes somewhat lean, the excess oxygen contained in the exhaust gas is stored in the exhaust purification catalysts 20, 24 and thus the surfaces of the exhaust purification catalysts 20 and 24 are maintained at the stoichiometric air-fuel ratio. As a result, on the surfaces of the exhaust purification catalysts 20 and 24, the unburned HC, CO and $NO_X$ are simultaneously purified. At this time, the air-fuel ratio of the exhaust gas flowing out from the exhaust purification catalysts 20 and 24 becomes the stoichiometric air-fuel ratio. On the other hand, when the air-fuel ratio of the exhaust gas flowing into the exhaust purification catalysts 20, 24 becomes somewhat rich, the oxygen, which is insufficient for reducing the unburned HC and CO which are contained in the exhaust gas, is released from the exhaust purification catalysts 20 and 24. In this case as well, the surfaces of the exhaust purification catalysts 20 and 24 are maintained at the stoichiometric air-fuel ratio. As a result, at the surfaces of the exhaust purification catalysts 20 and 24, unburned HC, CO and $NO_X$ are simultaneously purified. At this time, the air-fuel ratio of the exhaust gas flowing out from the exhaust purification catalysts 20 and 24 becomes the stoichiometric air-fuel ratio.

In this way, when excess oxygen can be stored in the exhaust purification catalysts 20 and 24 or when deficient oxygen can be released from the exhaust purification catalysts 20 and 24, even if the air-fuel ratio of the exhaust gas flowing into the exhaust purification catalysts 20 and 24 deviates somewhat from the stoichiometric air-fuel ratio to the rich side or lean side, the unburned HC, CO and $NO_X$ are simultaneously purified and the air-fuel ratio of the exhaust gas flowing out from the exhaust purification catalysts 20 and 24 becomes the stoichiometric air-fuel ratio. In this case, if the excess oxygen can no longer be stored in the exhaust purification catalysts 20 and 24 or the deficient oxygen can no longer be released from the exhaust purification catalysts 20 and 24, the air-fuel ratio of the exhaust gas flowing out from the exhaust purification catalysts 20 and 24 will become lean or rich and $NO_X$ or HC and CO will flow out from the exhaust purification catalysts 20 and 24. This will be explained with reference to FIGS. 2A and 2B.

Figure 2A:
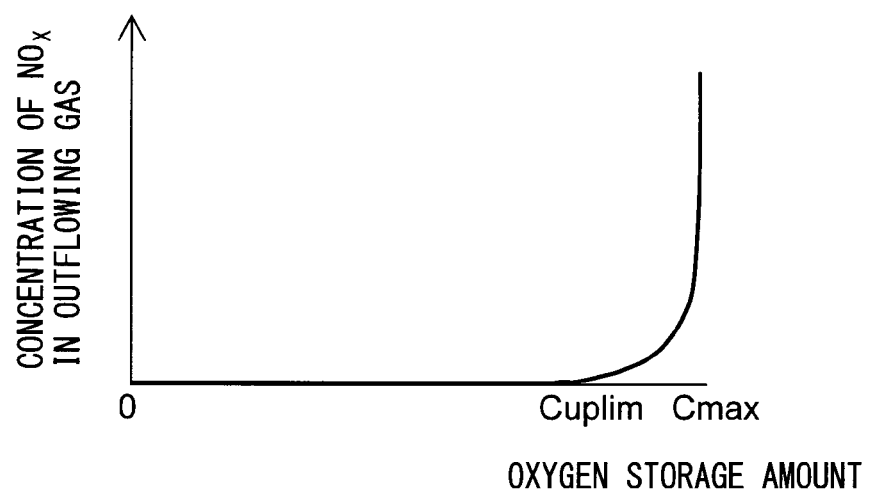
FIG. 2A is a view which shows the relationship between the oxygen storage amount of the exhaust purification catalyst and concentration of $NO_X$ in the exhaust gas which flows out from the exhaust purification catalyst.
Figure 2B:
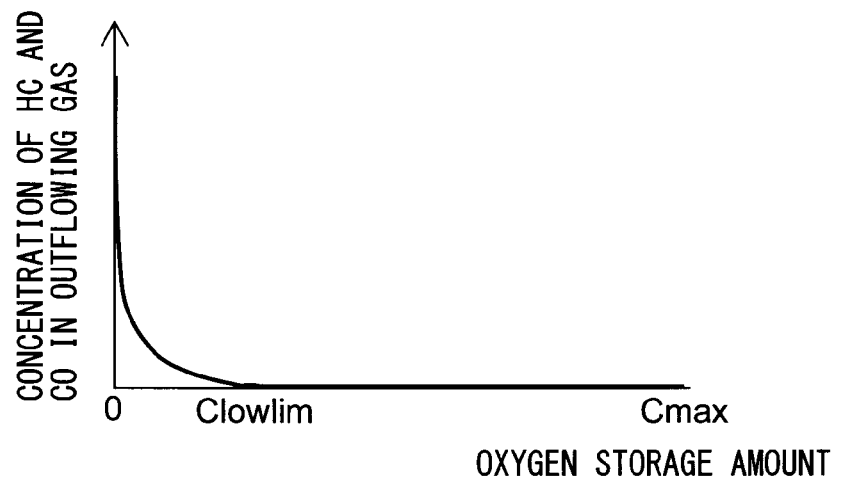
FIG. 2B is a view which shows the relationship between the oxygen storage amount of the exhaust purification catalyst and concentration of HC and CO in the exhaust gas which flows out from the exhaust purification catalyst.

FIG. 2A shows the relationship between the oxygen storage amount of the exhaust purification catalyst and the $NO_X$ concentration in the exhaust gas flowing out from the exhaust purification catalyst, while FIG. 2B shows the relationship between the oxygen storage amount of the exhaust purification catalyst and the HC and CO concentrations in the exhaust gas flowing out from the exhaust purification catalyst. When the air-fuel ratio of the exhaust gas flowing out from the exhaust purification catalysts 20 and 24 is lean, if the oxygen storage amount in the exhaust purification catalysts 20 and 24 becomes greater, the excess oxygen contained in the exhaust gas can no longer be stored in the exhaust purification catalysts 20 and 24 and, as a result, the surfaces of the exhaust purification catalysts 20 and 24 go into an oxygen excess state. If going into the oxygen excess state in this way, the HC and CO are oxidized, but the $NO_X$ is no longer reduced. Therefore, as shown in FIG. 2A, if the oxygen storage amount exceeds a certain stored amount (Cuplim in figure) near the maximum storable oxygen amount Cmax, the concentration of $NO_X$ in the exhaust gas flowing out from the exhaust purification catalysts 20 and 24 rapidly rises.

On the other hand, when the air-fuel ratio of the exhaust gas flowing into the exhaust purification catalysts 20 and 24 is rich, if the oxygen storage amount in the exhaust purification catalyst 20 and 24 becomes smaller, the oxygen stored in the exhaust purification catalysts 20 and 24 can no longer be sufficiently released. As a result, the surfaces of the exhaust purification catalysts 20 and 24 go into a state of excess of HC and CO. If going into a state of excess of HC and CO in this way, the $NO_X$ is reduced, but the HC and CO are no longer oxidized. Therefore, as shown in FIG. 2B, if the oxygen storage amount becomes smaller than a certain storage amount near zero (Clowlim in the figure), the concentrations of HC and CO in the exhaust gas flowing out from the exhaust purification catalysts 20 and 24 rapidly rise.

That is, if the oxygen storage amount is maintained between the Clowlim of FIG. 2B and the Cuplim of FIG. 2A, even if the air-fuel ratio of the exhaust gas flowing into the exhaust purification catalysts 20 and 24 deviates somewhat from the stoichiometric air-fuel ratio to the rich side or lean side, the unburned HC, CO and $NO_X$ are simultaneously purified.

<Output Characteristic of Air-Fuel Ratio Sensor>

Figure 3:
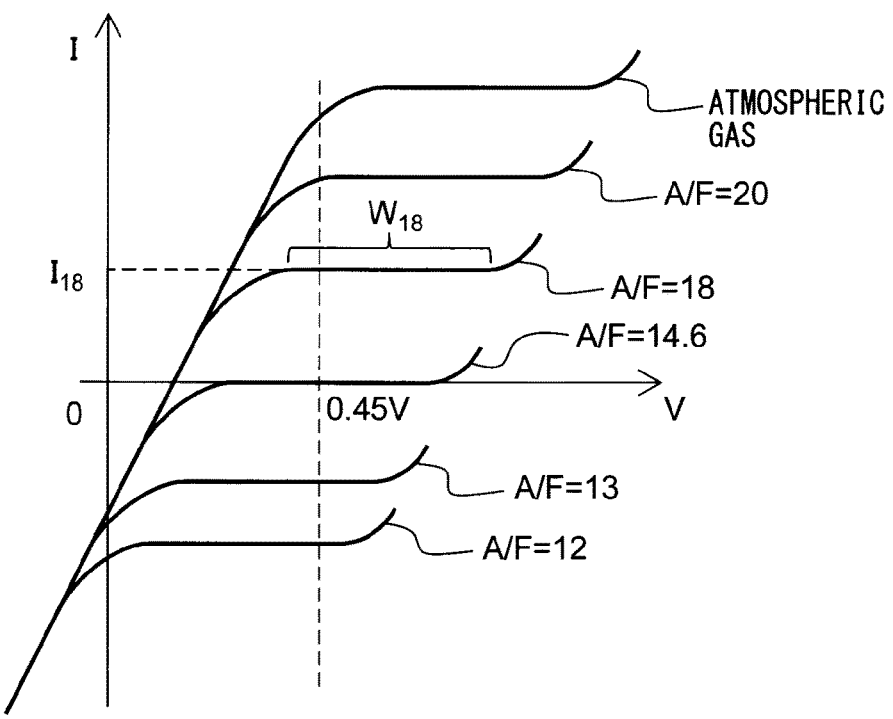
FIG. 3 is a view which shows the relationship between the voltage supplied to the sensor and output current at different exhaust air-fuel ratios.
Figure 4:
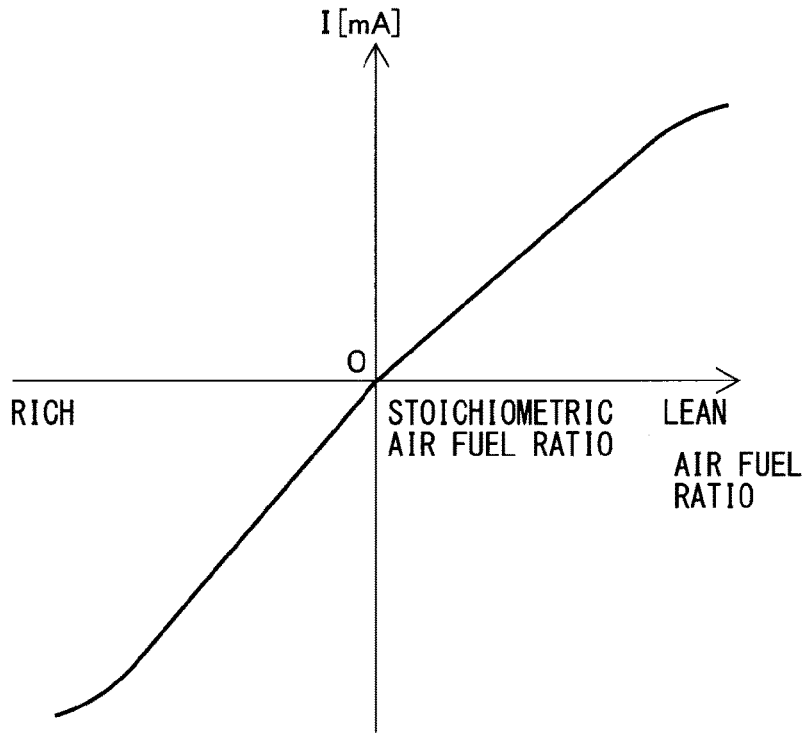
FIG. 4 is a view which shows the relationship between the exhaust air-fuel ratio and output current when making the voltage supplied to the sensor constant.

Next, referring to FIGS. 3 and 4, the output characteristic of air-fuel ratio sensors 40 and 41 used in the present invention will be explained. FIG. 3 is a view showing the voltage-current (V-I) characteristic of the air-fuel ratio sensors 40 and 41. FIG. 4 is a view showing the relationship between air-fuel ratio of the exhaust gas (below, referred to as "exhaust air-fuel ratio") flowing around the air-fuel ratio sensors 40 and 41 and output current I, when making the applied voltage constant. Note that, in the embodiment of the present invention, the air-fuel ratio sensor having the same configurations is used as both air-fuel ratio sensors 40 and 41.

As will be understood from FIG. 3, in the air-fuel ratio sensors 40 and 41 used in the present invention, the output current I becomes larger the higher, i.e., the leaner, the exhaust air-fuel ratio. Further, the line V-I of each exhaust air-fuel ratio has a region substantially parallel to the V axis, that is, a region where the output current does not change much at all even if the applied voltage of the sensor changes. This voltage region is referred to as the "limit current region". The current at this time is referred to as the "limit current". In FIG. 3, the limit current region and limit current when the exhaust air-fuel ratio is 18 are shown by $W_{18}$ and $I_{18}$, respectively. Therefore, the air-fuel ratio sensors 40 and 41 are referred to as "limit current type air-fuel ratio sensors".

FIG. 4 is a view which shows the relationship between the exhaust air-fuel ratio and the output current I when the applied voltage is constant at about 0.45V. As will be understood from FIG. 4, in the air-fuel ratio sensors 40 and 41 used in the present invention, the higher, i.e., the liner the exhaust air-fuel ratio, the greater the output current I of the air-fuel ratio sensors 40 and 41. That is, the output current I of the air-fuel ratio sensors 40 and 41 varies linearly with respect to the exhaust air-fuel ratio. In addition, the air-fuel ratio sensors 40 and 41 are configured so that the output current I becomes zero when the exhaust air-fuel ratio is the stoichiometric air-fuel ratio. Note that, when the exhaust air-fuel ratio becomes a certain value or more or when it becomes a certain value or less, the ratio of change of the output current to the change of the exhaust air-fuel ratio becomes smaller.

Note that, in the above example, as the air-fuel ratio sensors 40 and 41, limit current type air-fuel ratio sensors are used. However, as the air-fuel ratio sensors 40 and 41, it is also possible to use air-fuel ratio sensor not a limit current type or any other air-fuel ratio sensor, as long as the output current varies linearly with respect to the exhaust air-fuel ratio. Further, the air-fuel ratio sensors 40 and 41 may have structures different from each other.

<Basic Air-Fuel Ratio Control>

Next, the basic air-fuel ratio control used in the embodiment of the present invention will be summarized. In the air-fuel ratio control used in the present embodiment of the present invention, feedback control is performed based on the output air-fuel ratio of the upstream side air-fuel ratio sensor 40 to control the fuel injection amount from the fuel injector 11 so that the output air-fuel ratio of the upstream side air-fuel ratio sensor 40 becomes the target air-fuel ratio.

Note that, the "output air-fuel ratio" means the air-fuel ratio which corresponds to the output value of the air-fuel ratio sensor.

Further, in the air-fuel ratio control of the embodiment of the present invention, target air-fuel ratio setting control is performed to set the target air-fuel ratio based on the output air-fuel ratio of the downstream side air-fuel ratio sensor 41, etc. In target air-fuel ratio setting control, when the output air-fuel ratio of the downstream side air-fuel ratio sensor 41 becomes a rich air-fuel ratio the target air-fuel ratio is set to a lean set air-fuel ratio, and then is maintained to the lean set air-fuel ratio. This "lean set air-fuel ratio" is a predetermined air-fuel ratio which is leaner than the stoichiometric air-fuel ratio (air-fuel ratio serving as center of control) by a certain extent, and, for example, is 14.65 to 20, preferably 14.65 to 18, more preferably 14.65 to 16 or so. Further, the lean set air-fuel ratio can be expressed as an air-fuel ratio acquired by adding a lean adjustment amount to an air-fuel ratio serving as a control center (in the embodiment of the present invention, the stoichiometric air-fuel ratio). Note that, in the embodiment of the present invention, when the output air-fuel ratio of the downstream side air-fuel ratio sensor 41 becomes a rich judged air-fuel ratio (for example, 14.55), which is slightly richer than the stoichiometric air-fuel ratio, or less, it is judged that the output air-fuel ratio of the downstream side air-fuel ratio sensor 41 has become the rich air-fuel ratio.

If the target air-fuel ratio is set to the lean set air-fuel ratio, the oxygen excess/deficiency of the exhaust gas which flows into the upstream side exhaust purification catalyst 20 is cumulatively added. The "oxygen excess/deficiency" means the oxygen which becomes excessive or the oxygen which becomes deficient when trying to make the air-fuel ratio of the exhaust gas which flows into the upstream side exhaust purification catalyst 20 the stoichiometric air-fuel ratio. In particular, when the target air-fuel ratio is the lean set air-fuel ratio, the exhaust gas which flows into the upstream side exhaust purification catalyst 20 becomes excessive in oxygen. This excess oxygen is stored in the upstream side exhaust purification catalyst 20. Therefore, the cumulative value of the oxygen excess/deficiency (below, also referred to as the "cumulative oxygen excess/deficiency") can be said to express the oxygen storage amount OSA of the upstream side exhaust purification catalyst 20.

Note that, the oxygen excess/deficiency is calculated based on the output air-fuel ratio of the upstream side air-fuel ratio sensor 40, and the estimated value of the intake air amount to the inside of the combustion chamber 5 which is calculated based on the output of the intake air flow detecting device 39, etc. or the fuel feed amount of the fuel injector 11, etc. Specifically, the oxygen excess/deficiency OED is, for example, calculated by the following formula (1):

$$ODE = 0.23 \cdot Qi \cdot (AFup\ 14.6) \quad (1)$$

where 0.23 indicates the concentration of oxygen in the air, Qi indicates the amount of fuel injection, AFup indicates the output air-fuel ratio of the upstream side air-fuel ratio sensor 40, and AFR indicates an air-fuel ratio serving as control center (in the embodiment of the present invention, stoichiometric air-fuel ratio).

If the cumulative oxygen excess/deficiency acquired by cumulatively adding the thus calculated oxygen excess/deficiency becomes the predetermined switching reference value or more, i.e., in the embodiment of the present invention it becomes the predetermined switching reference amount Cref or more, the target air-fuel ratio which had up to then been the lean set air-fuel ratio is switched to the rich set air-fuel ratio, and then is maintained at this rich set air-fuel ratio. The rich set air-fuel ratio is a predetermined air-fuel ratio which is a certain degree richer than the stoichiometric air-fuel ratio (the air-fuel ratio serving as control center), and is for example 12 to 14.58, preferably 13 to 14.57, more preferably 14 to 14.55 or so. Further, the rich set air-fuel ratio can be expressed as an air-fuel ratio acquired by subtracting a rich adjustment amount from an air-fuel ratio serving as a control center (in the embodiment of the present invention, the stoichiometric air-fuel ratio). Note that, in the embodiment of the present invention, the difference between the rich set air-fuel ratio and the stoichiometric air-fuel ratio (rich degree) is the difference between the lean set air-fuel ratio and the stoichiometric air-fuel ratio (lean degree), or less.

After this, when the output air-fuel ratio of the downstream side air-fuel ratio sensor 41 again becomes the rich judged air-fuel ratio or less, the target air-fuel ratio is again switched to the lean set air-fuel ratio. Then, a similar operation is repeated. In this way, in the embodiment of the present invention, the target air-fuel ratio of the exhaust gas flowing into the upstream side exhaust purification catalyst 20 is alternately set to the lean set air-fuel ratio and the rich set air-fuel ratio.

However, even if performing the control stated above, the actual oxygen storage amount of the upstream side exhaust purification catalyst 20 may reach the maximum storable oxygen amount before the cumulative oxygen excess/deficiency reaches the switching reference value. As a reason for it, the reduction of the maximum storable oxygen amount of the upstream side exhaust purification catalyst 20 or temporal rapid changes in the air-fuel ratio of the exhaust gas flowing into the upstream side exhaust purification catalyst 20 can be considered. If the oxygen storage amount reaches the maximum storable oxygen amount as such, the exhaust gas of lean air-fuel ratio flows out from the upstream side exhaust purification catalyst 20. Therefore, in the embodiment of the present invention, when the output air-fuel ratio of the downstream side air-fuel ratio sensor 41 becomes a lean air-fuel ratio, the target air-fuel ratio is switched to the rich set air-fuel ratio. In particular, in the embodiment of the present invention, when the output air-fuel ratio of the downstream side air-fuel ratio sensor 41 becomes a lean judgment air-fuel ratio (for example, 14.65) which is slightly leaner than the stoichiometric air-fuel ratio, it is judged that the output air-fuel ratio of the downstream side air-fuel sensor 41 becomes a lean air-fuel ratio.

<Explanation of Air Fuel Ratio Control Using Time Chart>

Figure 5:
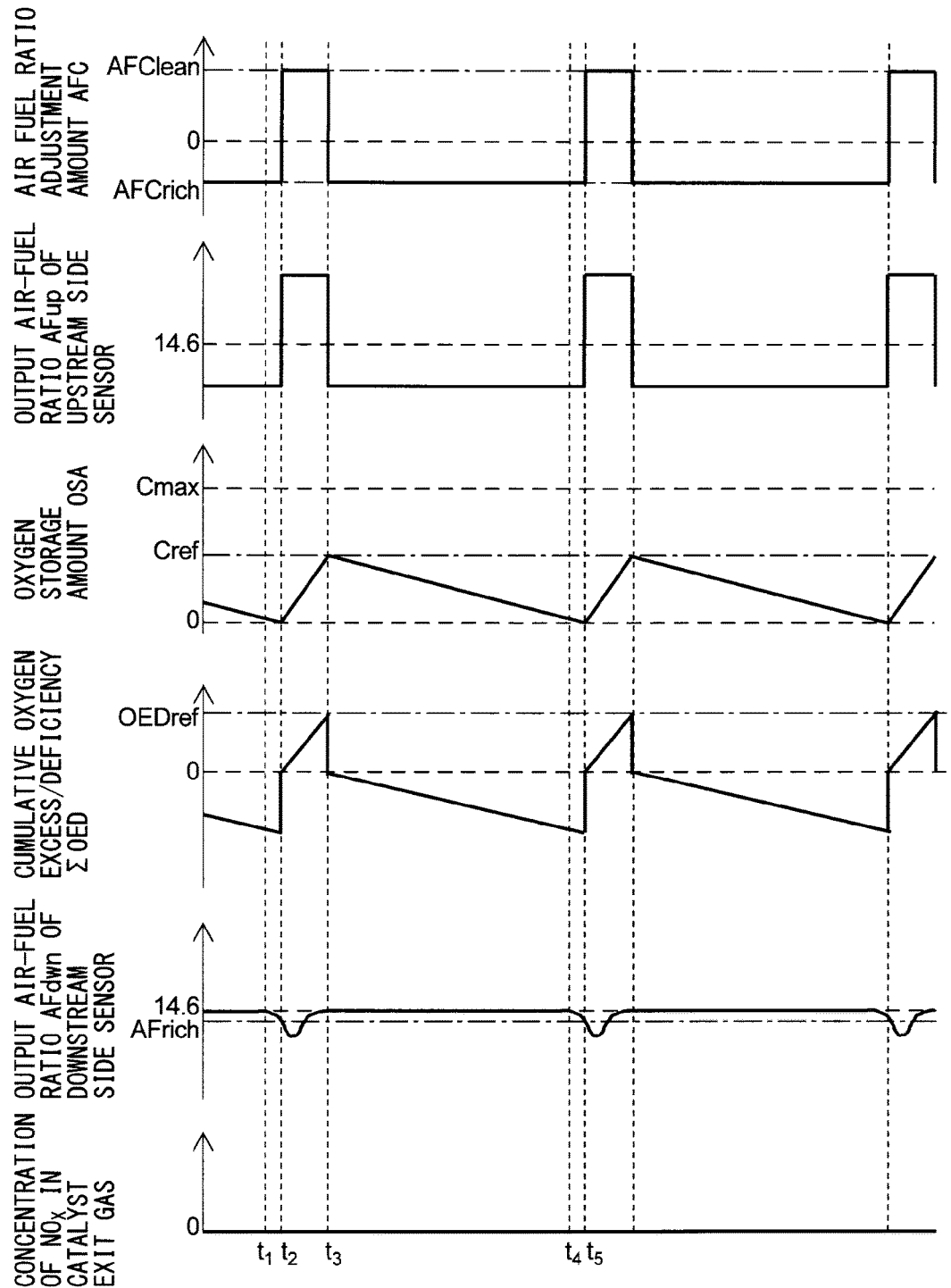
FIG. 5 is a time chart of air-fuel ratio adjustment amount, etc., when performing air-fuel ratio control.

Referring to FIG. 5, the operation explained as above will be explained in detail. FIG. 5 is a time chart of the air-fuel ratio adjustment amount AFC, the output air-fuel ratio AFup of the upstream side air-fuel ratio sensor 40, the actual oxygen storage amount OSA of the upstream side exhaust purification catalyst 20, the cumulative oxygen excess/deficiency ΣOED, the output air-fuel ratio AFdwn of the downstream side air-fuel ratio sensor 41, and the concentration of $NO_X$ in the exhaust gas flowing out from the upstream side exhaust purification catalyst 20, when performing the air-fuel ratio control of the embodiment of the present invention.

Note that the air-fuel ratio adjustment amount AFC is an adjustment amount relating to the target air-fuel ratio of the exhaust gas flowing into the upstream side exhaust purification catalyst 20. When the air-fuel ratio adjustment amount AFC is 0, the target air-fuel ratio is set to an air-fuel ratio which is equal to the air-fuel ratio serving as the control center (below, referred to as the "control center air-fuel ratio") (in the embodiment of the present invention, the stoichiometric air-fuel ratio). When the air-fuel ratio adjustment amount AFC is a positive value, the target air-fuel ratio becomes an air-fuel ratio leaner than the control center air-fuel ratio (in the present embodiment, the lean air-fuel ratio), while when the air-fuel ratio adjustment amount AFC is a negative value, the target air-fuel ratio becomes an air-fuel ratio richer than the control center air-fuel ratio (in the embodiment of the present invention, rich air-fuel ratio). Further, the "control center air-fuel ratio" means the air-fuel ratio to which of the air-fuel ratio adjustment amount AFC is added in accordance with the engine operating state, that is, the air-fuel ratio which is the reference when changing the target air-fuel ratio in accordance with the air-fuel ratio adjustment amount AFC.

In the example shown in FIG. 5, in the state before the time $t_1$, the air-fuel ratio adjustment amount AFC is set to the rich set adjustment amount AFCrich (corresponding to rich set air-fuel ratio). That is, the target air-fuel ratio is set to the rich set air-fuel ratio, and accordingly, the output air-fuel ratio of the upstream side air-fuel ratio sensor 40 becomes the rich air-fuel ratio. At this time, in order to reduce HC and CO, which is contained in the exhaust gas flowing into the upstream side exhaust purification catalyst 20, oxygen stored in the upstream side exhaust purification catalyst 20 is consumed. Along with this, the oxygen storage amount OSA of the upstream side exhaust purification catalyst 20 gradually decreases. In addition, the cumulative oxygen excess/deficiency ΣOED also gradually decreases. At this time, since the air-fuel ratio of the exhaust gas flowing out from the upstream side exhaust purification catalyst 20 is the stoichiometric air-fuel ratio, the output air-fuel ratio AFdwn of the downstream side air-fuel ratio sensor 41 is substantially the stoichiometric air-fuel ratio, and thus the NOx discharging amount from the upstream side exhaust purification catalyst 20 is substantially zero.

If the oxygen storage amount OSA of the upstream side exhaust purification catalyst 20 gradually decreases, the oxygen storage amount OSA approaches zero. Along with this, part of HC, CO which flow into the upstream side exhaust purification catalyst 20 starts to flow out without being purified by the upstream side exhaust purification catalyst 20. Due to this, after the time $t_1$, the output air-fuel ratio AFdwn of the downstream side air-fuel ratio sensor 41 gradually falls. As a result, at the time $t_2$, the output air-fuel ratio AFdwn of the downstream side air-fuel ratio sensor 41 reaches the rich judged air-fuel ratio AFrich.

In the embodiment of the present invention, if the output air-fuel ratio AFdwn of the downstream side air-fuel ratio sensor 41 becomes the rich judged air-fuel ratio AFrich or less, in order to make the oxygen storage amount OSA increase, the air-fuel ratio adjustment amount AFC is switched to the lean set adjustment amount AFClean (corresponding to lean set air-fuel ratio). Therefore, the target air-fuel ratio is switched from the rich set air-fuel ratio to the lean set air-fuel ratio. At this time, the cumulative oxygen excess/deficiency ΣOED is reset to zero.

Note that, in the embodiment of the present invention, the air-fuel ratio adjustment amount AFC is switched when the output air-fuel ratio AFdwn of the downstream side air-fuel ratio sensor 41 falls and thus reaches the rich judged air-fuel ratio AFrich. This is because even if the oxygen storage amount OSA of the upstream side exhaust purification catalyst 20 is sufficient, sometimes the air-fuel ratio of the exhaust gas flowing out from the upstream side exhaust purification catalyst 20 deviates very slightly from the stoichiometric air-fuel ratio. Conversely speaking, the rich judged air-fuel ratio is set to an air-fuel ratio which the air-fuel ratio of the exhaust gas flowing out from the upstream side exhaust purification catalyst 20 never reaches when the oxygen storage amount of the upstream side exhaust purification catalyst 20 is sufficient.

If switching the target air-fuel ratio to the lean air-fuel ratio at the time $t_2$, the air-fuel ratio of the exhaust gas flowing into the upstream side exhaust purification catalyst 20 changes from the rich air-fuel ratio to the lean air-fuel ratio. Further, along with this, the output air-fuel ratio AFup of the upstream side air-fuel ratio sensor 40 becomes the lean air-fuel ratio (in actuality, a delay occurs from when switching the target air-fuel ratio to when the air-fuel ratio of the exhaust gas flowing into the upstream side exhaust purification catalyst 20 changes, but in the illustrated example, it is assumed for convenience that they change simultaneously). If the air-fuel ratio of the exhaust gas flowing into the upstream side exhaust purification catalyst 20 changes to the lean air-fuel ratio at the time $t_2$, the oxygen storage amount OSA of the upstream side exhaust purification catalyst 20 increases. At this time, the cumulative oxygen excess/deficiency ΣOED also gradually increases.

At this time, the air-fuel ratio of the exhaust gas flowing out from the upstream side exhaust purification catalyst 20 changes to the stoichiometric air-fuel ratio, and the output air-fuel ratio AFdwn of the downstream side air-fuel ratio sensor 41 returns to the stoichiometric air-fuel ratio. At this time, the air-fuel ratio of the exhaust gas flowing into the upstream side exhaust purification catalyst 20 is the lean air-fuel ratio, but there is sufficient leeway in the oxygen storage ability of the upstream side exhaust purification catalyst 20, and therefore the oxygen in the inflowing exhaust gas is stored in the upstream side exhaust purification catalyst 20 and HC, CO and $NO_X$ are simultaneously purified on the surface of the upstream side exhaust purification catalyst 20. Therefore, the exhaust of $NO_X$ from the upstream side exhaust purification catalyst 20 becomes substantially zero.

Then, if the upstream side exhaust purification catalyst 20 increases in the oxygen storage amount OSA, at the time $t_3$, the oxygen storage amount OSA of the upstream side exhaust purification catalyst 20 reaches the switching reference storage amount Cref. At this time, the cumulative oxygen excess/deficiency ΣOED also reaches the switching reference value OEDref which corresponds to the switching reference storage amount Cref. In the embodiment of the present invention, if the cumulative oxygen excess/deficiency ΣOED becomes the switching reference value OEDref or more, the storage of oxygen in the upstream side exhaust purification catalyst 20 is suspended by switching the air-fuel ratio adjustment amount AFC to the rich set adjustment amount AFCrich. Therefore, the target air-fuel ratio is made the rich air-fuel ratio. Further, at this time, the cumulative oxygen excess/deficiency ΣOED is reset to 0.

In this regard, in the example shown in FIG. 5, the oxygen storage amount OSA falls simultaneously with the target air-fuel ratio being switched at the time $t_3$, but in actuality, a delay occurs from when the target air-fuel ratio is switched to when the oxygen storage amount OSA falls. Further, in cases, such as the case where a vehicle in which the internal combustion engine is mounted is accelerated and then the engine load becomes higher and thus the intake air amount instantaneously deviates, sometimes the air-fuel ratio of the exhaust gas flowing into the upstream side exhaust purification catalyst 20 unintentionally and instantaneously deviates greatly from the stoichiometric air-fuel ratio.

As opposed to this, the switching reference storage amount Cref is set sufficiently lower than the maximum storable oxygen amount Cmax at the time when the upstream side exhaust purification catalyst 20 is new. Therefore, even if the above delay occurs or even if the actual air-fuel ratio of the exhaust gas unintentionally and instantaneously deviates greatly from the stoichiometric air-fuel ratio, the oxygen storage amount OSA does not reach the maximum storable oxygen amount Cmax. Conversely speaking, the switching reference storage amount Cref is set to an amount sufficiently small so that the oxygen storage amount OSA does not reach the maximum storable oxygen amount Cmax even if the above delay or unintentional deviation in air-fuel ratio occurs. For example, the switching reference storage amount Cref is made ¾ or less of the maximum storable oxygen amount Cmax when the upstream side exhaust purification catalyst 20 is new, preferably ½ or less thereof, more preferably ⅕ or less thereof.

At the time $t_3$, if the target air-fuel ratio is switched to the rich set air-fuel ratio, the air-fuel ratio of the exhaust gas flowing into the upstream side exhaust purification catalyst 20 changes from the lean air-fuel ratio to the rich air-fuel ratio. Along with this, the output air-fuel ratio AFup of the upstream side air-fuel ratio sensor 40 becomes the rich air-fuel ratio (in actuality, a delay occurs from when the target air-fuel ratio is switched to when the exhaust gas flowing into the upstream side exhaust purification catalyst 20 changes in air-fuel ratio, but in the illustrated example, it is deemed for convenience that the change is simultaneous). Since, at this time, the exhaust gas flowing into the upstream side exhaust purification catalyst 20 contains HC or CO, the upstream side exhaust purification catalyst 20 gradually decreases in oxygen storage amount OSA. At the time $t_4$, in a similar way to the time $t_1$, the output air-fuel ratio AFdwn of the downstream side air-fuel ratio sensor 41 starts to fall. At this time as well, $NO_X$ amount exhausted from the upstream side exhaust purification catalyst 20 is substantially zero.

Next, at the time $t_5$, in a similar way to time $t_2$, the output air-fuel ratio AFdwn of the downstream side air-fuel ratio sensor 41 reaches the rich judged air-fuel ratio AFrich. Due to this, the air-fuel ratio adjustment amount AFC is switched to the value AFClean which corresponds to the lean set air-fuel ratio. Then, the cycle of the above mentioned times $t_1$ to $t_5$ is repeated.

As will be understood from the above explanation, according to the embodiment of the present invention, it is possible to constantly suppress the amount of $NO_X$ which is exhausted from the upstream side exhaust purification catalyst 20. That is, so long as performing the above mentioned control, basically the $NO_X$ amount which is exhausted from the upstream side exhaust purification catalyst 20 can be substantially zero.

Note that, in the above embodiment, during the times $t_2$ to $t_3$, the air-fuel ratio adjustment amount AFC is maintained at the lean set adjustment amount AFClean. However, during this time period, the air-fuel ratio adjustment amount AFC does not necessarily have to be maintained constant. It may be set to fluctuate, such as to gradually decrease. Alternatively, in the time period of the times $t_2$ to $t_3$, it is also possible to temporarily set the air-fuel ratio adjustment amount AFC to a value smaller than 0 (for example, the rich set adjustment amount, etc.) That is, in the time period of the times $t_2$ to $t_3$, the target air-fuel ratio may also temporarily be set to the rich air-fuel ratio.

Figure 6:
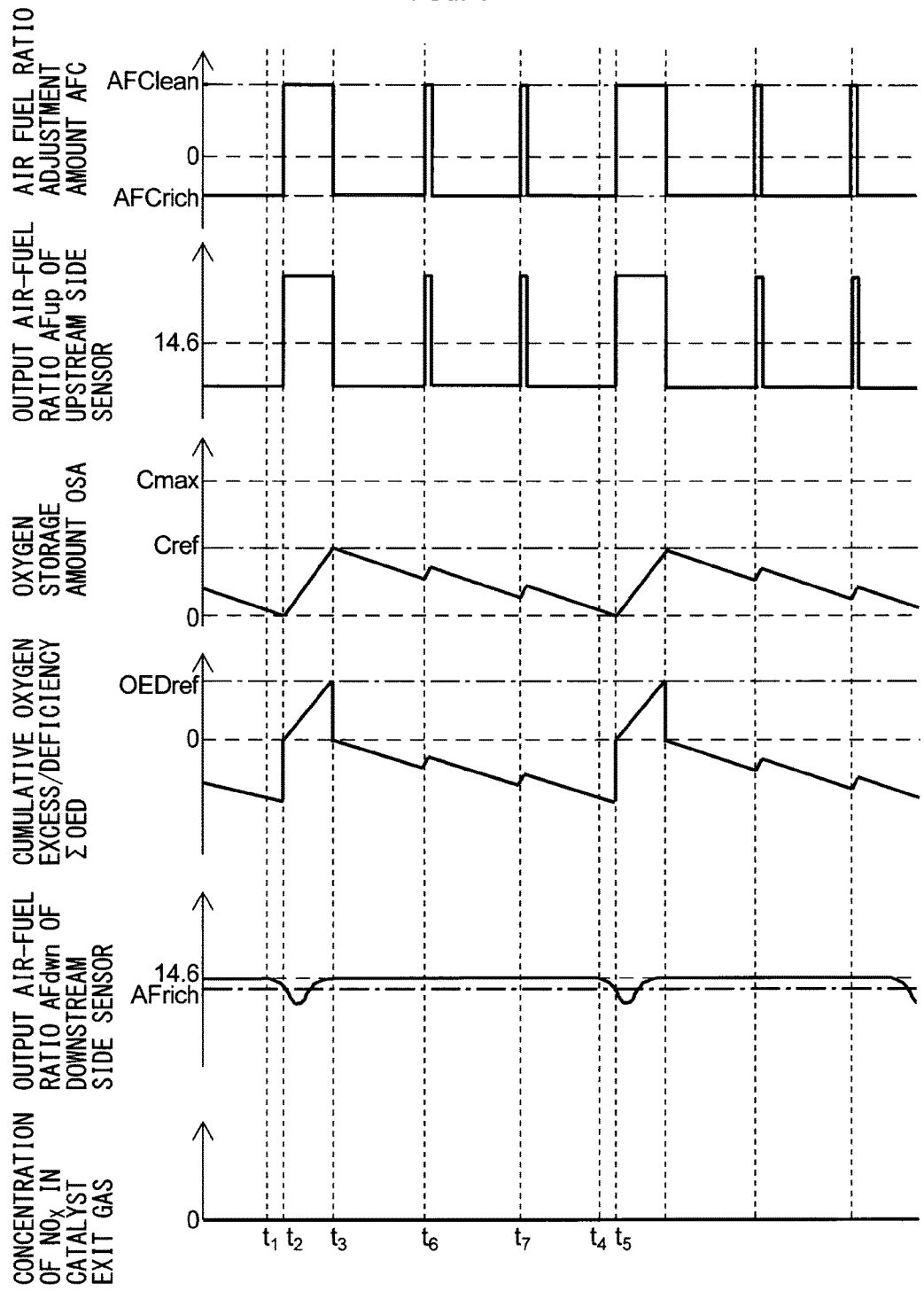
FIG. 6 is a time chart of air-fuel ratio adjustment amount, etc., when performing air-fuel ratio control.
Figure 7:
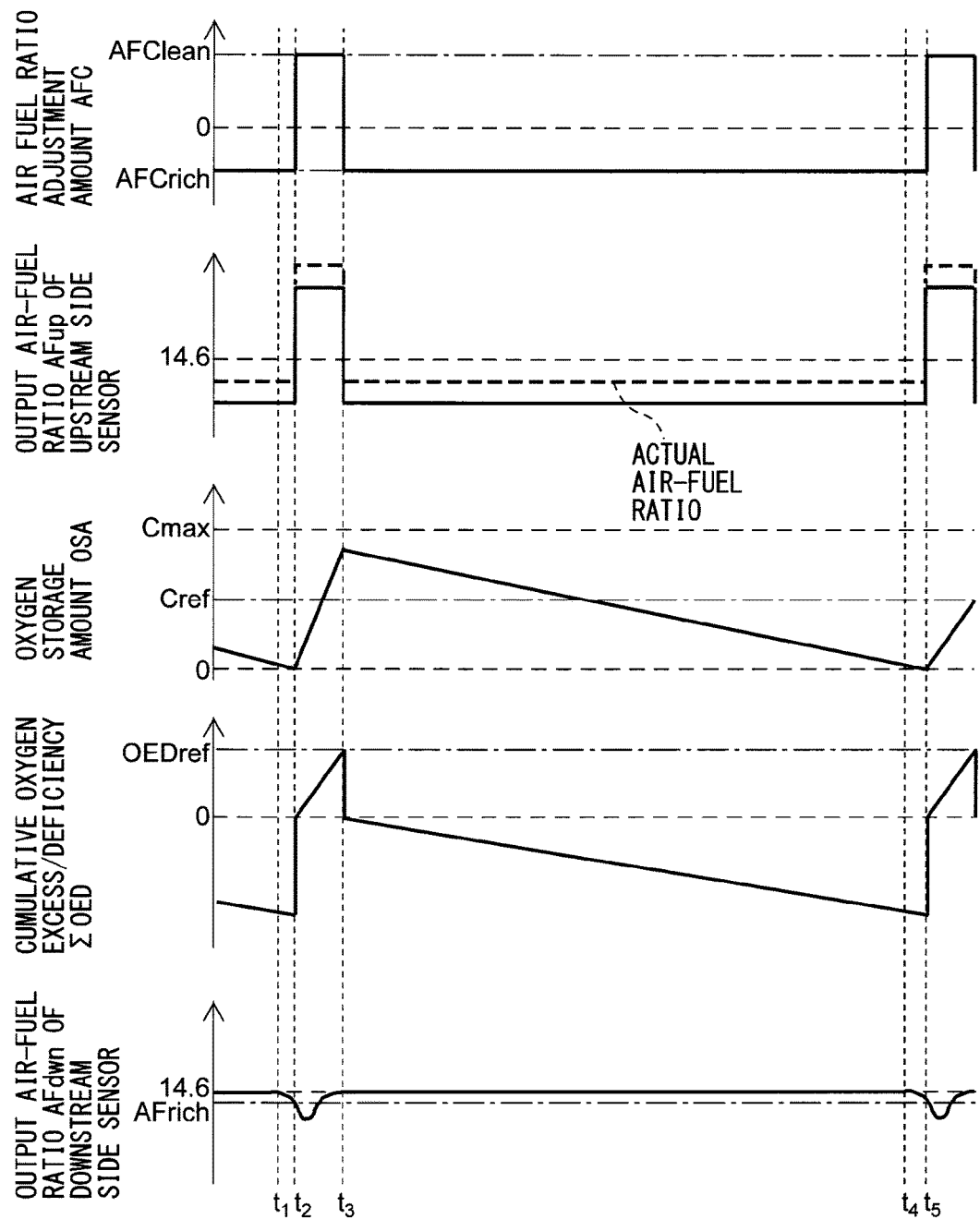
FIG. 7 is a time chart of air-fuel ratio adjustment amount, etc., when a deviation occurs in the output value of the upstream side air-fuel ratio sensor.

Similarly, in the above embodiment, during the times $t_3$ to $t_5$, the air-fuel ratio adjustment amount AFC is maintained at the rich set adjustment amount AFCrich. However, during this time period, the air-fuel ratio adjustment amount AFC does not necessarily have to be maintained constant. It may be set to fluctuate, such as to gradually increase. Alternatively, as shown in FIG. 6, in the time period of the times $t_3$ to $t_5$, it is also possible to temporarily set the air-fuel ratio adjustment amount AFC to a value larger than 0 (for example, the lean set adjustment amount, etc.) (FIG. 7, times $t_6$, $t_7$, etc.) That is, in the time period of the times $t_3$ to $t_5$, the target air-fuel ratio may also temporarily be set to the lean air-fuel ratio.

<Deviation at Upstream Side Air Fuel Ratio Sensor>

When the engine body 1 has a plurality of cylinders, sometimes a deviation occurs between the cylinders in the air-fuel ratio of the exhaust gas which is exhausted from the cylinders. On the other hand, the upstream side air-fuel ratio sensor 40 is arranged at the header of the exhaust manifold 19, but depending on the position of arrangement, the extent by which the exhaust gas which is exhausted from each cylinder is exposed to the upstream side air-fuel ratio sensor 40 differs between cylinders. As a result, the output air-fuel ratio of the upstream side air-fuel ratio sensor 40 is strongly affected by the air-fuel ratio of the exhaust gas which is exhausted from a certain specific cylinder. Therefore, when the air-fuel ratio of the exhaust gas which is exhausted from a certain specific cylinder becomes an air-fuel ratio which differs from the average air-fuel ratio of the exhaust gas which is exhausted from all cylinders, deviation occurs between the average air-fuel ratio and the output air-fuel ratio of the upstream side air-fuel ratio sensor 40. That is, the output air-fuel ratio of the upstream side air-fuel ratio sensor 40 deviates to the rich side or lean side from the average air-fuel ratio of the actual exhaust gas.

Further, hydrogen of the unburned gas contained in the exhaust gas passes through the diffusion regulation layer of the air-fuel ratio sensor faster than HC or CO. On the other hand, the air-fuel sensor has a characteristic to generate an output lower than, i.e., richer than the actual air-fuel ratio of the exhaust gas, if the speed of unburned components passing through the diffusion regulation layer. Therefore, if the concentration of hydrogen in the exhaust gas is high, the output air-fuel ratio of the upstream side air-fuel ratio sensor 40 deviates to the richer side than the actual air-fuel ratio of the exhaust gas.

If deviation occurs in the output air-fuel ratio of the upstream side air-fuel ratio sensor 40 in this way, even if the above mentioned control is performed, sometimes $NO_X$ flows out from the upstream side exhaust purification catalyst 20 or a frequency of the unburned gas, such as HC or CO, flowing out therefrom becomes higher. Next, this phenomenon will be explained with reference to FIGS. 7 and 8.

FIG. 7 is a time chart of the oxygen storage amount OSA of the upstream side exhaust purification catalyst 20, etc., similar to FIG. 5. FIG. 7 shows the case where the output air-fuel ratio of the upstream side air-fuel ratio sensor 40 deviates to the rich side. In the figure, the solid line in the output air-fuel ratio AFup of the upstream side air-fuel ratio sensor 40 shows the output air-fuel ratio of the upstream side air-fuel ratio sensor 40. On the other hand, the broken line shows the actual air-fuel ratio of the exhaust gas flowing around the upstream side air-fuel ratio sensor 40.

In the example shown in FIG. 7 as well, in the state before the time $t_1$, the air-fuel ratio adjustment amount AFC is set to the rich set adjustment amount AFCrich, and therefore the target air-fuel ratio is set to the rich set air-fuel ratio. Along with this, the output air-fuel ratio AFup of the upstream side air-fuel ratio sensor 40 becomes an air-fuel ratio equal to the rich set air-fuel ratio. However, since, as explained above, the output air-fuel ratio of the upstream side air-fuel ratio sensor 40 deviates to the rich side, the actual air-fuel ratio of the exhaust gas becomes an air-fuel ratio which is leaner than the rich set air-fuel ratio. That is, the output air-fuel ratio AFup of the upstream side air-fuel ratio sensor 40 becomes lower (richer) than the actual air-fuel ratio (broken line in the figure). For this reason, that is, since the actual air-fuel ratio of the exhaust gas deviates to the lean side, the decreasing speed of the oxygen storage amount OSA of the upstream side exhaust purification catalyst 20 is slower.

Next, if, at the time $t_2$, the output air-fuel ratio AFdwn of the downstream side air-fuel ratio sensor 41 reaches the rich judged air-fuel ratio AFrich, the air-fuel ratio adjustment amount AFC is switched to the lean set adjustment amount AFClean, and thus the target air-fuel ratio is switched to the lean set air-fuel ratio. As a result, the output air-fuel ratio AFup of the upstream side air-fuel ratio sensor 40 becomes an air-fuel ratio equal to the lean set air-fuel ratio. However, as explained above, the output air-fuel ratio of the upstream side air-fuel ratio sensor 40 deviates to the rich side, and therefore the actual air-fuel ratio (broken line in the drawing) of the exhaust gas becomes an air-fuel ratio leaner than the lean set air-fuel ratio. Therefore, the increasing speed of the oxygen storage amount OSA of the upstream side exhaust purification catalyst 20 becomes faster, and the actual oxygen amount supplied to the upstream side exhaust purification catalyst 20 while the target air-fuel ratio set to the lean set air-fuel ratio becomes larger than the switching reference oxygen amount Cref.

Figure 8:
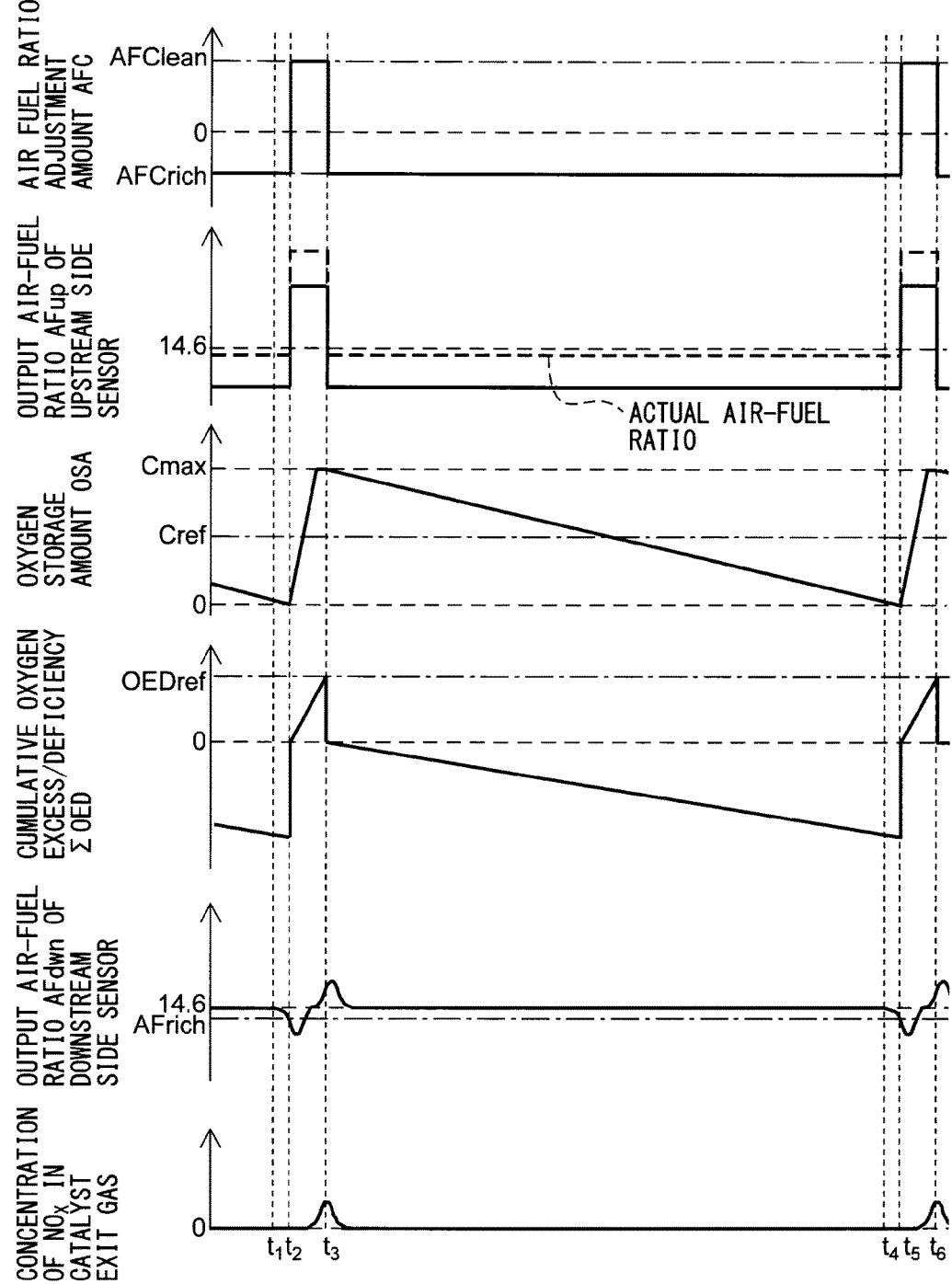
FIG. 8 is a time chart of air-fuel ratio adjustment amount, etc., when a deviation occurs in the output value of the upstream side air-fuel ratio sensor.

Further, if the upstream side air-fuel ratio sensor 40 has a large deviation in output air-fuel ratio, the speed of increase of the oxygen storage amount OSA of the upstream side exhaust purification catalyst 2 becomes extremely fast. Therefore, in this case, as shown in FIG. 8, before the cumulative value ΣOED of the oxygen excess/deficiency which was calculated based on the output air-fuel ratio AFup of the upstream side air-fuel ratio sensor 40 reaches the switching reference value OEDref, the actual oxygen storage amount OSA reaches the maximum storable oxygen amount Cmax. As a result, $NO_X$ flows out from the upstream side exhaust purification catalyst 20.

On the other hand, if the output air-fuel ratio of the upstream side air-fuel ratio sensor 40 deviates to the lean side, the increasing speed of the oxygen storage amount OSA becomes slower, and the decreasing speed thereof becomes faster. In this case, the cycle from time t2 to time t5 becomes faster, and the frequency of the unburned gas such as HC or CO from the upstream side exhaust purification catalyst 20 becomes higher.

From the above explanation, it can be understood that it is necessary to detect the deviation in the output air-fuel ratio of the upstream side air-fuel ratio sensor 40 and is necessary to to correct the output air-fuel ratio, etc., based on the detected deviation.

<Normal Learning Control>

Therefore, in an embodiment of the present invention, learning control is performed to compensate for deviation in the output air-fuel ratio of the upstream side air-fuel ratio sensor 40, during normal operation, that is, when performing feedback control based on the target air-fuel ratio as stated above.

Below, the time period from when switching the target air-fuel ratio to the lean air-fuel ratio to when the cumulative oxygen excess/deficiency ΣOED becomes the switching reference value OEDref or more is referred to as the oxygen increase time period (first time period). Similarly, the time period from when the target air-fuel ratio is switched to the rich air-fuel ratio to when the output air-fuel ratio of the downstream side air-fuel ratio sensor 41 becomes the rich judged air-fuel ratio or less is referred to as the oxygen decrease time period (second time period). In the normal learning control of the embodiment of the present invention, as the absolute value of the cumulative oxygen excess/deficiency LODE in the oxygen increase time period, the lean cumulative value of oxygen amount (first cumulative value of oxygen amount) is calculated. Further, as the absolute value of the cumulative oxygen excess/deficiency in the oxygen decrease time period, the rich cumulative value of oxygen amount (second cumulative value of oxygen amount) is calculated. Moreover, the control center air-fuel ratio AFR is corrected so that the difference between the lean cumulative value of oxygen amount and rich cumulative value of oxygen amount becomes smaller. This state is shown in FIG. 9.

Figure 9:
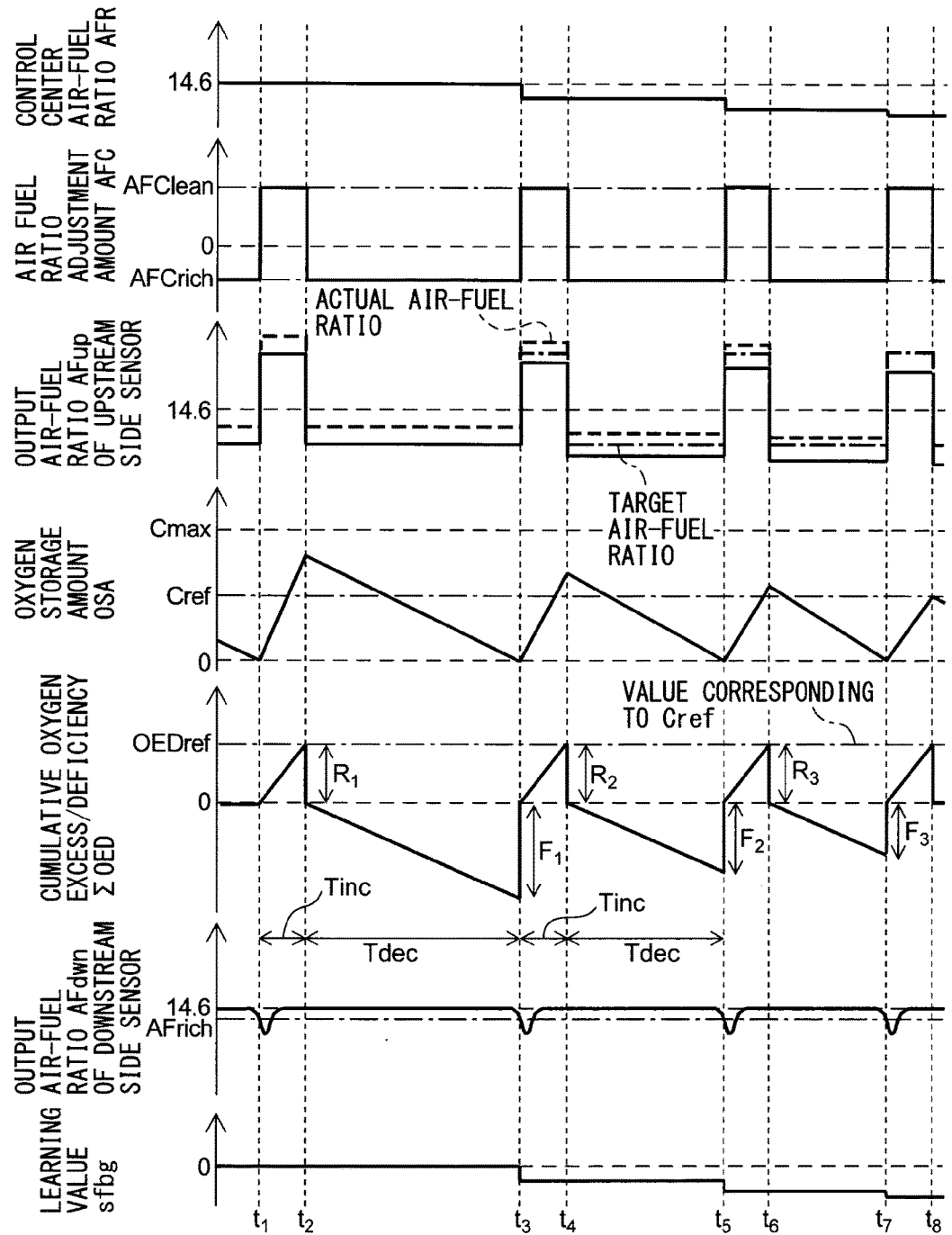
FIG. 9 is a time chart of air-fuel ratio adjustment amount, etc., when performing normal learning control.

FIG. 9 is a time chart of the control center air-fuel ratio AFR, the air-fuel ratio adjustment amount AFC, the output air-fuel ratio AFup of the upstream side air-fuel ratio sensor 40, the oxygen storage amount OSA of the upstream side exhaust purification catalyst 20, the cumulative oxygen excess/deficiency ΣOED, the output air-fuel ratio AFdwn of the downstream side air-fuel ratio sensor 41, and the learning value sfbg. Further, FIG. 9 shows the case, like FIG. 7, where the output air-fuel ratio AFup of the upstream side air-fuel ratio sensor 40 deviates to the low side (rich side). Note that, the learning value sfbg is a value which changes in accordance with the deviation of the output air-fuel ratio of the upstream side air-fuel ratio sensor 40 and is used for correction of the control center air-fuel ratio AFR in the embodiment of the present invention. Further, in FIG. 9, the solid line indicates the output air-fuel ratio AFup of the upstream side air-fuel ratio sensor 40, and the broken line indicates actual air-fuel ratio of the exhaust gas flowing around the upstream side air-fuel ratio sensor 40. Further, the one-dot chain line indicates the target air-fuel ratio, i.e., an air-fuel ratio corresponding to the air-fuel ratio adjustment amount AFC.

In the example shown in FIG. 9, similarly to FIGS. 5 and 7, in the state before the time $t_1$, the control center air-fuel ratio is set to the stoichiometric air-fuel ratio, and the air-fuel ratio adjustment amount AFC is set to the rich set adjustment amount AFCrich. At this time, the output air-fuel ratio AFup of the upstream side air-fuel ratio sensor 40, as shown by the solid line, becomes a air-fuel ratio corresponding to the rich set air-fuel ratio. However, since the output air-fuel ratio of the upstream side air-fuel ratio sensor 40 deviates, the actual air-fuel ratio of the exhaust gas is an air-fuel ratio which is leaner than the rich set air-fuel ratio (the broken line in FIG. 9). However, in the example shown in FIG. 9, as will be understood from the broken line of FIG. 9, the actual air-fuel ratio of the exhaust gas before the time $t_1$ becomes a rich air-fuel ratio which is leaner than the rich set air-fuel ratio. Therefore, the oxygen storage amount of the upstream side exhaust purification catalyst 20 is gradually decreased.

At the time $t_1$, the output air-fuel ratio AFdwn of the downstream side air-fuel ratio sensor 41 reaches the rich judged air-fuel ratio AFrich. Due to this, as explained above, the air-fuel ratio adjustment amount AFC is switched to the lean set adjustment amount AFClean. After the time $t_1$, the output air-fuel ratio of the upstream side air-fuel ratio sensor 40 becomes an air-fuel ratio corresponding to the lean set air-fuel ratio. However, due to deviation of the output air-fuel ratio of the upstream side air-fuel ratio sensor 40, the actual air-fuel ratio of the exhaust gas becomes an air-fuel ratio which is leaner than the lean set air-fuel ratio, that is, an air-fuel ratio with a great lean degree (see broken line of FIG. 9). Therefore, the oxygen storage amount OSA of the upstream side exhaust purification catalyst 20 rapidly increases.

On the other hand, the oxygen excess/deficiency is calculated based on the output air-fuel ratio AFup of the upstream side air-fuel ratio sensor 40 (more accurately, a difference between the output air-fuel ratio AFup and the control center air-fuel ratio AFR). However, as explained above, deviation occurs in the output air-fuel ratio AFup of the upstream side air-fuel ratio sensor 40. Therefore, the calculated cumulative oxygen excess/deficiency ΣOED is smaller than the actually stored oxygen amount. Therefore, the cumulative oxygen excess/deficiency ΣOED increases slower than the oxygen storage amount OSA.

At the time $t_2$, the cumulative oxygen excess/deficiency ΣOED reaches the switching reference value OEDref. Therefore, the air-fuel ratio adjustment amount AFC is switched to the rich set adjustment amount AFCrich. Therefore, the target air-fuel ratio is set to the rich air-fuel ratio. At this time, the actual oxygen storage amount OSA, as shown in FIG. 9, becomes greater than the switching reference storage amount Cref.

After the time $t_2$, similarly to the state before the time $t_1$, the air-fuel ratio adjustment amount AFC is set to the rich set adjustment amount AFCrich and accordingly the target air-fuel ratio is set to the rich air-fuel ratio. At this time as well, the actual air-fuel ratio of the exhaust gas is an air-fuel ratio which is leaner than the rich set air-fuel ratio. As a result, the upstream side exhaust purification catalyst 20 becomes slower in speed of decrease of the oxygen storage amount OSA. In addition, as explained above, at the time $t_2$, the actual oxygen storage amount of the upstream side exhaust purification catalyst 20 becomes greater than the switching reference storage amount Cref. Therefore, time is taken until the actual oxygen storage amount of the upstream side exhaust purification catalyst 20 reaches zero.

At the time $t_3$, the output air-fuel ratio AFdwn of the downstream side air-fuel ratio sensor 41 reaches the rich judged air-fuel ratio AFrich. Due to this, as explained above, the air-fuel ratio adjustment amount AFC is switched to the lean set adjustment amount AFClean. Therefore, the target air-fuel ratio is switched from the rich set air-fuel ratio to the lean set air-fuel ratio.

In the embodiment of the present invention, as explained above, the cumulative oxygen excess/deficiency ΣOED is calculated from the time $t_1$ to the time $t_2$. In this regard, if referring to the time period from when the target air-fuel ratio is switched to the lean air-fuel ratio (time $t_1$) to when the estimated value of the oxygen storage amount OSA of the upstream side exhaust purification catalyst 20 becomes the switching reference storage amount Cref or more (time $t_2$), as the "oxygen increase time period Tinc", in the embodiment of the present invention, the cumulative oxygen excess/deficiency ΣOED is calculated in the oxygen increase time period Tinc. In FIG. 9, the absolute value of the cumulative oxygen excess/deficiency ΣOED in the oxygen increase time period Tinc from the time $t_1$ to time $t_2$ is shown as $R_1$.

The cumulative oxygen excess/deficiency ΣOED($R_1$) in this oxygen increase time period Tinc corresponds to the oxygen storage amount OSA at the time $t_2$. However, as explained above, estimation of the oxygen excess/deficiency uses the output air-fuel ratio AFup of the upstream side air-fuel ratio sensor 40, and deviation occurs in this output air-fuel ratio AFup. Therefore, in the example shown in FIG. 9, the cumulative oxygen excess/deficiency ΣOED in the oxygen increase time period Tinc from the time $t_1$ to time $t_2$ becomes smaller than the value which corresponds to the actual oxygen storage amount OSA at the time $t_2$.

Further, in the embodiment of the present invention, the cumulative oxygen excess/deficiency ΣOED is also calculated from the time $t_2$ to time $t_3$. In this regard, if referring to the time period from when the target air-fuel ratio is switched to the rich air-fuel ratio (time $t_2$) to when the output air-fuel ratio AFdwn of the downstream side air-fuel ratio sensor 41 reaches the rich judged air-fuel ratio AFrich (time $t_3$), as the "oxygen decrease time period Tdec", in the embodiment of the present invention, the cumulative oxygen excess/deficiency ΣOED is calculated in the oxygen decrease time period Tdec. In FIG. 9, the absolute value of the cumulative oxygen excess/deficiency ΣOED at the oxygen decrease time period Tdec from the time $t_2$ to time $t_3$ is shown as $F_1$.

The cumulative oxygen excess/deficiency ΣOED($F_1$) of this oxygen decrease time period Tdec corresponds to the total oxygen amount which is released from the upstream side exhaust purification catalyst 20 from the time $t_2$ to the time $t_3$. However, as explained above, deviation occurs in the output air-fuel ratio AFup of the upstream side air-fuel ratio sensor 40. Therefore, in the example shown in FIG. 9, the cumulative oxygen excess/deficiency ΣOED in the oxygen decrease time period Tdec from the time $t_2$ to time $t_3$ is larger than the value which corresponds to the total amount of oxygen which is released from the upstream side exhaust purification catalyst 20 from the time $t_2$ to the time $t_3$.

In this regard, in the oxygen increase time period Tinc, oxygen is stored at the upstream side exhaust purification catalyst 20, while in the oxygen decrease time period Tdec, the stored oxygen is completely released. Therefore, the absolute value $R_1$ of the cumulative oxygen excess/deficiency during the oxygen increase time period Tinc and the absolute value $F_1$ of the cumulative oxygen excess/deficiency during the oxygen decrease time period Tdec basically should be the same value. However, as explained above, when deviation occurs in the output air-fuel ratio of the upstream side air-fuel ratio sensor 40, the cumulative value changes in accordance with the deviation. As explained above, when the output air-fuel ratio of the upstream side air-fuel ratio sensor 40 deviates to the low side (rich side), the absolute value $F_1$ becomes greater than the absolute value $R_1$. Conversely, when the output air-fuel ratio of the upstream side air-fuel ratio sensor 40 deviates to the high side (lean side), the absolute value $F_1$ becomes smaller compared with the absolute value $R_1$. In this case, the difference ΔΣOED between the absolute value $R_1$ of the cumulative oxygen excess/deficiency at the oxygen increase time period Tinc and the absolute value $F_1$ of the cumulative oxygen excess/deficiency at the oxygen decrease time period Tdec (=$R_1$−$F_1$. Below, referred to as the "excess/deficiency error") expresses the extent of deviation at the output air-fuel ratio of the upstream side air-fuel ratio sensor 40. It can be considered that the larger the difference of these absolute values $R_1$ and $F_1$, the greater the deviation in the output air-fuel ratio of the upstream side air-fuel ratio sensor 40.

Therefore, in the embodiment of the present invention, based on the excess/deficiency error ΔΣOED, the control center air-fuel ratio AFR is corrected. In particular, in the embodiment of the present invention, the control center air-fuel ratio AFR is corrected so that the difference ΔΣOED between the absolute value $R_1$ of the cumulative oxygen excess/deficiency during the oxygen increase time period Tinc and the absolute value $F_1$ of the cumulative oxygen excess/deficiency during the oxygen decrease time period Tdec becomes smaller.

Specifically, in the embodiment of the present invention, the learning value sfbg is calculated by the following formula (2), and the control center air-fuel ratio AFR is corrected by the following formula (3).

$$sfbg(n)=sfbg(n-1)+k_1 \cdot \Delta\Sigma OED \qquad (2)$$

$$AFR=AFRbase+sfbg(n) \qquad (3)$$

Note that, in the above formula (2), sfbg(n−1) indicates the previously calculated learning value, and sfbg(n) indicates the current calculated learning value. Further, "$k_1$" in the above formula (2) is the gain which shows the extent by which the excess/deficiency error ΔΣOED is reflected in the control center air-fuel ratio AFR. The larger the value of the gain "$k_1$", the larger the correction amount of the control center air-fuel ratio AFR. Moreover, in the above formula (3), the basic control center air-fuel ratio AFRbase is a control center air-fuel ratio which is used as a base, and in the embodiment of the present invention is the stoichiometric air-fuel ratio.

At the time $t_3$ of FIG. 9, as explained above, the learning value sfbg is calculated based on the absolute values $R_1$ and $F_1$. In particular, in the example shown in FIG. 9, since the absolute value $F_1$ of the cumulative oxygen excess/deficiency at the oxygen decrease time period Tdec is larger than the absolute value $R_1$ of the cumulative oxygen excess/deficiency at the oxygen increase time period Tinc, at the time $t_3$, the learning value sfbg is decreased.

At this time, as can be understood from the above formula (3), the control center air-fuel ratio AFR is corrected based on the learning value sfbg. In the example shown in FIG. 9, the learning value sfbg is a negative value, and therefore the control center air-fuel ratio AFR becomes a value smaller than the basic control center air-fuel ratio AFRbase, that is, the rich side value. Accordingly, the air-fuel ratio of the exhaust gas flowing into the upstream side exhaust purification catalyst 20 is corrected to the rich side.

As a result, the deviation of the actual air-fuel ratio of the exhaust gas flowing into the upstream side exhaust purification catalyst 20 with respect to the target air-fuel ratio after the time $t_3$ becomes smaller than before the time $t_3$. Therefore, the difference between the broken line indicating the actual air-fuel ratio and the one-dot chain line indicating the target air-fuel ratio after the time $t_3$ becomes smaller than the difference before the time $t_3$.

Further, after the time $t_3$ as well, an operation similar to the operation during the time $t_1$ to time $t_2$ is performed. Therefore, at the time $t_4$, if the cumulative oxygen excess/deficiency ΣOED reaches the switching reference value OEDref, the target air-fuel ratio is switched from the lean set air-fuel ratio to the rich set air-fuel ratio. Then, at the time $t_5$, when the output current Irdwn of the downstream side air-fuel ratio sensor 41 reaches the rich judged air-fuel ratio AFrich, the target air-fuel ratio is again switched to the lean set air-fuel ratio.

That is, the period from the time $t_3$ to time $t_4$, as explained above, corresponds to the oxygen increase time period Tinc. Therefore, the absolute value of the cumulative oxygen excess/deficiency ΣOED during this period is expressed by $R_2$ of FIG. 9. Further, the period from the time $t_4$ to time $t_5$, as explained above, corresponds to the oxygen decrease time period Tdec, and therefore the absolute value of the cumulative oxygen excess/deficiency ΣOED during this period is expressed by $F_2$ of FIG. 9. Further, the learning value sfbg is updated based on the difference $\Delta\Sigma OED(=R_2-F_2)$ of these absolute values $R_2$ and $F_2$ by using the above formula (2). In the embodiment of the present invention, similar control is repeated after the time $t_5$ and, due to this, the learning value sfbg is repeatedly updated.

By updating the normal learning value sfbg as stated above, the output air-fuel ratio AFup of the upstream side air-fuel ratio sensor 40 is gradually separated away from the target air-fuel ratio, but the actual air-fuel ratio of the exhaust gas flowing into the upstream side exhaust purification catalyst 20 gradually approaches the target air-fuel ratio. Due to this, it is possible to gradually correct the deviation in the output air-fuel ratio of the upstream side air-fuel ratio sensor 40. In this way, according to the present invention, the learning value is updated by the normal learning control, and therefore in the embodiment of the present invention the normal leaning control is also referred to as a learning value update control.

Note that, in the above embodiment, in the basic air-fuel ratio control, when the air-fuel ratio which was detected by the downstream side air-fuel ratio sensor 41 becomes the rich judged air-fuel ratio or less, the target air-fuel ratio is switched to the lean air-fuel ratio. Further, when the cumulative oxygen excess/deficiency $\Sigma OED$ becomes a given switching reference value OEDref or more, the target air-fuel ratio is switched to the rich air-fuel ratio. However, as the basic air-fuel ratio control, it is also possible to use another control. As such another control, considered is a control wherein when the output air-fuel ratio of the downstream side air-fuel sensor 41 becomes the lean judged air-fuel ratio or more, the target air-fuel ratio is switched to the rich air-fuel ratio, and when the cumulative oxygen excess/deficiency $\Sigma OED$ becomes a given switching reference value OEDref or less, the target air-fuel ratio is switched to the lean air-fuel ratio.

In this case, a rich cumulative value of oxygen amount is calculated as an absolute value of the cumulative oxygen excess/deficiency during the oxygen decrease time period from when the target air-fuel ratio is switched to the rich air-fuel ratio to when the cumulative oxygen excess/deficiency $\Sigma OED$ becomes the given switching reference value OEDref or less, and a lean cumulative value of oxygen amount is calculated as an absolute value of the cumulative oxygen excess/deficiency during the oxygen increase time period from when the target air-fuel ratio is switched to the lean air-fuel ratio to when the output air-fuel ratio of the downstream side air-fuel ratio sensor 41 becomes the lean judged air-fuel ratio or more. Further, the control center air-fuel ratio, etc., is corrected so that the difference between these rich cumulative value of oxygen amount and lean cumulative value of oxygen amount becomes smaller.

<Large Deviation in Upstream Side Air-Fuel Ratio Sensor>

In the example shown in FIGS. 7 and 8, deviation occurs in the output air-fuel ratio of the upstream side air-fuel ratio sensor 40, but the extent thereof is not that large. Therefore, as will be understood from the broken line of FIGS. 7 and 8, s when the target air-fuel ratio is set to the rich set air-fuel ratio, the actual air-fuel ratio of the exhaust gas becomes a rich air-fuel ratio while leaner than the rich set air-fuel ratio.

As opposed to this, if the deviation which occurs at the upstream side exhaust purification catalyst 20 becomes larger, even if the target air-fuel ratio is set to the rich set air-fuel ratio, sometimes the actual air-fuel ratio of the exhaust gas becomes the stoichiometric air-fuel ratio. This state is shown in FIG. 10.

Figure 10:
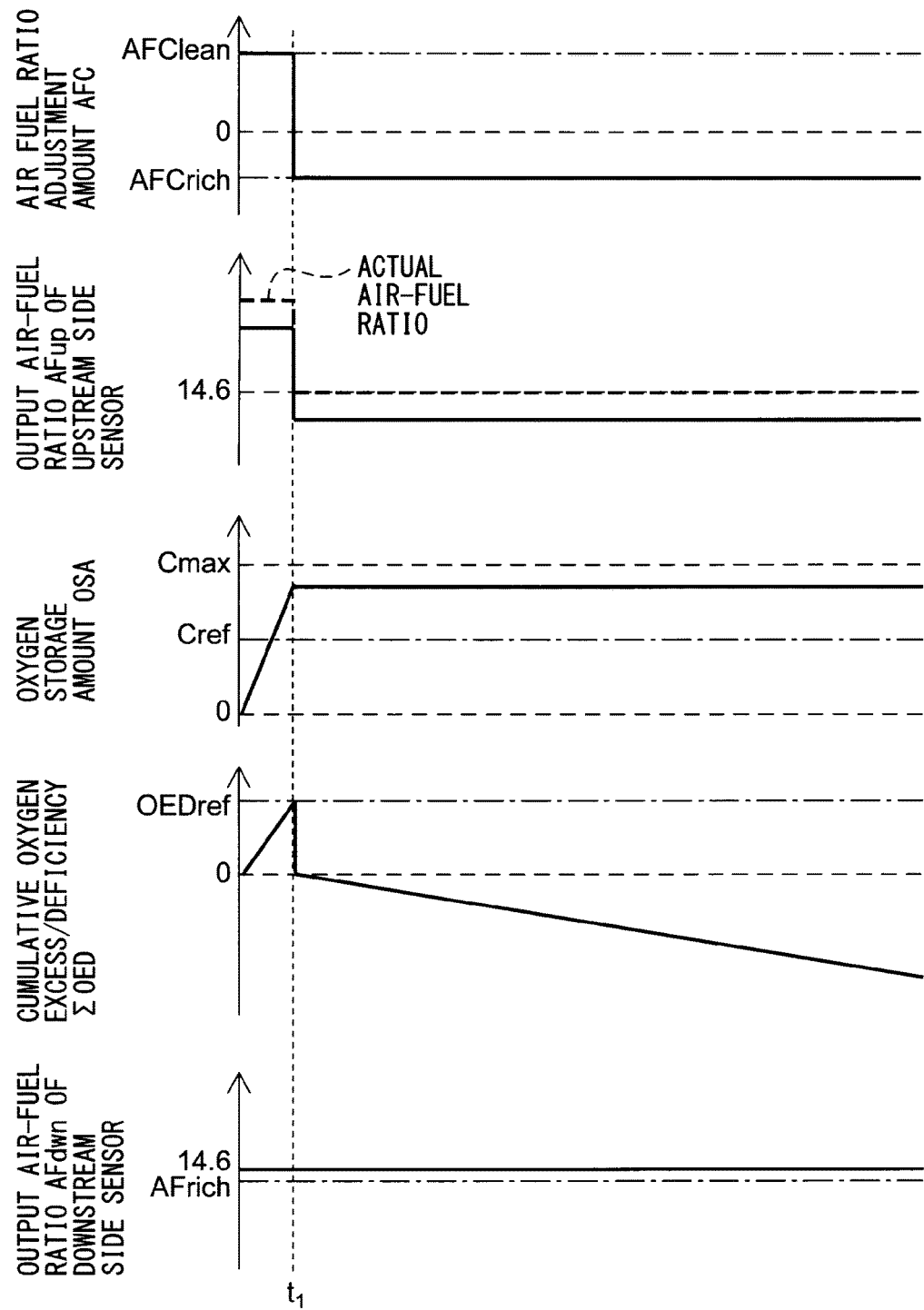
FIG. 10 is a time chart of air-fuel ratio adjustment amount, etc., when a large deviation occurs in the output value of the upstream side air-fuel ratio sensor.

In FIG. 10, before the time $t_1$, the air-fuel ratio adjustment amount AFC is set to the lean set adjustment amount AFClean. Accordingly, the output air-fuel ratio AFup of the upstream side air-fuel ratio sensor 40 becomes the lean set air-fuel ratio. However, since the output air-fuel ratio of the upstream side air-fuel ratio sensor 40 greatly deviates to the rich side, the actual air-fuel ratio of the exhaust gas becomes an air-fuel ratio leaner than the lean set air-fuel ratio (broken line in figure).

Then, if, at the time $t_1$, the cumulative oxygen excess/deficiency $\Sigma OED$ calculated based on the output air-fuel ratio AFup of the upstream side air-fuel ratio sensor 40 reaches the switching reference value OEDref, the air-fuel ratio adjustment amount AFC is switched to the rich set adjustment amount AFCrich. Along with this, the output air-fuel ratio AFup of the upstream side air-fuel ratio sensor 40 becomes an air-fuel ratio which corresponds to the rich set air-fuel ratio. However, since the output air-fuel ratio of the upstream side air-fuel ratio sensor 40 greatly deviates to the rich side, the actual air-fuel ratio of the exhaust gas becomes the stoichiometric air-fuel ratio (broken line in figure).

As a result, the oxygen storage amount OSA of the upstream side exhaust purification catalyst 20 does not change, but is maintained at a constant value. Therefore, even if a long time elapses after the air-fuel ratio adjustment amount AFC is switched to the rich set adjustment amount AFCrich, the output air-fuel ratio AFdwn of the downstream side air-fuel ratio sensor 41 is maintained at substantially the stoichiometric air-fuel ratio. As explained above, the air-fuel ratio adjustment amount AFC is switched from the slight rich set adjustment amount AFCsrich to the lean set adjustment amount AFClean, when the output air-fuel ratio AFdwn of the downstream side air-fuel ratio sensor 41 reaches the rich judged air-fuel ratio AFrich. However, in the example shown in FIG. 10, since the output air-fuel ratio AFdwn of the downstream side air-fuel ratio sensor 41 is maintained at the stoichiometric air-fuel ratio, the air-fuel ratio adjustment amount AFC is maintained at the rich set adjustment amount AFCrich for a long time. In this regard, the above-mentioned normal learning control, i.e., the learning value update control, is predicated on the air-fuel ratio adjustment amount being alternately switched between the rich set adjustment amount AFCrich and the lean set adjustment amount AFClean. Therefore, when the output air-fuel ratio of the upstream side air-fuel ratio sensor 40 greatly deviates, the air-fuel ratio adjustment amount is not switched, and therefore the above-mentioned normal learning control, i.e., the learning value update control cannot be performed. As a result, deviation in the output air-fuel ratio of the upstream side air-fuel ratio sensor 40 is not corrected.

Figure 11:
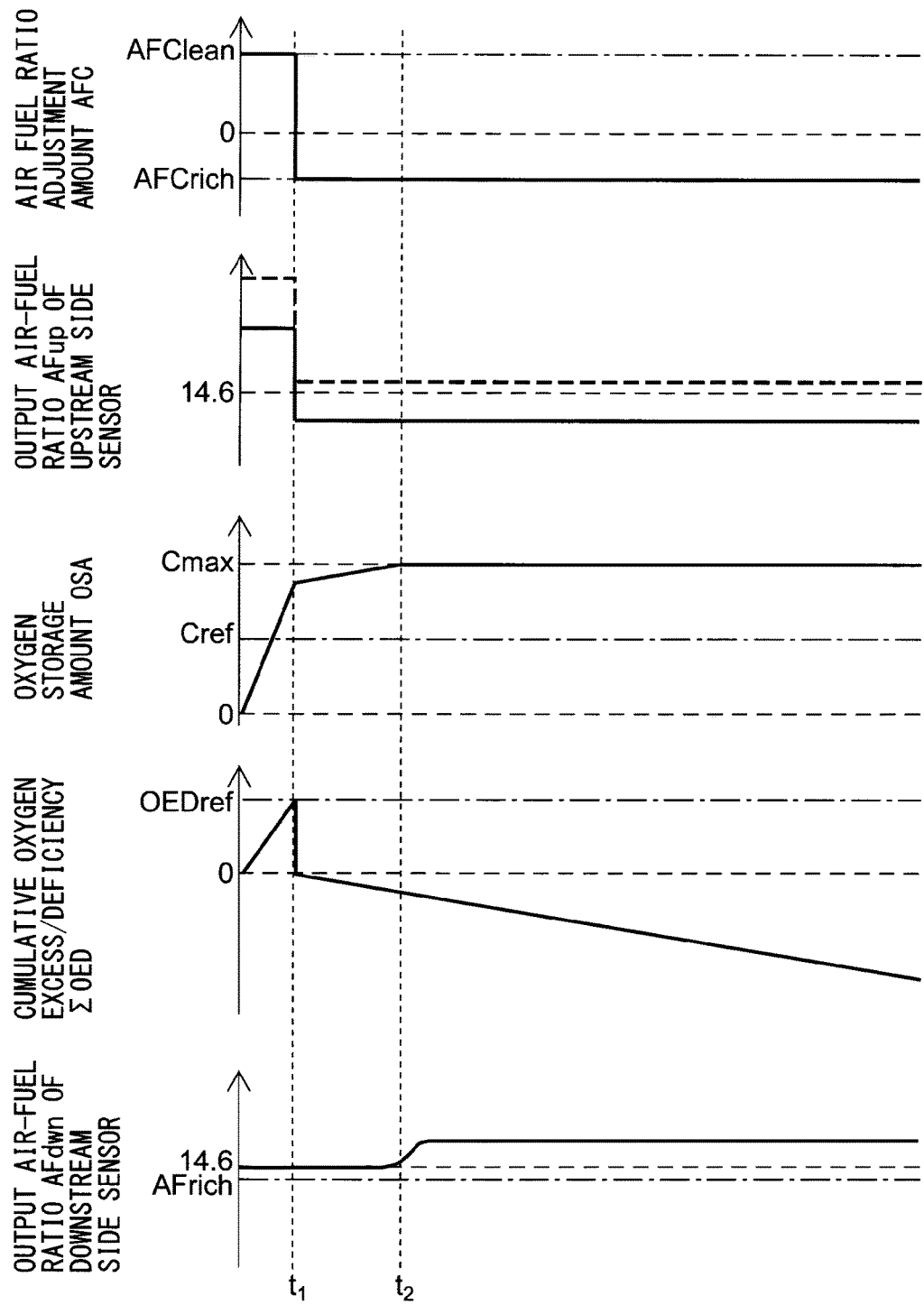
FIG. 11 is a time chart of air-fuel ratio adjustment amount, etc., when a large deviation occurs in the output value of the upstream side air-fuel ratio sensor.

FIG. 11 is a view similar to FIG. 10, which shows the case where the output air-fuel ratio of the upstream side air-fuel ratio sensor 40 extremely greatly deviates to the rich side. In the example shown in FIG. 11, similarly to the example shown in FIG. 10, at the time $t_1$, the air-fuel ratio adjustment amount AFC is switched to the rich set adjustment amount AFCrich. That is, at the time $t_1$, the target air-fuel ratio is set to the rich set air-fuel ratio. However, due to deviation of the output air-fuel ratio of the upstream side air-fuel ratio sensor 40, the actual air-fuel ratio of the exhaust gas becomes a lean air-fuel ratio (broken line in the figure).

As a result, nevertheless the air-fuel ratio adjustment amount AFC is set to the rich set adjustment amount AFCrich, exhaust gas of a lean air-fuel ratio flows into the upstream side exhaust purification catalyst 20. Therefore, the oxygen storage amount OSA of the upstream side exhaust purification catalyst 20 gradually increases, and finally reaches the maximum storable oxygen amount Cmax at the time $t_2$. If, in this way, the oxygen storage amount OSA reaches the maximum storable oxygen amount Cmax, the upstream side exhaust purification catalyst 20 cannot store oxygen in the exhaust gas any more. Therefore, NOx contained in the inflowing exhaust gas flows out from the upstream side exhaust purification catalyst 20 as it is, and thus the output air-fuel ratio AFdwn of the downstream side air-fuel ratio sensor 41 raises and indicates the lean air-fuel ratio. On the other hand, the air-fuel ratio adjustment amount AFC is switched from the rich set adjustment amount AFCrich to the lean set adjustment amount AFClean, when the output air-fuel ratio AFdwn of the downstream side air-fuel ratio sensor 41 reaches the rich judged air-fuel ratio AFrich. Therefore, when the output air-fuel ratio of the upstream side air-fuel ratio sensor 40 deviates extremely greatly, the air-fuel ratio adjustment amount AFC is not switched, and therefore the above-mentioned normal control, i.e., the learning value update control cannot be performed in this case as well. As a result, the deviation in the output air-fuel ratio of the upstream side air-fuel ratio sensor 40 cannot be corrected.

<Stuck Learning Control>

Therefore, in the embodiment of the present invention, even if the deviation of the output air-fuel ratio of the upstream side air-fuel ratio sensor 40 is large, to compensate that deviation, in addition to the above-mentioned normal learning control, i.e., the learning value update control, stoichiometric air-fuel ratio stuck learning control, lean stuck learning control, and rich stuck learning control are performed.

<Stoichiometric Air-Fuel Ratio Stuck Learning>

First, the stoichiometric air-fuel ratio stuck learning control will be explained. The stoichiometric air-fuel ratio stuck learning control is learning control which is performed when the output air-fuel ratio of the downstream side air-fuel ratio sensor 41 is stuck at the stoichiometric air-fuel ratio as shown in the example shown in FIG. 10.

Figure 12:
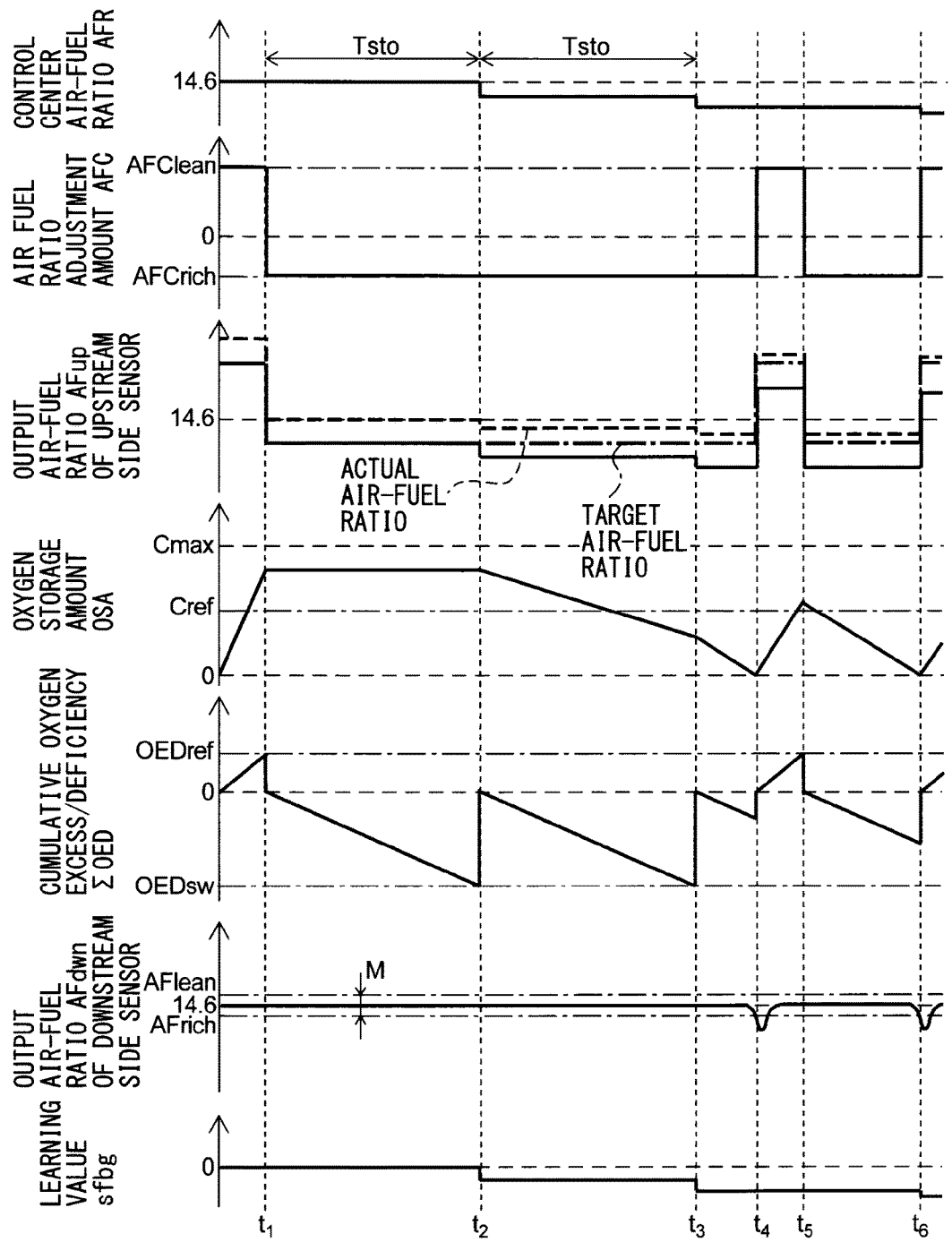
FIG. 12 is a time chart of the air-fuel ratio adjustment amount, etc., when performing stoichiometric air-fuel ratio stuck learning.

In this regard, the air-fuel ratio region between the rich judged air-fuel ratio AFrich and the lean judged air-fuel ratio AFlean will be referred to as the "the stoichiometric air-fuel ratio proximity region M". In stoichiometric air-fuel ratio-stuck learning control, after the air-fuel ratio adjustment amount AFC is switched to the rich set adjustment amount AFCrich, that is, after the target air-fuel ratio is switched to the rich set air-fuel ratio, it is judged if the output air-fuel ratio AFdwn of the downstream side air-fuel ratio sensor 41 has been maintained in the stoichiometric air-fuel ratio proximity region M for a predetermined stoichiometric air-fuel ratio maintenance judgement time or more. Further, if the output air-fuel ratio AFdwn of the downstream side air-fuel ratio sensor 41 has been maintained in the stoichiometric air-fuel ratio proximity region M for the stoichiometric air-fuel ratio maintenance judgement time or more, the learning value sfbg is reduced so that the air-fuel ratio of the exhaust gas flowing into the upstream side exhaust purification catalyst 20 changes to the rich side. FIG. 12 shows this state.

FIG. 12 is a view similar to FIG. 7 which shows a time chart of the air-fuel ratio adjustment amount AFC, etc. FIG. 12, similarly to FIG. 10, shows the case where the output air-fuel ratio AFup of the upstream side air-fuel ratio sensor 40 greatly deviates to the low side (rich side).

In the example shown in FIG. 12, similarly to FIG. 10, before the time $t_1$, the air-fuel ratio adjustment amount AFC is set to the lean set adjustment amount AFClean. Then, at the time t1, the cumulative oxygen excess/deficiency ΣOED reaches the switching reference value OEDref, and the air-fuel ratio adjustment amount AFC is switched to the rich set adjustment amount AFCrich. However, since the output air-fuel ratio of the upstream side air-fuel ratio sensor 40 greatly deviates to the rich side, similarly to the example shown in FIG. 10, the actual air-fuel ratio of the exhaust gas is substantially the stoichiometric air-fuel ratio. Therefore, after the time $t_1$, the oxygen storage amount OSA of the upstream side exhaust purification catalyst 20 is maintained at a constant value. Therefore, the output air-fuel ratio AFdwn of the downstream side air-fuel ratio sensor 41 is maintained in the stoichiometric air-fuel ratio proximity region M, for a long time period.

Therefore, in the embodiment of the present invention, if the output air-fuel ratio AFdwn of the downstream side air-fuel ratio sensor 41 is maintained in the stoichiometric air-fuel ratio proximity region M for the predetermined stoichiometric air-fuel ratio maintenance judgement time Tsto or more after the air-fuel ratio adjustment amount AFC is switched to the rich set adjustment amount AFCrich, the control center air-fuel ratio AFR is corrected. In the embodiment of the present invention, at this time, the learning value sfbg is updated so that the air-fuel ratio of the exhaust gas flowing into the upstream side exhaust purification catalyst 20 changes to the rich side.

Specifically, in the present embodiment, the learning value sfbg is calculated by the following formula (4), and the control center air-fuel ratio AFR is corrected by the above formula (3).

$$sfbg(n)=sfbg(n-1)+k_2 \cdot AFCrich \quad (4)$$

Note that in the above formula (4), $k_2$ is the gain which shows the extent of correction of the control center air-fuel ratio AFR ($0<k_2 \leq 1$). The larger the value of the gain $k_2$, the larger the correction amount of the control center air-fuel ratio AFR becomes.

In this regard, as explained above, if the output air-fuel ratio AFdwn of the downstream side air-fuel ratio sensor 41 is maintained in the stoichiometric air-fuel ratio proximity region M for a long period of time after the air-fuel ratio adjustment amount AFC is switched, the actual air-fuel ratio of the exhaust gas is a value close to substantially the stoichiometric air-fuel ratio. Therefore, the deviation at the upstream side air-fuel ratio sensor 40 is the same extent as the difference between the control center air-fuel ratio (stoichiometric air-fuel ratio) and the target air-fuel ratio (in this case, the rich set air-fuel ratio). In the embodiment of the present invention, as shown in the above formula (4), the learning value sfbg is updated based on the air-fuel ratio adjustment amount AFC corresponding to the difference between the control center air-fuel ratio and the target air-fuel ratio. Due to this, it is possible to more suitably compensate for deviation in the output air-fuel ratio of the upstream side air-fuel ratio sensor 40.

In the example shown in FIG. 12, at the time $t_2$ at which the stoichiometric air-fuel ratio maintenance judgement time Tsto elapses from the time $t_1$, the air-fuel ratio adjustment amount AFC is set to the rich set adjustment amount AFCrich. Therefore, as will be understood from formula (4), at the time $t_2$, the learning value sfbg is decreased. As a result, the actual air-fuel ratio of the exhaust gas flowing into the upstream side exhaust purification catalyst 20 changes to the rich side. Due to this, after the time $t_2$, the deviation of the actual air-fuel ratio of the exhaust gas flowing into the upstream side exhaust purification catalyst 20 from the target air-fuel ratio becomes smaller compared with before the time $t_2$. Therefore, after the time $t_2$, the difference between the broken line which shows the actual air-fuel ratio and the one-dot chain line which shows the target air-fuel ratio becomes smaller than the difference before the time $t_2$.

In the example shown in FIG. 12, the gain $k_2$ is set to a relatively small value. Therefore, even if the learning value sfbg is updated at the time $t_2$, deviation of the actual air-fuel ratio of the exhaust gas flowing into the upstream side exhaust purification catalyst 20, from the target air-fuel ratio, remains. Therefore, the actual air-fuel ratio of the exhaust gas becomes an air-fuel ratio which is leaner than the rich set air-fuel ratio, that is, an air-fuel ratio with a small rich degree (see broken line of FIG. 12). For this reason, the decreasing speed of the oxygen storage amount OSA of the upstream side exhaust purification catalyst 20 is slow.

As a result, from the time $t_2$ to the time $t_3$ when the stoichiometric air-fuel ratio maintenance judgement time Tsto elapses, the output air-fuel ratio AFdwn of the downstream side air-fuel ratio sensor 41 is maintained in the stoichiometric air-fuel ratio proximity region M. Therefore, in the example shown in FIG. 12, even at the time $t_3$, the learning value sfbg is updated by using formula (4). Then, in the example shown in FIG. 12, at the time $t_4$, the output air-fuel ratio AFdwn of the downstream side air-fuel ratio sensor 41 becomes the rich judged air-fuel ratio AFrich or less. After the output air-fuel ratio AFdwn becomes the rich judged air-fuel ratio AFrich or less in this way, as explained above, the air-fuel ratio adjustment amount AFC is alternately set to the lean set adjustment amount AFClean and the rich set adjustment amount AFCrich. At this time, the above-mentioned normal learning control, i.e., the leaning value update control is performed.

By updating the learning value sfbg by the stoichiometric air-fuel ratio stuck learning control in this way, the learning value can be updated even when the deviation of the output air-fuel ratio AFup of the upstream side air-fuel ratio sensor 40 is large. Due to this, it is possible to correct deviation at the output air-fuel ratio of the upstream side air-fuel ratio sensor 40.

Note that in the above embodiment, the stoichiometric air-fuel ratio maintenance judgement time Tsto is a predetermined time. In this case, the stoichiometric air-fuel ratio maintenance judgement time is set to equal to or greater than the time usually taken from when switching the target air-fuel ratio to the rich air-fuel ratio to when the absolute value of the cumulative oxygen excess/deficiency ΣOED reaches the maximum storable oxygen amount of the upstream side exhaust purification catalyst 20 at the time when it is unused. Specifically, it is preferably set to two to four times of that time.

On the other hand, the stoichiometric air-fuel ratio maintenance judgement time Tsto may be changed in accordance with other parameters, such as the cumulative oxygen excess/deficiency ΣOED from when the target air-fuel ratio is switched to the rich air-fuel ratio. Specifically, for example, the greater the cumulative oxygen excess/deficiency ΣOED, the shorter the stoichiometric air-fuel ratio maintenance judgement time Tsto is set. Due to this, it is also possible to update the learning value sfbg as stated above when the cumulative oxygen excess/deficiency ΣOED from when the target air-fuel ratio is switched to the rich air-fuel ratio becomes a given amount (for example, OEDsw in FIG. 12).

<Rich/Lean Stuck Learning>

Figure 13:
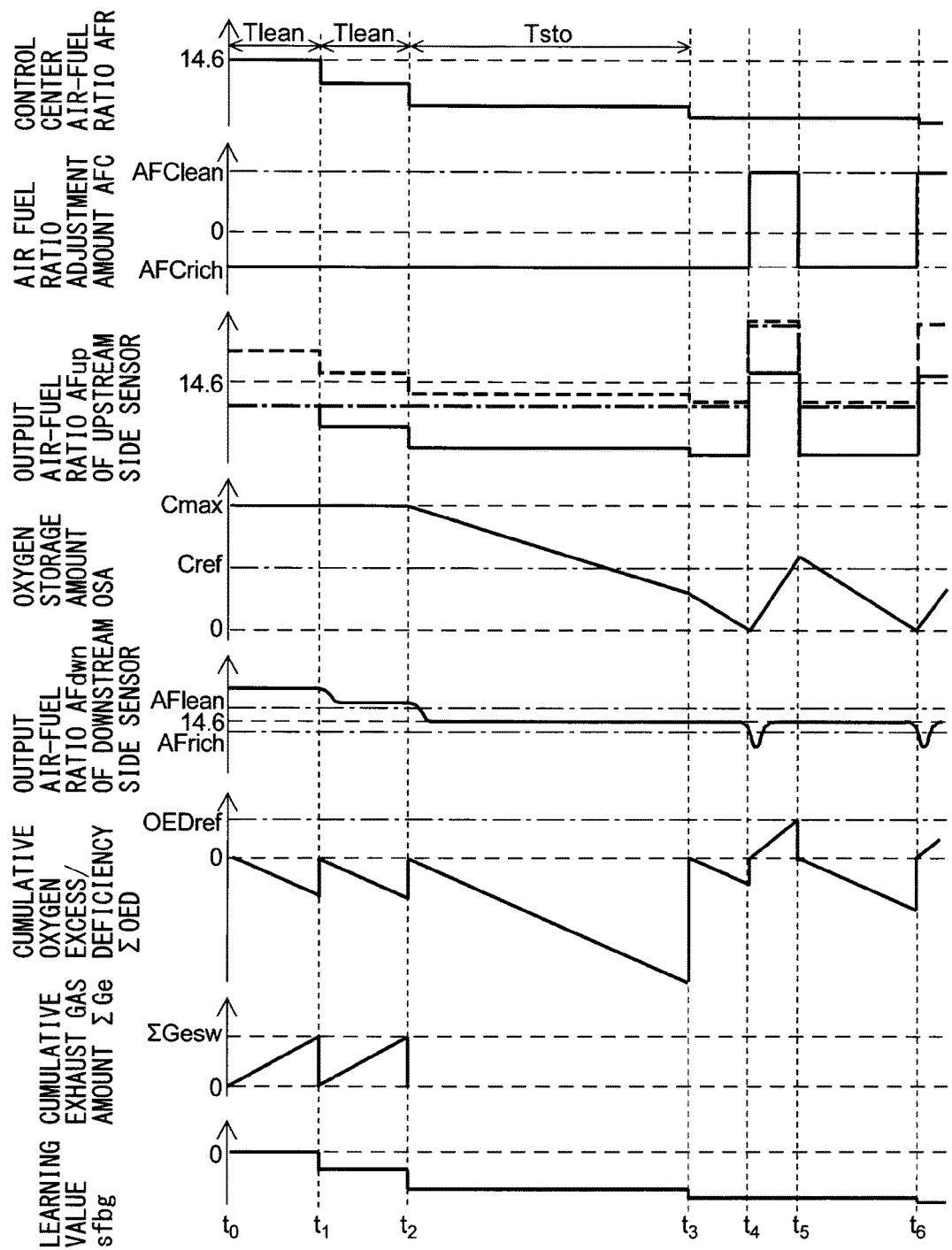
FIG. 13 is a time chart of air-fuel ratio adjustment amount etc. when performing lean stuck learning, etc.

Next, lean stuck learning control will be explained. The lean stuck learning control is learning control which is performed where, as shown in the example of FIG. 11, although the target air-fuel ratio is set to the rich air-fuel ratio, the output air-fuel ratio of the downstream side air-fuel ratio sensor 41 is stuck at the lean air-fuel ratio. In lean stuck learning control, it is judged if the output air-fuel ratio AFdwn of the downstream side air-fuel ratio sensor 41 has been maintained at the lean air-fuel ratio for a predetermined lean air-fuel ratio maintenance judgement time or more after the air-fuel ratio adjustment amount AFC is switched to the rich set adjustment amount AFCrich, that is, after the target air-fuel ratio is switched to the rich set air-fuel ratio. Further, when it is maintained at the lean air-fuel ratio for the lean air-fuel ratio maintenance judgement time or more, the learning value sfbg is decreased so that the air-fuel ratio of the exhaust gas flowing into the upstream side exhaust purification catalyst 20 changes to the rich side. FIG. 13 shows this state.

FIG. 13 is a view, similar to FIG. 9, which shows a time chart of the air-fuel ratio adjustment amount AFC, etc. FIG. 13, like FIG. 11, shows the case where the output air-fuel ratio AFup of the upstream side air-fuel ratio sensor 40 deviates extremely greatly to the low side (rich side).

In the example shown in FIG. 13, at the time $t_0$, the air-fuel ratio adjustment amount AFC is switched from the lean set adjustment amount AFClean to the rich set adjustment amount AFCrich. However, since the output air-fuel ratio of the upstream side air-fuel ratio sensor 40 deviates extremely greatly to the rich side, similarly to the example shown in FIG. 11, the actual air-fuel ratio of the exhaust gas becomes the lean air-fuel ratio. Therefore, after the time $t_0$, the output air-fuel ratio AFdwn of the downstream side air-fuel ratio sensor 41 is maintained at the lean air-fuel ratio.

Therefore, in the embodiment of the present invention, when the output air-fuel ratio AFdwn of the downstream side air-fuel ratio sensor 41 has been maintained at the lean air-fuel ratio for the predetermined lean air-fuel ratio maintenance judgement time Tlean or more after the air-fuel ratio adjustment amount AFC is set to the rich set adjustment amount AFCrich, the control center air-fuel ratio AFR is corrected. In this case, in the embodiment of the present invention, the learning value sfbg is corrected so that the air-fuel ratio of the exhaust gas flowing into the upstream side exhaust purification catalyst 20 changes to the rich side.

Specifically, in the embodiment of the present invention, the learning value sfbg is calculated by using the following formula (5) and the control center air-fuel ratio AFR is corrected based on the learning value sfbg by using the above formula (3).

$$sfbg(n)=sfbg(n-1)+k_3 \cdot (AFCrich-(AFdwn-14.6)) \qquad (5)$$

Note that in the above formula (5), $k_3$ is the gain which expresses the extent of correction of the control center air-fuel ratio AFR ($0<k_3 \leq 1$). The larger the value of the gain $k_3$, the larger the correction amount of the control center air-fuel ratio AFR.

In this regard, in the example shown in FIG. 13, when the air-fuel ratio adjustment amount AFC is set at the rich set adjustment amount AFCrich, the output air-fuel ratio AFdwn of the downstream side air-fuel ratio sensor 41 is maintained at the lean air-fuel ratio. In this case, the deviation in the upstream side air-fuel ratio sensor 40 corresponds to the difference between the target air-fuel ratio and the output air-fuel ratio of the downstream side air-fuel ratio sensor 41. If breaking this down, the deviation in the upstream side air-fuel ratio sensor 40 can be said to be of the same extent as a value acquired by adding the difference between the target air-fuel ratio and the stoichiometric air-fuel ratio (corresponding to the rich set adjustment amount AFCrich) to the difference between the stoichiometric air-fuel ratio and the output air-fuel ratio of the downstream side air-fuel ratio sensor 41. Therefore, in the embodiment of the present invention, as shown in the above formula (5), the learning value sfbg is updated based on the value acquired by adding the rich set adjustment amount AFCrich to the difference between the output air-fuel ratio of the downstream side air-fuel ratio sensor 41 and the stoichiometric air-fuel ratio. In particular, in the above-mentioned stoichiometric air-fuel ratio stuck learning, the learning value is corrected by an amount corresponding to the rich set adjustment amount AFCrich, while in lean stuck learning, the learning value is corrected by this amount plus a value corresponding to the output air-fuel ratio AFdwn of the downstream side air-fuel ratio sensor 41. Further, the gain $k_3$ is set to a similar extent to the gain $k_2$. Therefore, the correction amount in the lean stuck learning is larger than the correction amount in stoichiometric air-fuel ratio stuck learning.

In the example shown in FIG. 13, as will be understood from the formula (5), the learning value sfbg is decreased at the time $t_1$. As a result, the actual air-fuel ratio of the exhaust gas flowing into the upstream side exhaust purification catalyst 20 changes to the rich side. Due to this, after the time $t_1$, the deviation of the actual air-fuel ratio of the exhaust gas flowing into the upstream side exhaust purification catalyst 20 from the target air-fuel ratio becomes smaller, compared with before the time $t_1$. Therefore, after the time $t_1$, the difference between the broken line which shows the actual air-fuel ratio and the one-dot chain line which shows the target air-fuel ratio becomes smaller than the difference before the time $t_1$.

In FIG. 13 shows the example where the gain $k_3$ is set to relatively small value. Therefore, even if the learning value sfbg is updated at the time $t_1$, the deviation remains in the output air-fuel ratio of the upstream side air-fuel ratio sensor 40. In particular, in the example shown in FIG. 13, the actual air-fuel ratio of the exhaust gas remains to be the lean air-fuel ratio. As a result, in the illustrated example, after the time $t_1$, the output air-fuel ratio AFdwn of the downstream side air-fuel ratio sensor 41 is maintained at the lean air-fuel ratio for the lean air-fuel ratio maintenance judgement time Tlean. Therefore, in the example shown in FIG. 13, at the time $t_2$, due to the lean stuck learning, the learning value sfbg is corrected by using the above formula (5).

If, at the time $t_2$, the learning value sfbg is corrected, the deviation of the actual air-fuel ratio of the exhaust gas flowing into the upstream side exhaust purification catalyst 20, from the target air-fuel ratio, becomes smaller. Due to this, in the example shown in FIG. 13, after the time $t_2$, the actual air-fuel ratio of the exhaust gas becomes slightly richer than the stoichiometric air-fuel ratio. Along with this, the output air-fuel ratio AFdwn of the downstream side air-fuel ratio sensor 41 changes from the lean air-fuel ratio to substantially the stoichiometric air-fuel ratio. Further, in the example shown in FIG. 13, from the time $t_2$ to the time $t_3$, the output air-fuel ratio AFdwn of the downstream side air-fuel ratio sensor 41 is maintained at substantially the stoichiometric air-fuel ratio, that is, in the stoichiometric air-fuel ratio proximity region M, for the stoichiometric air-fuel ratio maintenance judgement time Tsto. Therefore, at the time $t_3$, by the stoichiometric air-fuel ratio stuck learning, the learning value sfbg is corrected by using the above formula (4).

By updating the learning value sfbg in this way by lean stuck learning control, it is possible to update the learning value even when the deviation of the output air-fuel ratio AFup of the upstream side air-fuel ratio sensor 40 is extremely large. Due to this, it is possible to reduce the deviation in the output air-fuel ratio of the upstream side air-fuel ratio sensor 40.

Note that, in the above mentioned embodiment, the lean air-fuel ratio maintenance judgement time Tlean is a predetermined time. In this case, the lean air-fuel ratio maintenance judgement time Tlean is set to equal to or greater than the delayed response time of the downstream side air-fuel ratio sensor which is usually taken from when switching the target air-fuel ratio to the rich air-fuel ratio to when the output air-fuel ratio of the downstream side air-fuel ratio sensor 41 changes to the rich air-fuel ratio. Specifically, it is preferably set to two times to four times of that time. Further, the lean air-fuel ratio maintenance judgement time Tlean is shorter than the time usually taken from when switching the target air-fuel ratio to the rich air-fuel ratio to when the absolute value of the cumulative oxygen excess/deficiency ΣOED reaches the maximum storable oxygen amount of the upstream side exhaust purification catalyst 20 at the time when the catalyst is new. Therefore, the lean air-fuel ratio maintenance judgement time Tlean is set shorter than the above-mentioned stoichiometric air-fuel ratio maintenance judgement time Tsto.

On the other hand, the lean air-fuel ratio maintenance judgement time Tlean may be changed in accordance with another parameter, such as the exhaust gas flow amount which is cumulatively added from when the target air-fuel ratio is switched to the rich air-fuel ratio. Specifically, for example, the larger the cumulative exhaust gas flow amount ΣGe, the shorter the lean air-fuel ratio maintenance judgement time Tlean is set. Due to this, when the cumulative exhaust gas flow from when switching the target air-fuel ratio to the rich air-fuel ratio, becomes a given amount (for example, ΣGesw), the above-mentioned learning value sfbg can be updated. Further, in this case, the given amount has to be equal to or greater than the total amount of flow of the exhaust gas which is required from when switching the target air-fuel ratio to when the output air-fuel ratio of the downstream side air-fuel ratio sensor 41 changes according to the switch. Specifically, it is preferably set to an amount of 2 to 4 times of that total flow.

Next, rich stuck learning control will be explained. The rich stuck learning control is control similar to the lean stuck learning control, and is learning control which is performed when although the target air-fuel ratio is set to the lean air-fuel ratio, the output air-fuel ratio of the downstream side air-fuel ratio sensor 41 is stuck at the rich air-fuel ratio. In rich stuck learning control, it is judged if the output air-fuel ratio AFdwn of the downstream side air-fuel ratio sensor 41 is maintained at the rich air-fuel ratio for a predetermined rich air-fuel ratio maintenance judgement time (similar to lean air-fuel ratio maintenance judgement time) or more, after switching the air-fuel ratio adjustment amount AFC to the lean set adjustment amount AFClean, i.e., after switching the target air-fuel ratio to the lean set air-fuel ratio. Further, when maintained at the rich air-fuel ratio for the rich air-fuel ratio maintenance judgement time or more, the learning value sfbg is increased so that the air-fuel ratio of the exhaust gas flowing into the upstream side exhaust purification catalyst 20 changes to the lean side. That is, in rich stuck learning control, control is performed with rich and lean reversed from the above lean stuck learning control.

<Detection of Abnormality of Downstream Side Air-Fuel Ratio Sensor>

Now then, up to here, the basic air-fuel ratio control, normal learning control, that is, learning value update control or stuck learning control, has been explained predicated on the downstream side air-fuel ratio sensor 41 being normal. From the explanation up to here, it will be learned that so long as the downstream side air-fuel ratio sensor 41 is normal, even if the output air-fuel ratio of the upstream side air-fuel ratio sensor 40 deviates, by normal learning control, that is, learning value update control or stuck learning control, the deviation of the output air-fuel ratio of the upstream side air-fuel ratio sensor 40 is corrected and thus the air-fuel ratio of the exhaust gas flowing into the upstream side exhaust purification catalyst 20 accurately match the targeted set air-fuel ratio. However, when the downstream side air-fuel ratio sensor 41 has become abnormal, it becomes difficult to make the air-fuel ratio of the exhaust gas flowing into the upstream side exhaust purification catalyst 20 accurately match the targeted set air-fuel ratio. Therefore, if the downstream side air-fuel ratio sensor 41 becomes abnormal, it is necessary to immediately detect that the downstream side air-fuel ratio sensor 41 has become abnormal.

However, in this case, it is found that if, in addition to the basic air-fuel ratio control, normal learning control, that is, learning value update control or stuck learning control, is performed, it is possible to detect if the downstream side air-fuel ratio sensor 41 has become abnormal, based on the behavior of the learning value sfbg at this time. Next, a new method of detecting an abnormality of the downstream side air-fuel ratio sensor will be explained. An air-fuel ratio sensor is normally inserted from the outside into a mounting hole which is formed in the exhaust pipe so that the sensor detection part is positioned in the exhaust gas. The surroundings of the sensor detection part are enclosed by a tubular protective cover. In this case, the air-fuel ratio sensor is secured air-tightly in the mounting hole of the exhaust pipe, but if time elapses, sometimes the outside air leaks in to the surroundings of the sensor detection part in the protective cover through this air-tight securing part. The same is true for the downstream side air-fuel ratio sensor 41 which is used in the embodiment of the present invention.

In this regard, in an embodiment of the present invention, the exhaust gas discharged from the upstream side exhaust purification catalyst 20 usually has the stoichiometric air-fuel ratio. Therefore, the output air-fuel ratio of the downstream side air-fuel ratio sensor 41 normally should be the stoichiometric air-fuel ratio. However, as explained above, if outside air leaks in to the surroundings of sensor detection part in the protective cover, even if the actual air-fuel ratio of the exhaust gas were the stoichiometric air-fuel ratio, the air-fuel ratio detected by the downstream side air-fuel ratio sensor 41 would become lean, and the output of the downstream side air-fuel ratio sensor 41 would deviate to the lean side. If, in this way, the downstream side air-fuel ratio sensor has the abnormality that the output of the downstream side air-fuel ratio sensor 41 deviates to the lean side, the air-fuel ratio of the exhaust gas flowing into the upstream side exhaust purification catalyst 20 can no longer be made to accurately match the targeted set air-fuel ratio. In this case, the output of the downstream side air-fuel ratio sensor 41 sometimes becomes abnormal that the output deviates to the rich side due to some reason or another, but in actuality the output of the downstream side air-fuel ratio sensor 41 often deviates to the lean side. Therefore, below, the case where the output of the downstream side air-fuel ratio sensor 41 deviates to the lean side will be used as an example to explain the method of detecting abnormality in a downstream side air-fuel ratio sensor.

Figure 14:
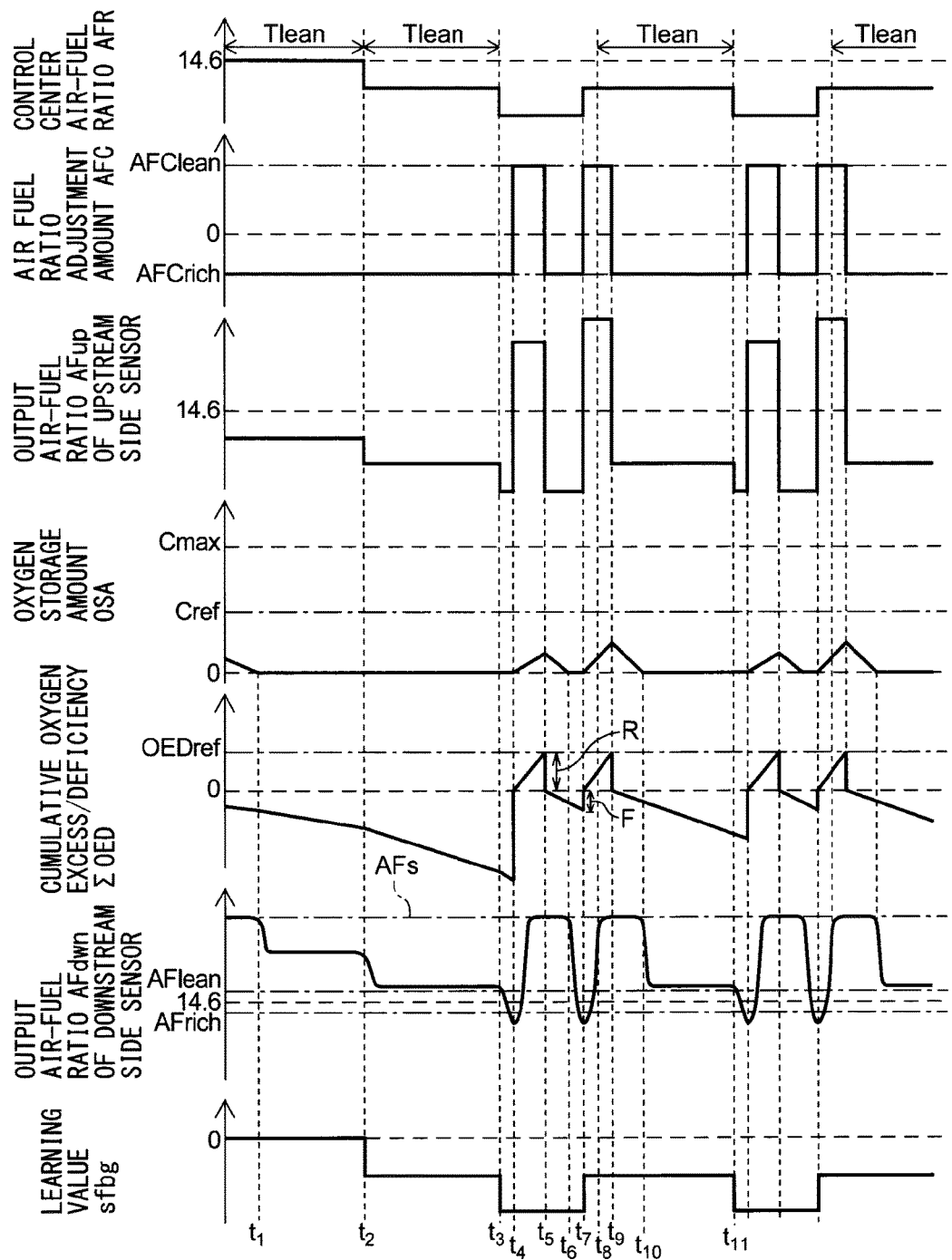
FIG. 14 is a time chart of the air-fuel ratio adjustment amount, etc., when detecting an abnormality of the downstream side air-fuel ratio sensor according to the present invention.

FIG. 14 shows a time chart of a first example in the case where the output of the downstream side air-fuel ratio sensor 41 deviates to the lean side. This FIG. 14 is a view which is similar to FIG. 9. FIG. 14 shows changes in the control center air-fuel ratio AFR, air-fuel ratio adjustment amount AFC, output air-fuel ratio AFup of the upstream side air-fuel ratio sensor 40, oxygen storage amount OSA of the upstream side exhaust purification catalyst 20, cumulative oxygen excess/deficiency ΣOED, output air-fuel ratio AFdwn of the downstream side air-fuel ratio sensor 41, and learning value sfbg. Further, in FIG. 14, Tlean indicates a lean air-fuel ratio maintenance judgment time, which is the same as the lean air-fuel ratio maintenance judgment time Tlean shown in FIG. 13. Note that, in the abnormality detection method of the downstream side air-fuel ratio sensor 41 which is shown in FIG. 14, regardless of the output air-fuel ratio of the upstream side air-fuel ratio sensor 40 deviating to the lean side or deviating to the rich side, it is possible to detect abnormality of the downstream side air-fuel ratio sensor 41. However, to facilitate understanding of the present invention, first the case where the output air-fuel ratio of the upstream side air-fuel ratio sensor 40 does not deviate will be explained while referring to FIG. 14.

In the example shown in FIG. 14, in the same way as FIG. 9, at the state before the time $t_1$, the control center air-fuel ratio AFR is set to the stoichiometric air-fuel ratio, and the air-fuel ratio adjustment amount AFC is set to the rich set adjustment amount AFCrich. At this time, the output air-fuel ratio AFup of the upstream side air-fuel ratio sensor 40, as shown by the solid line, is an air-fuel ratio corresponding to the rich set air-fuel ratio. On the other hand, since, in the state before the time $t_1$, the oxygen storage amount OSA of the upstream side exhaust purification catalyst 20 is a positive value, the actual air-fuel ratio of the exhaust gas flowing out from the upstream side exhaust purification catalyst 20 is the stoichiometric air-fuel ratio. However, at this time, the output air-fuel ratio AFdwn of the downstream side air-fuel ratio sensor 41 deviates to the lean side and, as shown in FIG. 14, is the lean air-fuel ratio AFs. That is, FIG. 14 shows the abnormal state where the output air-fuel ratio AFdwn of the downstream side air-fuel ratio sensor 41 indicates the lean air-fuel ratio AFs when the actual air-fuel ratio of the exhaust gas flowing toward the downstream side air-fuel ratio sensor 41 is the stoichiometric air-fuel ratio.

Next, if the oxygen storage amount OSA of the upstream side exhaust purification catalyst 20 gradually decreases and becomes zero at the time $t_1$, the upstream side exhaust purification catalyst 20 can no longer supply oxygen for reducing the HC and CO, and therefore the air-fuel ratio of the exhaust gas flowing out from the upstream side exhaust purification catalyst 20 becomes the rich air-fuel ratio which is indicated by the output air-fuel ratio AFup of the upstream side air-fuel ratio sensor 40. As a result, the output air-fuel ratio AFdwn of the downstream side air-fuel ratio sensor 41 falls, that is, changes to the rich side. FIG. 14 shows the case where even if the output air-fuel ratio AFdwn of the downstream side air-fuel ratio sensor 41 changes to the rich side in this way, the output air-fuel ratio AFdwn of the downstream side air-fuel ratio sensor 41 remains lean.

Next, at the time $t_2$, if it is judged that the output air-fuel ratio AFdwn of the downstream side air-fuel ratio sensor 41 was the lean air-fuel ratio over the predetermined lean air-fuel ratio maintenance judgment time Tlean or more, the learning value sfbg is calculated by using the formula (5) and thus the learning value sfbg is corrected so that the air-fuel ratio of the exhaust gas flowing into the upstream side exhaust purification catalyst 20 changes to the rich side.

That is, the control center air-fuel ratio AFR is decreased by exactly the calculated learning value sfbg, and thereby the output air-fuel ratio AFup of the upstream side air-fuel ratio sensor 40 falls, that is, changes to the further rich side. In other words, at this time, the learning value sfbg is decreased by stuck learning control. Note that, FIG. 14 shows the case where even if the output air-fuel ratio AFdwn of the downstream side air-fuel ratio sensor 41 changes to the rich side in this way, the output air-fuel ratio AFdwn of the downstream side air-fuel ratio sensor 41 remains lean.

Next, at the time $t_3$, if it is judged that the output air-fuel ratio AFdwn of the downstream side air-fuel ratio sensor 41 was the lean air-fuel ratio over the predetermined lean air-fuel ratio maintenance judgment time Tlean or more, the learning value sfbg is calculated by the formula (5) and thus the learning value sfbg is corrected so that air-fuel ratio of the exhaust gas flowing into the upstream side exhaust purification catalyst 20 changes to the further rich side. That is, the control center air-fuel ratio AFR is further decreased by exactly the calculated learning value sfbg and thereby the output air-fuel ratio AFup of the upstream side air-fuel ratio sensor 40 further decreases, that is, changes to the further rich side. In other words, at this time, the learning value sfbg is further decreased by stuck learning control.

In the example shown in FIG. 14, at this time, that is, if, at the time $t_3$, the learning value sfbg is further decreased by stuck learning control, the output air-fuel ratio AFdwn of the downstream side air-fuel ratio sensor 41 reaches the rich judged air-fuel ratio AFrich at the time $t_4$. If the output air-fuel ratio AFdwn of the downstream side air-fuel ratio sensor 41 reaches the rich judged air-fuel ratio AFrich, the air-fuel ratio adjustment amount AFC is switched to the lean set adjustment amount AFClean. Due to this, the output air-fuel ratio AFup of the upstream side air-fuel ratio sensor 40 becomes the lean air-fuel ratio. If the air-fuel ratio adjustment amount AFC is switched to the lean set adjustment amount AFClean, as shown in FIG. 14, the oxygen storage amount OSA of the upstream side exhaust purification catalyst 20 starts to increase and the cumulative oxygen excess/deficiency ΣOED starts to increase. When the oxygen storage amount OSA of the upstream side exhaust purification catalyst 20 becomes a positive value, the air-fuel ratio of the exhaust gas flowing out from the upstream side exhaust purification catalyst 20 becomes the stoichiometric air-fuel ratio. Therefore, at this time, the output air-fuel ratio AFdwn of the downstream side air-fuel ratio sensor 41 indicates the lean air-fuel ratio AFs.

After the time $t_4$, as will be understood from the output air-fuel ratio AFup of the upstream side air-fuel ratio sensor 40, the actual air-fuel ratio of the exhaust gas becomes an air-fuel ratio with a considerably lower lean degree than the lean set air-fuel ratio. As a result, as shown in FIG. 14, the increasing speed of the oxygen storage amount OSA of the upstream side exhaust purification catalyst 20 becomes very low. On the other hand, the oxygen excess/deficiency is calculated based on the output air-fuel ratio AFup of the upstream side air-fuel ratio sensor 40 (more accurately, the difference between the output air-fuel ratio AFup and the control center air-fuel ratio AFR). Therefore, the cumulative oxygen excess/deficiency ΣOED rapidly increases compared with the oxygen storage amount OSA.

Next, at the time $t_5$, the cumulative oxygen excess/deficiency ΣOED reaches the switching reference value OEDref. If the cumulative oxygen excess/deficiency ΣOED reaches the switching reference value OEDref, the air-fuel ratio adjustment amount AFC is switched to the rich set adjustment amount AFCrich. Therefore, as understood from the output air-fuel ratio AFup of the upstream side air-fuel ratio sensor 40, the actual air-fuel ratio of the exhaust gas is switched to the rich air-fuel ratio. At this time, the cumulative oxygen excess/deficiency ΣOED is set to zero once and the calculation of the cumulative oxygen excess/deficiency ΣOED is restarted. Further, at this time, the oxygen storage amount OSA of the upstream side exhaust purification catalyst 20 starts to be decreased. In this regard, at this time, the actual air-fuel ratio of the exhaust gas becomes an air-fuel ratio with a considerably higher rich degree, compared with the rich set air-fuel ratio. Therefore, as shown in FIG. 14, the oxygen storage amount OSA quickly falls.

As explained above, the increasing speed of the oxygen storage amount OSA after the time $t_4$ is extremely low. As a result, when the cumulative oxygen excess/deficiency ΣOED reaches the switching reference value OEDref at the time $t_5$, the oxygen storage amount OSA becomes an extremely small amount. On the other hand, as explained above, at the time $t_5$, if the air-fuel ratio adjustment amount AFC is switched to the rich set adjustment amount AFCrich, the oxygen storage amount OSA rapidly falls. Next, when, at the time $t_6$, the oxygen storage amount OSA becomes zero, the air-fuel ratio of the exhaust gas flowing out from the upstream side exhaust purification catalyst 20 changes from the stoichiometric air-fuel ratio to a rich air-fuel ratio with a considerably rich degree. As a result, at the time $t_7$, the output air-fuel ratio AFdwn of the downstream side air-fuel ratio sensor 41 reaches the rich judged air-fuel ratio AFrich. At this time, the air-fuel ratio adjustment amount AFC is switched to the lean set adjustment amount AFClean. At this time, the cumulative oxygen excess/deficiency ΣOED is set to zero once and the calculation of the cumulative oxygen excess/deficiency ΣOED is restarted. Further, at this time, the oxygen storage amount OSA of the upstream side exhaust purification catalyst 20 starts to increase.

When in this way the actual air-fuel ratio of the exhaust gas is considerably rich, if, at the time $t_4$, the output air-fuel ratio AFdwn of the downstream side air-fuel ratio sensor 41 reaches the rich judged air-fuel ratio AFrich and thereby the air-fuel ratio adjustment amount AFC is switched to the lean set adjustment amount AFClean, then in the short time after that the cumulative oxygen excess/deficiency ΣOED again reaches the switching reference value OEDref and thus the air-fuel ratio adjustment amount AFC is again switched to the rich set adjustment amount AFCrich. If in this way the time from when the cumulative oxygen excess/deficiency ΣOED reaches the switching reference value OEDref to when the cumulative oxygen excess/deficiency ΣOED again reaches the switching reference value OEDref become shorter, as will be understood from FIG. 14, the cumulative oxygen excess/deficiency ΣOED(R) at the time $t_5$ becomes considerably larger than the cumulative oxygen excess/deficiency ΣOED(F) at the time $t_7$.

In this case, the cumulative oxygen excess/deficiency ΣOED(R) is larger than the cumulative oxygen excess/deficiency ΣOED(F), and this means that the actual air-fuel ratio of the exhaust gas has deviates from the rich set air-fuel ratio to the rich side. Therefore, at this time, due to the normal learning control, that is, the learning value update control, which was already explained with reference to FIG. 9, the learning value sfbg is increased so that the differential excess/deficiency error ΔΣOED between the absolute value of the cumulative oxygen excess/deficiency ΣOED(R) and the absolute value of the cumulative oxygen excess/deficiency ΣOED(F) becomes smaller. At this time, in the embodiment of the present invention, the learning value sfbg is calculated by using the formula (2), and the control center air-fuel ratio AFR is corrected by using the formula (3). That is, as shown in FIG. 14, at the time $t_7$, the learning value sfbg is increased and the control center air-fuel ratio AFR is increased by exactly the learning value sfbg.

If, at the time $t_7$, the air-fuel ratio adjustment amount AFC is switched to the lean set adjustment amount AFClean, at this time, the control center air-fuel ratio AFR is increased by exactly the learning value sfbg, and therefore as understood from the output air-fuel ratio AFup of the upstream side air-fuel ratio sensor 40, the actual air-fuel ratio of the exhaust gas is increased slightly, that is, is changed slightly to the lean side. Next, if, at the time $t_9$, the cumulative oxygen excess/deficiency ΣOED reaches the switching reference value OEDref, the air-fuel ratio adjustment amount AFC is again switched to the rich set adjustment amount AFCrich. At this time, the cumulative oxygen excess/deficiency ΣOED is once set to zero and the calculation of the cumulative oxygen excess/deficiency ΣOED is restarted. Further, at this time, the oxygen storage amount OSA of the upstream side exhaust purification catalyst 20 starts to decrease.

FIG. 14 shows the case where the decreasing amount of the learning value sfbg at the time $t_3$ and the increasing amount of the learning value sfbg at the time $t_7$ are substantially the same. In this case, if the air-fuel ratio adjustment amount AFC is switched to the rich set adjustment amount AFCrich at the time $t_9$ and then the oxygen storage amount OSA becomes zero at the time $t_{10}$, as will be understood from FIG. 14, the value of the control center air-fuel ratio AFR at this time becomes a value the same as the control center air-fuel ratio AFR from the time $t_2$ to the time $t_3$, and therefore the output air-fuel ratio AFdwn of the downstream side air-fuel ratio sensor 41 becomes a lean air-fuel ratio identical to the output air-fuel ratio AFdwn of the downstream side air-fuel ratio sensor 41 from the time $t_2$ to the time $t_3$. That is, the state from the time $t_2$ and the state from the time $t_{10}$ are the same state.

Therefore, if the output air-fuel ratio AFdwn of the downstream side air-fuel ratio sensor 41 becomes the lean air-fuel ratio at time $t_8$ and then it is judged that the output air-fuel ratio AFdwn of the downstream side air-fuel ratio sensor 41 has been the lean air-fuel ratio for the predetermined lean air-fuel ratio maintenance judgment time Tlean or more, at the time $t_{11}$, the learning value sfbg is again decreased by stuck learning control. Next, after the time $t_{11}$, the control center air-fuel ratio AFR, air-fuel ratio adjustment amount AFC, output air-fuel ratio AFup of the upstream side air-fuel ratio sensor 40, oxygen storage amount OSA of the upstream side exhaust purification catalyst 20, cumulative oxygen excess/deficiency ΣOED, output air-fuel ratio AFdwn of the downstream side air-fuel ratio sensor 41, and learning value sfbg repeatedly change in the same way as the change shown from the time $t_3$ to the time $t_{11}$.

In this way, when the output air-fuel ratio AFdwn of the downstream side air-fuel ratio sensor 41 deviates to the lean side, the action of decreasing the learning value sfbg by the stuck learning control and the action of increasing the learning value sfbg by the normal learning control, that is, learning value update control, are alternately repeated. Therefore, the action of decreasing the learning value sfbg and the action of increasing the learning value sfbg are alternately repeated. On the other hand, even when the output air-fuel ratio of the upstream side air-fuel ratio sensor 40 deviates to the lean side, as shown in FIG. 13, the output air-fuel ratio AFdwn of the downstream side air-fuel ratio sensor 41 deviates to the lean side. Therefore the output air-fuel ratio AFdwn of the downstream side air-fuel ratio sensor 41 deviates to the lean side, it is not known if the output air-fuel ratio of the upstream side air-fuel ratio sensor 40 has deviated to the lean side or the output air-fuel ratio AFdwn of the downstream side air-fuel ratio sensor 41 has deviated to the lean side.

However, when the output air-fuel ratio of the upstream side air-fuel ratio sensor 40 deviates to the lean side, as shown in FIG. 13, the learning value sfbg gradually decreases and converges to a certain value. That is, when the output air-fuel ratio of the upstream side air-fuel ratio sensor 40 deviates to the lean side, the action of decreasing the learning value sfbg and the action of increasing the learning value sfbg are never alternately repeated. On the other hand, when the output air-fuel ratio of the upstream side air-fuel ratio sensor 40 deviates to the rich side, the learning value sfbg gradually increases and converges to a certain value. Therefore, even when the output air-fuel ratio of the upstream side air-fuel ratio sensor 40 deviates to the rich side, the action of decreasing the learning value sfbg and the action of increasing the learning value sfbg are never alternately repeated.

Further, when the output air-fuel ratio of the upstream side air-fuel ratio sensor 40 deviates to the lean side or deviates to the rich side and the output air-fuel ratio of the downstream side air-fuel ratio sensor 41 deviates to the lean side, the alternately repeated actions of increasing and decreasing the learning value sfbg are superposed on the action of converging the learning value sfbg toward a certain value. In this case, if the correction of the output air-fuel ratio of the upstream side air-fuel ratio sensor 40, the action of converging the learning value sfbg toward a certain value is completed. Then, the action of decreasing the learning value sfbg and the action of increasing the learning value sfbg are alternately repeated based on the deviation to the lean side in the output air-fuel ratio of the downstream side air-fuel ratio sensor 41.

In this way, not only when the output air-fuel ratio of the upstream side air-fuel ratio sensor 40 is normal, but also when the output air-fuel ratio of the upstream side air-fuel ratio sensor 40 deviates to the lean side or deviates to the rich side, so long as the output air-fuel ratio of the downstream side air-fuel ratio sensor 41 does not deviate to the lean side, the action of decreasing the learning value sfbg and the action of increasing the learning value sfbg will never be alternately repeated. On the other hand, when the output air-fuel ratio of the downstream side air-fuel ratio sensor 41 deviates to the lean side, the action of decreasing the learning value sfbg and the action of increasing the learning value sfbg are alternately repeated inevitably. Therefore, when the action of decreasing the learning value sfbg and the action of increasing the learning value sfbg are alternately repeated, it can be judged that the output air-fuel ratio of the downstream side air-fuel ratio sensor 41 deviates to the lean side.

Figure 15:
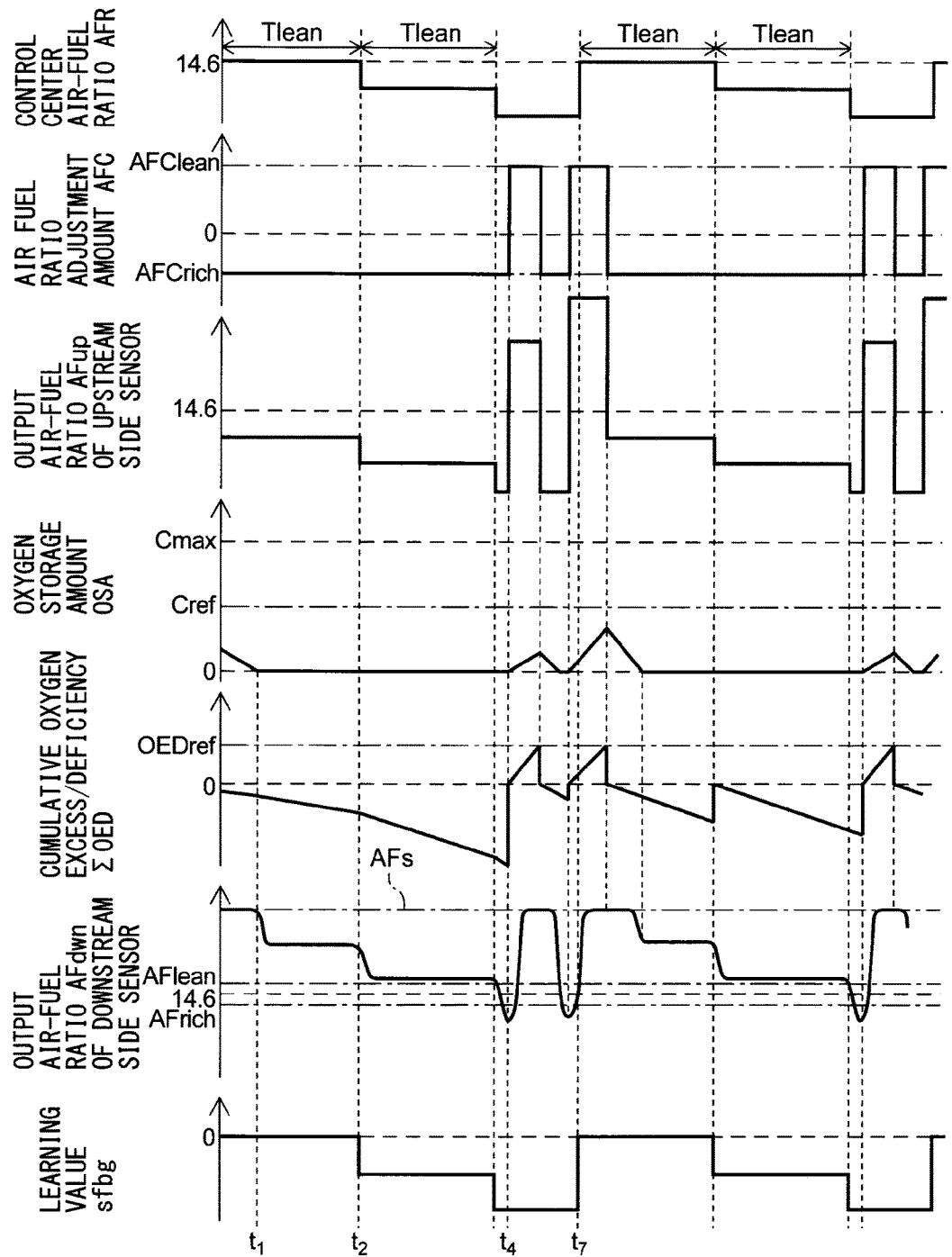
FIG. 15 is a time chart of the air-fuel ratio adjustment amount, etc., when detecting an abnormality of the downstream side air-fuel ratio sensor according to the present invention.

FIG. 15 shows the case where, at the time $t_7$ of FIG. 14, the learning value sfbg is increased by normal learning control, that is, learning value update control, and the increasing amount of the learning value sfbg is large and, as a result, the control center air-fuel ratio AFR is increased to the stoichiometric air-fuel ratio. In this case, as shown in FIG. 15, at the time $t_7$, the output air-fuel ratio AFdwn of the downstream side air-fuel ratio sensor 41 is increased to the lean air-fuel ratio AFs, then, in the same way as the time $t_1$ on, the action of decreasing the learning value sfbg is performed two times by the stuck learning control. After that, the action of increasing the learning value sfbg is performed one time by normal learning control, that is, learning value update control. That is, in this case, the action of decreasing the learning value sfbg is performed two times, then the action of increasing the learning value sfbg is performed one time, and this cycle is repeated.

Figure 16:
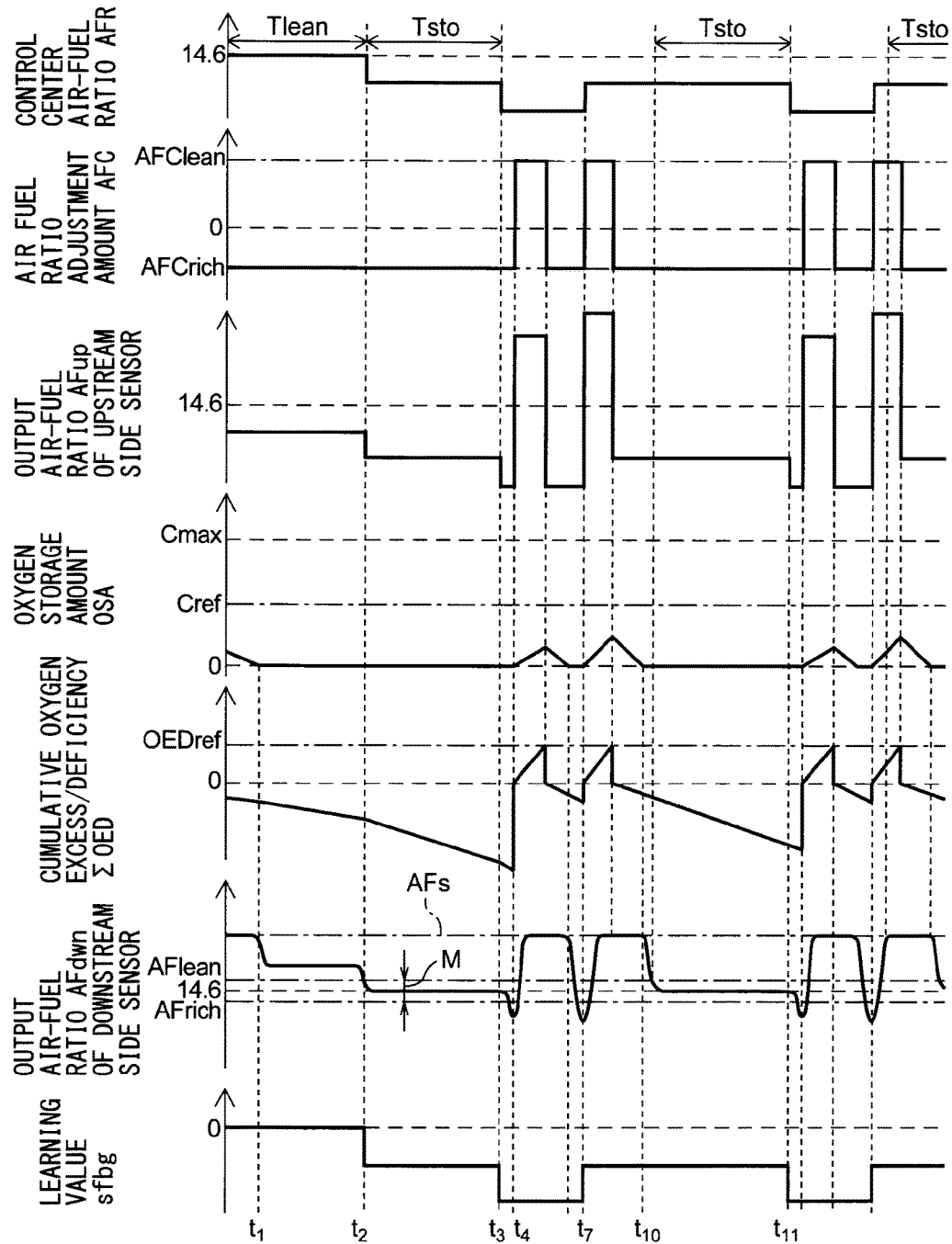
FIG. 16 is a time chart of the air-fuel ratio adjustment amount, etc., when detecting an abnormality of the downstream side air-fuel ratio sensor according to the present invention.

FIG. 16 shows the case where after the learning value sfbg is decreased by stuck learning control at the time $t_2$ of FIG. 14, the output air-fuel ratio AFdwn of the downstream side air-fuel ratio sensor 41 is maintained in the stoichiometric air-fuel ratio proximity region M for the stoichiometric air-fuel ratio maintenance judgment time Tsto, which was explained with reference to FIG. 12, or more. In this case, at the time $t_3$, the learning value sfbg is decreased by the stoichiometric air-fuel ratio stuck learning control. Next, after the output air-fuel ratio AFdwn of the downstream side air-fuel ratio sensor 41 reaches the rich judged air-fuel ratio AFrich at the time $t_4$, until the time $t_{10}$, the control center air-fuel ratio AFR, air-fuel ratio adjustment amount AFC, output air-fuel ratio AFup of the upstream side air-fuel ratio sensor 40, oxygen storage amount OSA of the upstream side exhaust purification catalyst 20, cumulative oxygen excess/deficiency ΣOED, output air-fuel ratio AFdwn of the downstream side air-fuel ratio sensor 41, and learning value sfbg change in the same way as the change shown from the time $t_4$ to the time $t_{10}$ of FIG. 14.

Next, at the time $t_{10}$, the output air-fuel ratio AFdwn of the downstream side air-fuel ratio sensor 41 falls in the stoichiometric air-fuel ratio proximity region M. Then, when the output air-fuel ratio AFdwn of the downstream side air-fuel ratio sensor 41 is maintained in the stoichiometric air-fuel ratio proximity region M for the stoichiometric air-fuel ratio maintenance judgment time Tsto or more, at the time $t_{11}$, the learning value sfbg is again decreased. Next, after the time $t_{11}$, the control center air-fuel ratio AFR, air-fuel ratio adjustment amount AFC, output air-fuel ratio AFup of the upstream side air-fuel ratio sensor 40, oxygen storage amount OSA of the upstream side exhaust purification catalyst 20, cumulative oxygen excess/deficiency ΣOED, output air-fuel ratio AFdwn of the downstream side air-fuel ratio sensor 41, and learning value sfbg are repeatedly changed in the same way as the change shown from the time $t_3$ to time $t_{11}$. Therefore, in this case as well, the action of decreasing the learning value sfbg by the stuck learning control and the action of increasing the learning value sfbg by the normal learning control, that is, the learning value update control, are alternately repeated.

As explained above, when the action of decreasing the learning value sfbg and the action of increasing the learning value sfbg are repeated, it is possible to judge that the output air-fuel ratio of the downstream side air-fuel ratio sensor 41 is deviating to the lean side, that is, the downstream side air-fuel ratio sensor 41 is abnormal. When the output air-fuel ratio of the downstream side air-fuel ratio sensor 41 deviates to the lean side, the action of decreasing the learning value sfbg and the action of increasing the learning value sfbg are repeated since stuck learning control and normal learning control, that is, learning value update control, are performed. Therefore, the abnormality detection method of the downstream side air-fuel ratio sensor 41 according to the present invention is predicated on the stuck learning control and the normal learning control, that is, the learning value update control, being performed.

In this case, regarding the stuck learning control, when performing stuck learning control several times (in some cases, first time), the output air-fuel ratio AFdwn of the downstream side air-fuel ratio sensor 41 has to reach the rich judged air-fuel ratio AFrich. Therefore, the amount of decrease of the learning value sfbg by the stuck learning control is set so that the output air-fuel ratio AFdwn of the downstream side air-fuel ratio sensor 41 can reach the rich judged air-fuel ratio AFrich when stuck learning control is being performed. On the other hand, regarding the normal learning control, that is, the learning value update control, it is necessary to perform stuck learning control after performing normal learning control, that is, learning value update control. Therefore, the amount of increase of the learning value sfbg by the normal learning control, that is, learning value update control, is set so that stuck learning control is performed after normal learning control, that is, learning value update control, is performed.

In this regard, in the example shown in FIGS. 14 and 16, when the output air-fuel ratio of the downstream side air-fuel ratio sensor 41 deviates to the lean side, the action of decreasing the learning value sfbg and the action of increasing the learning value sfbg are alternately repeated. As opposed to this, in the example shown in FIG. 15, when the output air-fuel ratio of the downstream side air-fuel ratio sensor 41 deviates to the lean side, the action of decreasing the learning value sfbg and the action of increasing the learning value sfbg are not alternately repeated. The action of decreasing the learning value sfbg is performed two times, then the action of increasing the learning value sfbg is performed one time, and then this is repeated. In this case as well, the action of decreasing the learning value sfbg and the action of increasing the learning value sfbg are deemed to be repeated.

Note that, even when normal learning control, that is, learning value update control, is being performed, sometimes the learning value sfbg is repeatedly increased and decreased, since the learning value sfbg will not easily converge. However, the amount of decrease and amount of increase of the learning value sfbg in this case are considerably smaller than the amount of decrease in the learning value sfbg by the stuck learning control and the amount of increase of the learning value sfbg by normal learning control, that is, learning value update control. Therefore, in this case, when the learning value sfbg decreases by a predetermined certain value or more, and the learning value sfbg increases by a predetermined certain value or more, and this is repeated, it can be judged that the output air-fuel ratio of the downstream side air-fuel ratio sensor 41 has deviated to the lean side. That is, when a certain value or more of decrease of the learning value sfbg and a certain value or more of increase of the learning value sfbg are repeated, it can be judged that the downstream side air-fuel ratio sensor 41 is abnormal. These certain values are intermediate values between the amount of decrease and amount of increase of the learning value sfbg when normal learning control, that is, learning value update control, is being performed and the amount of decrease and amount of increase of the learning value sfbg when stuck learning control and normal learning control, that is, learning value update control, are repeated, and are determined by experiments, etc.

Therefore, according to the method of detecting an abnormality of the air-fuel ratio sensor according to the present invention, the method comprises: alternately switching a target air-fuel ratio of exhaust gas flowing into the exhaust purification catalyst 20 which has an oxygen storage ability, between a rich set air-fuel ratio, which is richer than a stoichiometric air-fuel ratio, and a lean set air-fuel ratio, which is leaner than the stoichiometric air-fuel ratio; detecting the air-fuel ratio of the exhaust gas flowing out from the exhaust purification catalyst 20 by the downstream side air-fuel ratio sensor 41; learning an air-fuel ratio correction value which is required for making the air-fuel ratio of the exhaust gas flowing into the exhaust purification catalyst 20 approach the target air-fuel ratio based on the air-fuel ratio which was detected by the downstream side air-fuel ratio sensor 41; and controlling the air-fuel ratio of the exhaust gas flowing into the exhaust purification catalyst 20 to the target air-fuel ratio by feedback control by using the learning value sfbg of the air-fuel ratio correction value which was obtained by learning; when the target air-fuel ratio is set to the rich set air-fuel ratio, if the air-fuel ratio detected by the downstream side air-fuel ratio sensor 41 is maintained lean for a predetermined time period, performing stuck learning control for lowering the learning value sfbg so as to make the air-fuel ratio of the exhaust gas flowing into the exhaust purification catalyst 20 smaller; performing learning value update control for making the learning value sfbg increase when it is judged that the air-fuel ratio of the exhaust gas flowing into the exhaust purification catalyst 20 deviates from the target air-fuel ratio to the rich side, and making the learning value sfbg decrease when it is judged that the air-fuel ratio of the exhaust gas flowing into the exhaust purification catalyst 20 deviates from the target air-fuel ratio to the lean side, based on the air-fuel ratio which was detected by the downstream side air-fuel ratio sensor 41; and judging the downstream side air-fuel ratio sensor is abnormal when a certain value or more of decrease of the learning value sfbg and a certain value or more of increase sfbg of the learning value are repeated.

On the other hand, in the embodiment of the present invention, when the air-fuel ratio detected by the downstream side air-fuel ratio sensor 41 becomes a predetermined lean judged air-fuel ratio AFlean or more, it is judged that the air-fuel ratio AFdwn detected by the downstream side air-fuel ratio sensor 41 has become lean. When the air-fuel ratio detected by the downstream side air-fuel ratio sensor 41 becomes a predetermined rich judged air-fuel ratio AFrich or less, it is judged that the air-fuel ratio AFdwn detected by the downstream side air-fuel ratio sensor 41 has become rich. Further, in the case shown in FIG. 14 and FIG. 15, due to stuck learning control, when the target air-fuel ratio is set to the rich set air-fuel ratio and the air-fuel ratio AFdwn detected by the downstream side air-fuel ratio sensor 41 is maintained lean at the lean judged air-fuel ratio AFlean or more for a predetermined time period Tlean, the learning value sfbg is decreased. Further, in the case shown in FIG. 16, due to the stuck learning control, when the target air-fuel ratio is set to the rich set air-fuel ratio and the air-fuel ratio AFdwn detected by the downstream side air-fuel ratio sensor 41 is maintained between the rich judged air-fuel ratio AFrich and the lean judged air-fuel ratio AFlean for a predetermined time period Tsto, the learning value sfbg is decreased so as to make the air-fuel ratio of the exhaust gas flowing into the exhaust purification catalyst 20 smaller.

Further, in the embodiment of the present invention, the target air-fuel ratio is switched to the lean set air-fuel ratio when the air-fuel ratio AFdwn detected by the downstream side air-fuel ratio sensor 41 becomes the rich judged air-fuel ratio AFrich or less, and the target air-fuel ratio is switched to the rich set air-fuel ratio when the oxygen storage amount OSA of the exhaust purification catalyst 20 becomes a predetermined switching reference storage amount Cref, which is smaller than the maximum storable oxygen amount Cmax, or more. Normal learning control, that is, the learning value update control, is performed when the air-fuel ratio AFdwn detected by the downstream side air-fuel ratio sensor 41 reaches the rich judged air-fuel ratio AFrich, that is, becomes the rich judged air-fuel ratio AFrich or less.

In this case, in this embodiment according to the present invention, when the target air-fuel ratio is lean, the oxygen amount which is stored per unit time in the exhaust purification catalyst 20 if the air-fuel ratio of the exhaust gas flowing into the exhaust purification catalyst 20 is the target air-fuel ratio, is cumulatively added as the oxygen excess/deficiency, while when the target air-fuel ratio is rich, the oxygen amount which is released per unit time from the exhaust purification catalyst 20 if the air-fuel ratio of the exhaust gas flowing into the exhaust purification catalyst 20 is the target air-fuel ratio, is cumulatively added as the oxygen excess/deficiency. The normal learning control, that is, the learning value update control, updates the learning value sfbg so that the difference between the cumulative value $\Sigma OED$ of oxygen excess/deficiency which is cumulatively added from when the target air-fuel ratio is switched to the lean set air-fuel ratio to when the oxygen storage amount OSA of the exhaust purification catalyst 20 becomes the switching reference storage amount Cref or more and the cumulative value $\Sigma OED$ of the oxygen excess/deficiency which is cumulatively added from when the target air-fuel ratio is switched to the rich set air-fuel ratio to when the air-fuel ratio detected by the downstream side air-fuel ratio sensor 41 becomes the rich judged air-fuel ratio AFrich or less becomes smaller.

Further, in the case shown in FIGS. 14 and 16, when the output air-fuel ratio of the downstream side air-fuel ratio sensor 41 deviates to the lean side, the action of decreasing the learning value sfbg and the action of increasing the learning value sfbg are alternately repeated. Therefore, in one embodiment according to the present invention, when a certain value of decrease of the learning value sfbg and a certain value of increase of the learning value sfbg are alternately repeated, it is judged that the downstream side air-fuel ratio sensor 41 is abnormal. Note that, as explained above, since the learning value sfbg does not easily converge, sometimes the learning value sfbg repeatedly increases and decreases. To clearly differentiate the above from such a case, in the embodiment of the present invention, it is judged that the downstream side air-fuel ratio sensor 41 is abnormal when the learning value sfbg is decreased by a certain value or more by stuck leaning control.

Figure 17:
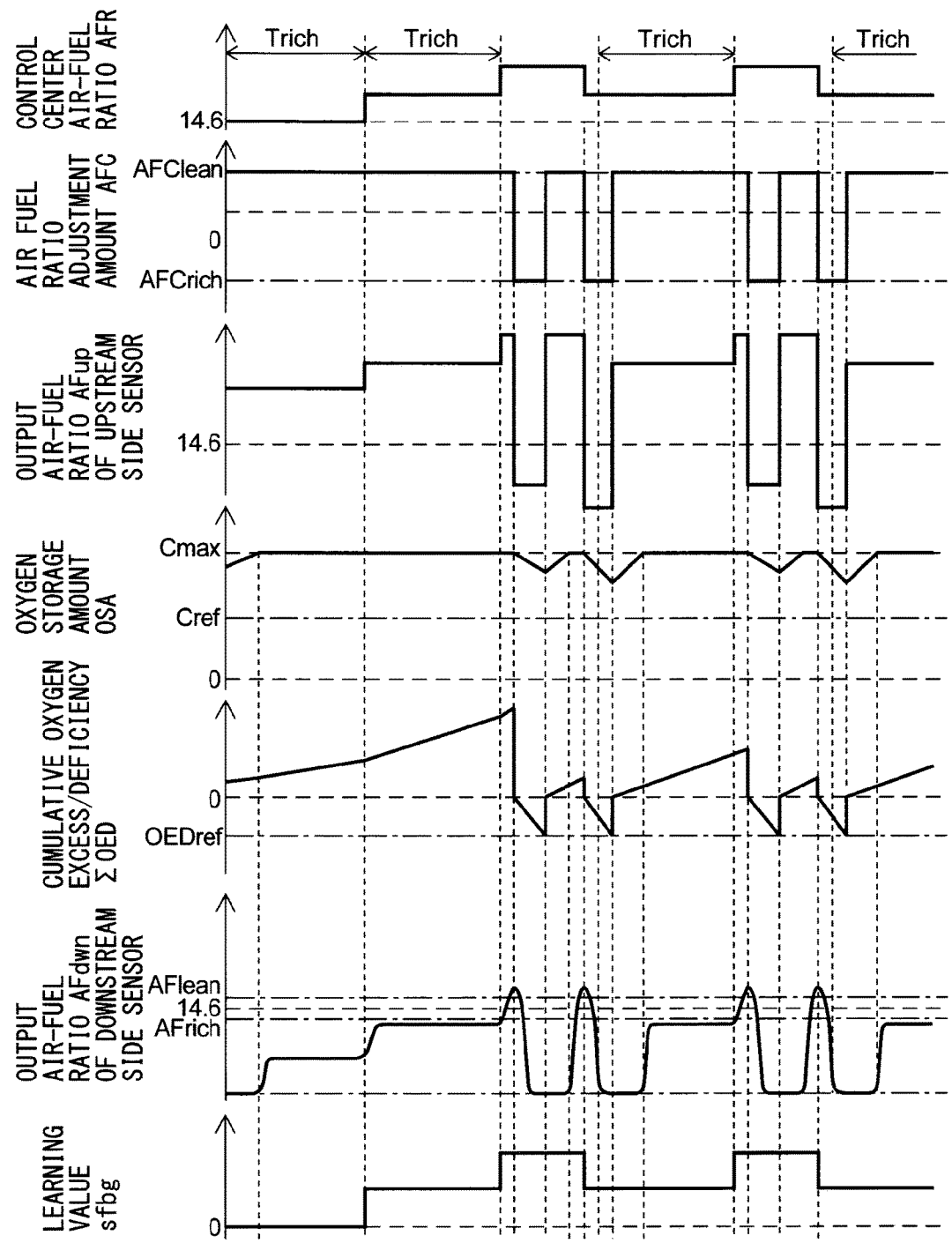
FIG. 17 is a time chart of the air-fuel ratio adjustment amount, etc., when detecting an abnormality of the downstream side air-fuel ratio sensor according to the present invention.
Figure 18:
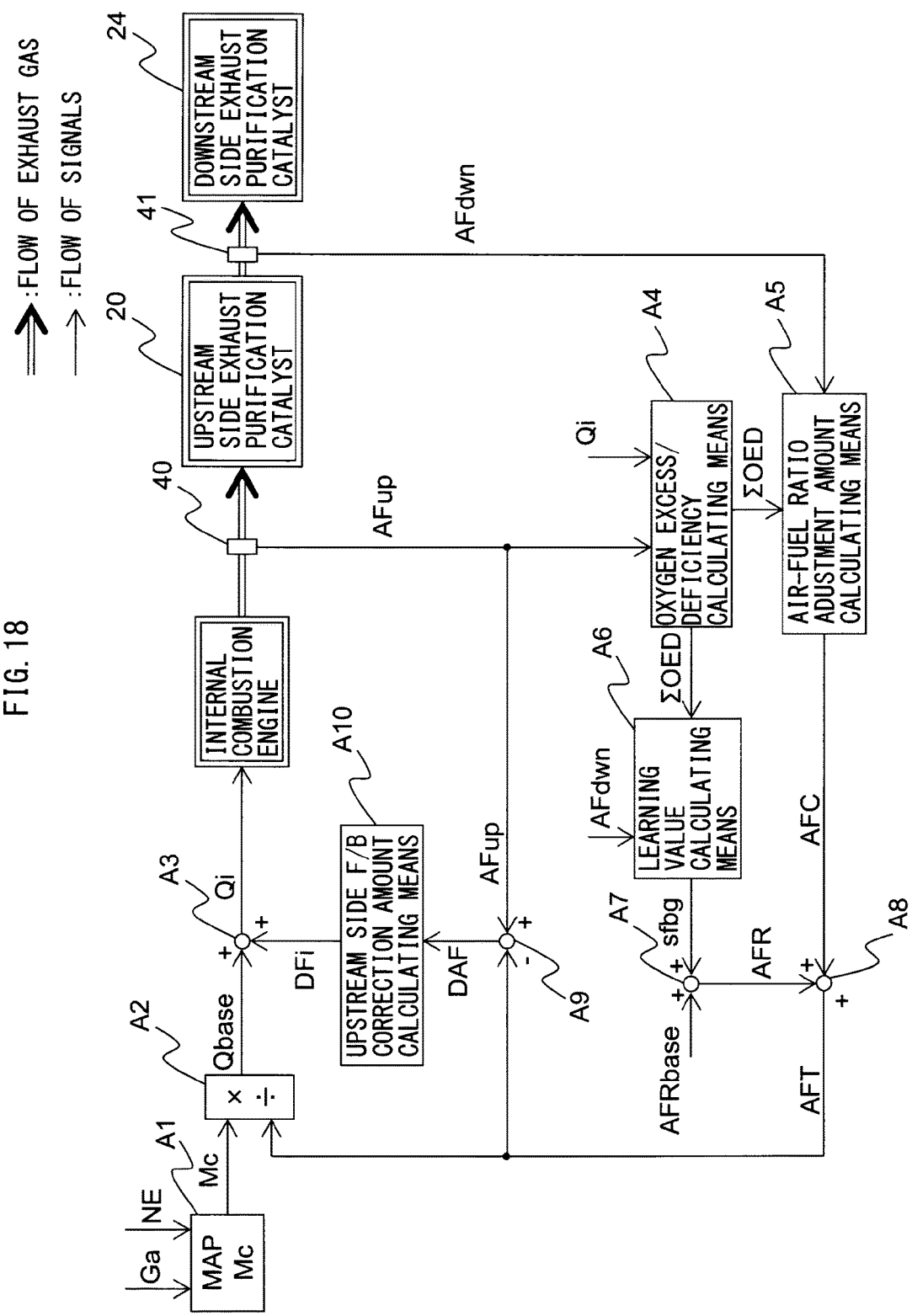
FIG. 18 is a functional block diagram of a control device.

On the other hand, FIG. 17 shows the changes in the control center air-fuel ratio AFR, air-fuel ratio adjustment amount AFC, output air-fuel ratio AFup of the upstream side air-fuel ratio sensor 40, oxygen storage amount OSA of the upstream side exhaust purification catalyst 20, cumulative oxygen excess/deficiency $\Sigma OED$, output air-fuel ratio AFdwn of the downstream side air-fuel ratio sensor 41, and learning value sfbg, in the case where, when the output air-fuel ratio AFdwn of the downstream side air-fuel ratio sensor 41 becomes the lean judged air-fuel ratio AFlean or more, the air-fuel ratio adjustment amount AFC is switched to the rich set adjustment amount AFCrich (corresponding to rich set air-fuel ratio) so as to decrease the oxygen storage amount OSA, and the output air-fuel ratio AFdwn of the downstream side air-fuel ratio sensor 41 deviates to the rich side. In this case, the above-mentioned rich stuck learning control is used, and it is judged if the output air-fuel ratio AFdwn of the downstream side air-fuel ratio sensor 41 has been maintained at the rich air-fuel ratio for a predetermined rich air-fuel ratio maintenance judgment time Trich or more. As a result, when it is judged that the output air-fuel ratio AFdwn of the downstream side air-fuel ratio sensor 41 has been maintained at the rich air-fuel ratio for the predetermined rich air-fuel ratio maintenance judgment time Trich or more, the learning value sfbg is increased so that the air-fuel ratio of the exhaust gas flowing into the upstream side exhaust purification catalyst 20 changes to the lean side. That is, in rich stuck learning control, control in which the rich and lean is reversed with respect to the above-mentioned lean stuck learning control, is performed.

In the case shown in FIG. 17 as well, the action of increase of the learning value sfbg by the rich stuck learning control and the action of decrease of the normal learning control, that is, learning value update control, are alternately repeated. Therefore, in this case as well, when the action of increase of the learning value sfbg and the action of decrease of the learning value sfbg are alternately repeated, it can be judged that the output air-fuel ratio of the downstream side air-fuel ratio sensor 41 has deviated to the rich side, that is, that the downstream side air-fuel ratio sensor 41 is abnormal.

<Explanation of Specific Control>

Next, referring to FIGS. 18 to 23, the air-fuel ratio control device which is used in the embodiment of the present invention will be specifically explained. The air-fuel ratio control device which is used in the embodiment of the present invention is configured so as to include the functional blocks A1 to A11, as shown in the block diagram of FIG. 18. Below, while referring to FIG. 18, the different functional blocks will be explained. The operations of these functional blocks A1 to A11 are basically executed by the ECU 31.

<Calculation of Fuel Injection Amount>

First, calculation of the fuel injection amount will be explained. In calculating the fuel injection amount, the cylinder intake air calculating means A1, basic fuel injection calculating means A2, and fuel injection calculating means A3 are used.

The cylinder intake air calculating means A1 calculates the intake air amount Mc to each cylinder based on the intake air flow rate Ga, engine speed NE, and map or calculation formula which is stored in the ROM 34 of the ECU 31. The intake air flow rate Ga is measured by the intake air flow detecting device 39, and the engine speed NE is calculated based on the output of the crank angle sensor 44.

The basic fuel injection calculating means A2 divides the intake air amount Mc to each cylinder, which was calculated by the cylinder intake air calculating means A1, by the target air-fuel ratio AFT to calculate the basic fuel injection amount Qbase (Qbase=Mc/AFT). The target air-fuel ratio AFT is calculated by the later explained target air-fuel ratio setting means A8.

The fuel injection calculating means A3 adds the later explained F/B correction amount DQi to the basic fuel injection amount Qbase which was calculated by the basic fuel injection calculating means A2, to calculate the fuel injection amount Qi (Qi=Qbase+DQi). An injection is instructed to the fuel injector 11 so that fuel of the thus calculated fuel injection amount Qi is injected from the fuel injector 11.

<Calculation of Target Air Fuel Ratio>

Next, calculation of the target air-fuel ratio will be explained. In calculating the target air-fuel ratio, oxygen excess/deficiency calculating means A4, air-fuel ratio adjustment amount calculating means A5, learning value calculating means A6, control center air-fuel ratio calculating means A7, and target air-fuel ratio setting means A8 are used.

The oxygen excess/deficiency calculating means A4 calculates the cumulative oxygen excess/deficiency ΣOED, based on the fuel injection amount Qi calculated by the fuel injection calculating means A3 and the output air-fuel ration AFup of the upstream side air-fuel ratio sensor 40. For example, the oxygen excess/deficiency calculating means A4 calculates the cumulative oxygen excess/deficiency ΣOED, by multiplying the deference between the output air-fuel ratio of the upstream side air-fuel ratio and the control center air-fuel ratio by the fuel injection amount Qi, and by cumulatively adding the products.

The air-fuel ratio adjustment amount calculating means A5 calculates the air-fuel ratio adjustment amount AFC of the target air-fuel ratio, based on the cumulative oxygen excess/deficiency ΣOED calculated by the oxygen excess/deficiency calculating means A4 and the output air-fuel ratio AFdwn of the downstream side air-fuel ratio sensor 41. Specifically, the air-fuel ratio adjustment amount AFC is calculated based on the flow chart shown in FIG. 19.

The learning value calculating means A6 calculates the learning value sfbg, based on the output air-fuel ratio AFdwn of the downstream side air-fuel ratio sensor 41 and the cumulative oxygen excess/deficiency ΣOED calculated by the oxygen excess/deficiency calculating means A4, etc. Specifically, the learning value sfbg is calculated based on the flow chart of the normal leaning control, i.e., the leaning value update control shown in FIG. 20 and the stack leaning control shown in FIG. 21. The leaning value sfbg calculated in such a way is stored in a memory of the RAM 33 of ECU 31, which does not delete data even if an ignition key is turned to OFF.

The control center air-fuel ratio calculating means A7 calculates the control center air-fuel ratio AFR, based on the basic control center air-fuel ratio AFRbase and the learning value sfbg which was calculated by the learning value calculating means A6. Specifically, the control center air-fuel ratio AFR is calculated by adding the leaning value sfbg to the basic control center air-fuel ratio AFRbase, as shown in the above-mentioned formula (3).

The target air-fuel ratio setting means A8 adds the air-fuel ratio adjustment amount AFC which was calculated by the target air-fuel ratio correction calculating means A5 to the control center air-fuel ratio AFR which was calculated by the control center air-fuel ratio calculating means A7, to calculate the target air-fuel ratio AFT. The thus calculated target air-fuel ratio AFT is input to the basic fuel injection calculating means A2 and later explained air-fuel ratio deviation calculating means A9.

<Calculation of F/B Correction Amount>

Next, calculation of the F/B correction amount based on the output air-fuel ratio AFup of the upstream side air-fuel ratio sensor 40 will be explained. In calculating the F/B correction amount, air-fuel ratio deviation calculating means A9, and F/B correction calculating means A10 are used.

The air-fuel ratio deviation calculating means A9 subtracts the target air-fuel ratio AFT which was calculated by the target air-fuel ratio setting means A8 from the output air-fuel ratio AFup of the upstream side air-fuel ratio sensor 40 to calculate the air-fuel ratio deviation DAF (DAF=AFup−AFT). This air-fuel ratio deviation DAF is a value which expresses the excess/deficiency of the amount of fuel feed to the target air-fuel ratio AFT.

The F/B correction calculating means A10 processes the air-fuel ratio deviation DAF which was calculated by the air-fuel ratio deviation calculating means A9 by proportional integral derivative processing (PID processing) to calculate the F/B correction amount DFi for compensating for the excess/deficiency of the fuel feed amount based on the following formula (6). The thus calculated F/B correction amount DFi is input to the fuel injection calculating means A3.

$$DFi = Kp \cdot DAF + Ki \cdot SDAF + Kd \cdot DDAF \quad (6)$$

Note that, in the above formula (6), Kp is a preset proportional gain (proportional constant), Ki is a preset integral gain (integral constant), and Kd is a preset derivative gain (derivative constant). Further, DDAF is the time derivative of the air-fuel ratio deviation DAF and is calculated by dividing the difference between the currently updated air-fuel ratio deviation DAF and the previously updated air-fuel ratio deviation DAF by a time corresponding to the updating interval. Further, SDAF is the time integral of the air-fuel ratio deviation DAF. This time derivative DDAF is calculated by adding the currently updated air-fuel ratio deviation DAF to the previously updated time integral DDAF (SDAF=DDAF+DAF).

<Flow Chart of Air-Fuel Ratio Adjustment Amount Calculation Control>

Figure 19:
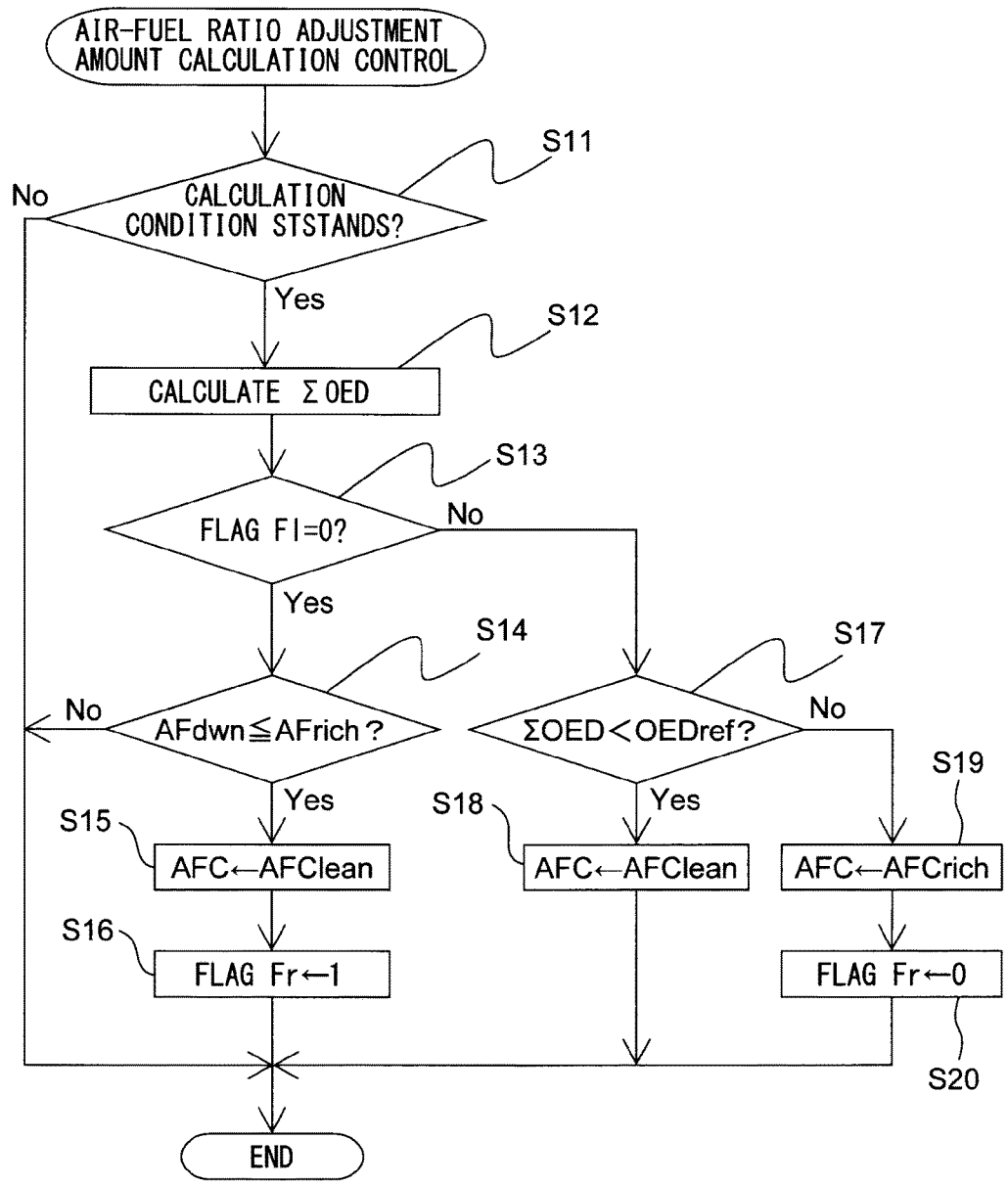
FIG. 19 is a flow chart which shows a control routine of control for calculation of an air-fuel ratio adjustment amount.

FIG. 19 shows the control routine for calculation of the air-fuel ratio adjustment amount AFC. This control routine is performed by interruption every certain time interval.

As shown in FIG. 19, first, at step S11, it is judged if the condition for calculation of the air-fuel ratio adjustment amount AFC stands. The case where the condition for calculation of the air-fuel ratio adjustment amount AFC stands is, for example, in the case where normal operation, in which a feedback control is performed, is performed, such as in the case where fuel injection stop control is not performed. When it is judged at step S11 that the condition for calculation of the air-fuel ratio adjustment amount AFC stands, the routine proceeds to step S12. At step S12, the cumulative oxygen excess/deficiency ΣOED is calculated based on the output air-fuel ratio AFup and the fuel injection amount Qi.

Next, at step S13, it is judged if the lean set flag Fr is set to "0". The lean set flag Fr is a flag which is set to "1" when the air-fuel ratio adjustment amount AFC is set to the lean set adjustment amount AFClean, and is set to "0" otherwise. When it is judged at step S13 that the lean set flag Fr is set to "0", the routine proceeds to step S14. At step S14, it is judged if the output air-fuel ratio AFdwn of the downstream side air-fuel ratio sensor 41 is the rich judged air-fuel ratio AFrich or less. If it is judged that the output air-fuel ratio AFdwn of the downstream side air-fuel ratio sensor 41 is larger than the rich judged air-fuel ratio AFrich, the processing cycle is ended.

On the other hand, if the oxygen storage amount OSA of the upstream side exhaust purification catalyst 20 decrease and thus the air-fuel ratio of the exhaust gas flowing out from the upstream side exhaust purification catalyst 20 falls, it is judged that the output air-fuel ratio AFdwn of the downstream side air-fuel ratio sensor 41 is the rich judged air-fuel ratio AFrich or less. In this case, the routine proceeds to step S15, and the air-fuel ratio adjustment amount AFC is set to the lean set adjustment amount AFClean. Next, at step S16, the lean set flag Fr is set "1", then the processing cycle is ended.

In the next processing cycle, at step S13, it is judged that the lean set flag Fr is not set to "0", and thus the routine proceeds to step S17. In step S17, it is judged if the cumulative oxygen excess/deficiency ΣOED calculated at step S12 is lower than the judgement reference value OEDref. If it is judged that the cumulative oxygen excess/deficiency ΣOED is lower than the judgement reference value OEDref, the routine proceeds to step S18, and the air-fuel ratio adjustment amount AFC is continuously set to the lean set adjustment amount AFClean. On the other hand, if the oxygen storage amount of the upstream side exhaust purification catalyst 20 increases, finally, it is judged at step S17 that the cumulative oxygen excess/deficiency ΣOED is equal to or greater than the judgement reference value OEDref, and thus the routine proceeds to step S19. At step S19, the air-fuel ratio adjustment amount AFC is set to the rich set adjustment amount AFCrich. Next, at step S20, the lean set flag Fr is reset to "0". Next, the control routine is ended.

<Flow Chart of Normal Learning Control, i.e., Learning Value Update Control>

Figure 20:
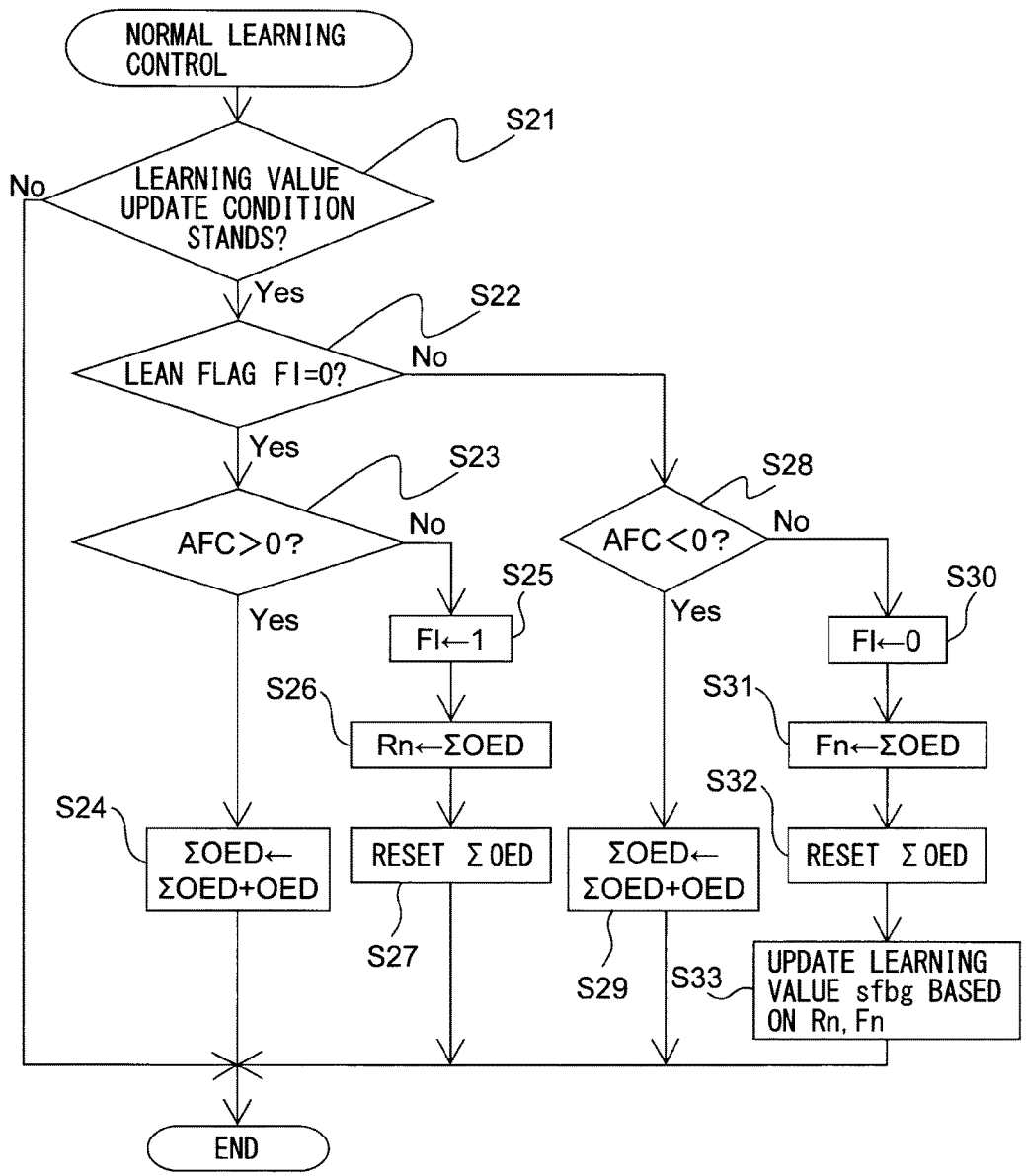
FIG. 20 is a flow chart which shows a control routine of normal learning control.

FIG. 20 shows the control routine of normal leaning control, i.e., leaning value update control. This control routine is also performed by interruption every certain time interval.

As shown in FIG. 20, first, at step S21, it is judged if the condition for updating the learning value sfbg stands. As the case when the condition for updating stands, for example, normal control being performed, and the stuck leaning control routine shown in FIG. 21 not being performed, etc., may be mentioned. When it is judged at step S21 that the condition for updating the learning value sfbg stands, the routine proceeds to step S22. At step S22, it is judged if the lean flag Fl has been set to "0". When it is judged at step S22 that the lean flag Fl has been set to "0", the routine proceeds to step S23.

At step S23, it is judged if the air-fuel ratio adjustment amount AFC is larger than 0, that is, if the target air-fuel ratio is a lean air-fuel ratio. If, at step S23, it is judged that the air-fuel ratio adjustment amount AFC is larger than 0, the routine proceeds to step S24. At step S24, the cumulative oxygen excess/deficiency ΣOED is increased by the current oxygen excess/deficiency OED.

Then, if the target air-fuel ratio is switched to the rich air-fuel ratio, at the next control routine, at step S23, it is judged if the base air-fuel ratio adjustment amount AFCbase is 0 or less and thus the routine proceeds to step S25. At step S25, the lean flag Fl is set to "1", next, at step S26, Rn is made the absolute value of the current cumulative oxygen excess/deficiency ΣOED. Next, at step S27, the cumulative oxygen excess/deficiency ΣOED is reset to 0 and then the processing cycle is ended.

On the other hand, if the lean flag Fl is set to "1", at the next control routine, the routine proceeds from step S22 to step S28. At step S28, it is judged if the air-fuel ratio adjustment amount AFC is smaller than 0, that is, the target air-fuel ratio is the rich air-fuel ratio. When it is judged at step S28 that the air-fuel ratio adjustment amount AFC is smaller than 0, the routine proceeds to step S29. At step S29, the cumulative oxygen excess/deficiency ΣOED is increased by the current oxygen excess/deficiency OED.

Then, if the target air-fuel ratio is switched to the lean air-fuel ratio, at step S28 of the next control routine, it is judged that the air-fuel ratio adjustment amount AFC is 0 or more, then the routine proceeds to step S30. At step S30, the lean flag Fr is set to "0", then, at step S31, Fn is set to the absolute value of the current cumulative oxygen excess/deficiency ΣOED. Next, at step S32, the cumulative oxygen excess/deficiency ΣOED is reset to 0. Next, at step S33, the the learning value sfbg is updated based on Rn which was calculated at step S26 and the Fn which was calculated at step S31, then the processing cycle is ended.

<Flow Chart of Stuck Learning Control>

Figure 21:
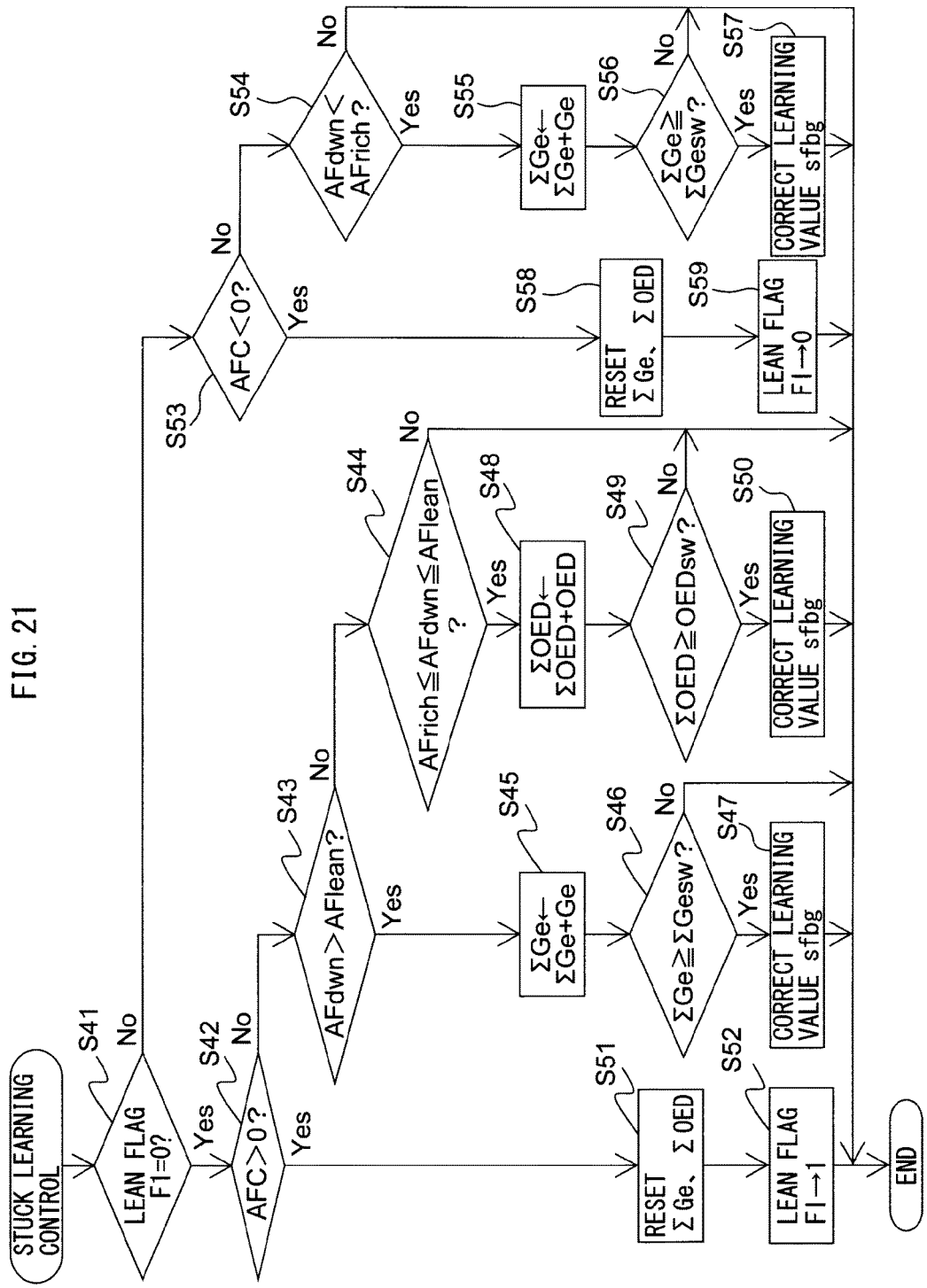
FIG. 21 is a flow chart which shows a control routine of stuck learning control.

FIG. 21 shows the control routine of stuck learning control (stoichiometric air-fuel ratio stuck control, rich stuck control, and lean stuck control). This routine is performed by interruption every certain time interval.

As shown in FIG. 21, first, at step S41, it is judged if the lean flag Fl is set to "0". If it is judged, at step S41, that the lean flag Fl is set to "0", the routine proceeds to step S42. At step S42, it is judged if the air-fuel ratio adjustment amount AFC is larger than 0, that is, if the target air-fuel ratio is the lean air-fuel ratio. If it is judged at step S42 that the air-fuel ratio adjustment amount AFC is 0 or less, the routine proceeds to step S43.

At step S43, it is judged if the output air-fuel ratio AFdwn of the downstream side air-fuel ratio sensor 41 is larger than the lean judged air-fuel ratio AFlean, and at step S44, it is judged if the output air-fuel ratio AFdwn is a value between the rich judged air-fuel ratio AFrich and the lean judged air-fuel ratio AFlean. If it is judged at steps S43 and S44 that the output air-fuel ratio AFdwn is smaller than the rich judged air-fuel ratio AFrich, that is, if it is judged that the output air-fuel ratio is the rich air-fuel ratio, the processing cycle is ended. On the hand, if it is judged at steps S43 and S44 that the output air-fuel ratio AFdwn is larger than the lean judged air-fuel ratio AFlean, that is, if it is judged that the output air-fuel ratio is the lean air-fuel ratio, the routine proceeds to step S45.

At step S45, the new cumulative exhaust gas flow amount ΣGe is set to a sum acquired by adding the current exhaust gas flow amount Ge to the cumulative exhaust gas flow amount ΣGe. Note that, the cumulative exhaust gas flow amount ΣGe is calculated, for example, based on the intake air flow detecting device 39. Next, at step S46, it is judged if the cumulative exhaust gas flow amount ΣGe which was calculated at step S45 is the predetermined amount ΣGesw or more. If, at step S45, it is judged that ΣGe is smaller than ΣGesw, the processing cycle is ended. On the other hand, if the cumulative exhaust gas flow amount ΣGe increases and thus, at step S46, it is judged that ΣGe is ΣGesw or more, the routine proceeds to step S47. At step S47, the learning value sfbg is updated by using the above-mentioned formula (5).

On the other hand, when it is judged at step S44 that the output air-fuel ratio AFdwn is a value between the rich judged air-fuel ratio AFrich and the lean judged air-fuel ratio AFlean, the routine proceeds to step S48. At step S48, the new cumulative oxygen excess/deficiency ΣOED is set to a sum acquired by adding the current oxygen excess/deficiency OED to cumulative oxygen excess/deficiency ΣOED. Next, at step S49, it is judged if the cumulative oxygen excess/deficiency ΣOED which was calculated at step S48 is a predetermined amount OEDsw or more. If it is judged at step S49 that ΣOED is smaller than OEDsw, the processing cycle is ended. On the other hand, if cumulative oxygen excess/deficiency ΣOED increases and thus it is judged at step S49 that ΣOED is OEDsw or more, the routine proceeds to step S50. At step S50, the learning value sfbg is updated by using the above-mentioned formula (4).

Then, when the target air-fuel ratio is switched and it is judged at step S42 that the air-fuel ratio adjustment amount AFC is larger than 0, the routine proceeds to step S51. At step S51, the cumulative exhaust gas flow amount ΣGe and the cumulative oxygen excess/deficiency ΣOED are reset to 0. Next, at step S52, the lean flag Fl is set to "1".

If the lean flag Fl is set to "1", at the next processing cycle, the routine proceeds from step S41 to step S53. At step S53, it is judged if the air-fuel ratio adjustment amount AFC is smaller than 0, that is, if the target air-fuel ratio is the rich air-fuel ratio. When it is judged at step S53 that the air-fuel ratio adjustment amount AFC is 0 or more, the routine proceeds to step S54.

At step S54, it is judged if the output air-fuel ratio AFdwn of the downstream side air-fuel ratio sensor 41 is smaller than the rich judged air-fuel ratio AFrich. If it is judged at steps S64 that the output air-fuel ratio AFdwn is equal to or larger than the rich judged air-fuel ratio AFrich, that is, if the output air-fuel ratio is the lean air-fuel ratio, the processing cycle is ended. On the other hand, if it is judged at steps S54 that the output air-fuel ratio AFdwn is smaller than the rich judged air-fuel ratio AFrich, that is, if it is judged that the output air-fuel ratio is the rich air-fuel ratio, the routine proceeds to step S55.

At step S55, the new cumulative exhaust gas flow amount ΣGe is set to a sum acquired by adding the current exhaust gas flow amount Ge to the cumulative exhaust gas flow amount ΣGe. Next, at step S56, it is judged if the cumulative exhaust gas flow amount ΣGe which was calculated at step S55 is the predetermined amount ΣGesw or more. If at step S56 it is judged that ΣGe is smaller than ΣGesw, the processing cycle is ended. On the other hand, if the cumulative exhaust gas flow amount ΣGe increases and thus it is judged at step S56 that ΣGe is ΣGesw or more, the routine proceeds to step S57. At step S57, the learning value sfbg is updated by using the above formula (5).

Then, if the target air-fuel ratio is switched and thus it is judged at step S53 that the air-fuel ratio adjustment amount AFC is smaller than 0, the routine proceeds to step S58. At step S58, the cumulative exhaust gas flow amount ΣGe and the cumulative oxygen excess/deficiency ΣOED are reset to 0. Next, at step S59, the lean flag Fl is set to "0" and the processing cycle is ended.

<Detection of Abnormality of Air-Fuel Ratio Sensor>

Figure 22:
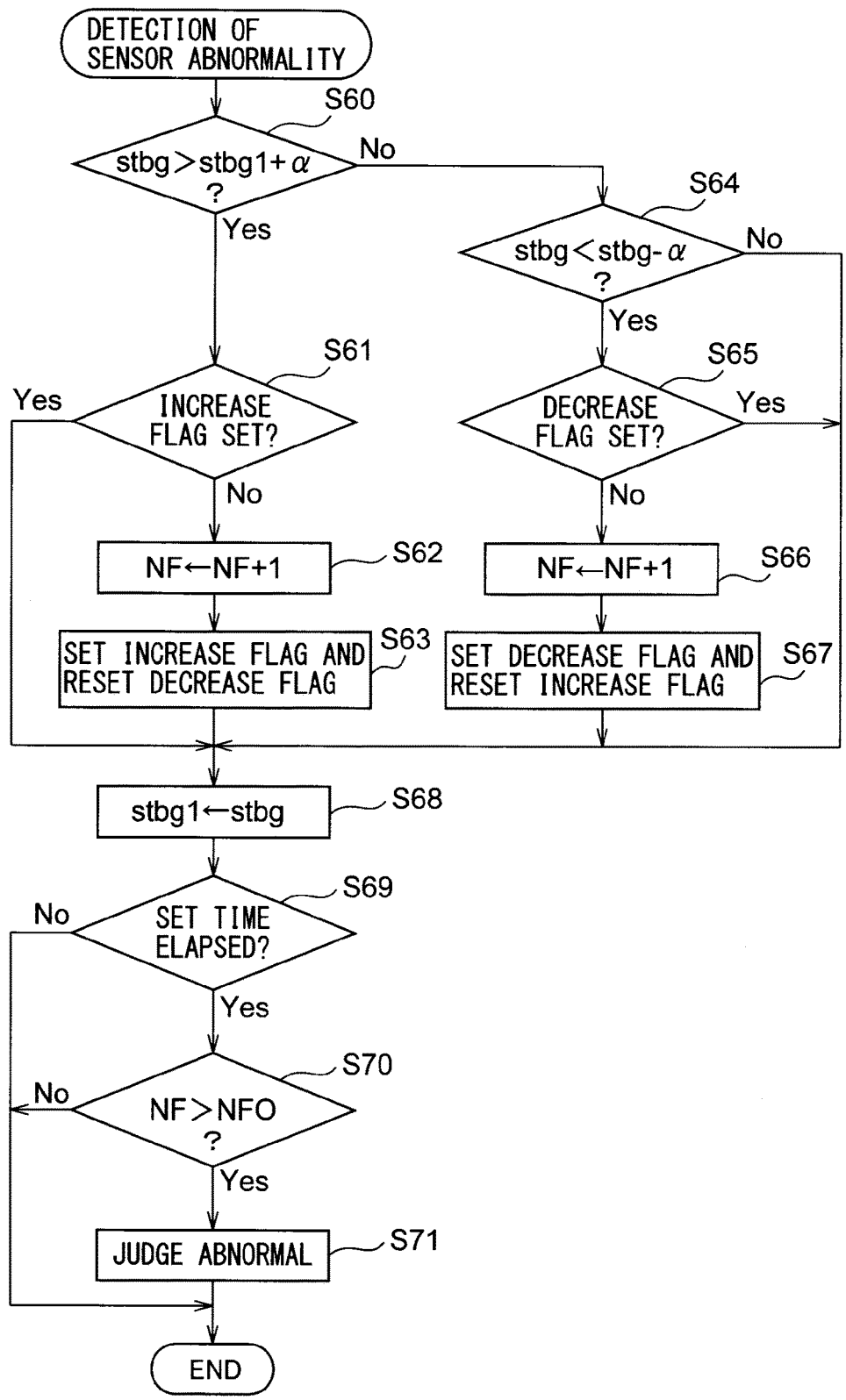
FIG. 22 is a flow chart which shows an abnormality detection routine of the downstream side air-fuel ratio sensor.

FIG. 22 shows a first embodiment of a routine for detection of an abnormality of an air-fuel ratio sensor. This routine is executed by interruption every certain time interval.

As shown in FIG. 22, first, at step S60, it is judged if the current learning value sfbg is larger than the value (sfbg1+α) acquired by adding a predetermined certain value α to the learning value sfbg1 at the time of the previous interruption. When the current learning value sfbg is not larger than (sfbg1+α), the routine proceeds to step S64 where it is judged if the current learning value sfbg is smaller than a value (sfbg1−α) acquired by subtracting a predetermined certain value α from the learning value sfbg1 at the time of the previous interruption. When the current learning value sfbg is not smaller than (sfbg1−α), the routine proceeds to step S68 where the learning value sfbg1 at the time of the previous interruption is set to the learning value sfbg1. Next, at step S69, it is judged if a preset set time has been exceeded from when the engine operation has been started. When the preset set time has not been exceeded from when the engine operation has been started, the processing cycle is ended.

On the other hand, when it is judged at step S60 that the current learning value sfbg is larger than (sfbg1+α), the routine proceeds to step S61 where it is judged if an increase flag, which indicates that the learning value sfbg has increased by a certain value α or more, is set. When the increase flag has not been set, the routine proceeds to step S62 where the count value NF is increased by exactly 1. Next, at step S63, the increase flag is set and a decrease flag which indicates that the learning value sfbg has decreased by a certain value α or more is reset. Next, the routine proceeds to step S68. When it is again judged at the next processing cycle that the current learning value sfbg is larger than (sfbg1+α), since the increase flag has been set, the routine jumps from step S61 to step S68. Therefore, at this time, the action of incrementing the count value NF is not performed.

That is, in the example shown in FIG. 22, even if the learning value sfbg continues increasing several times by (sfbg1+α) or more, the count value NF is incremented exactly by 1.

On the other hand, when it is judged at step S64 that the current learning value sfbg is smaller than (sfbg1−α), the routine proceeds to step S65 where it is judged if the decrease flag has been set. When the decrease flag is not set, the routine proceeds to step S66 where the count value NF is incremented by exactly 1. Next, at step S67, the decrease flag is set and the increase flag is reset. Next, the routine proceeds to step S68. When it is judged at the next processing cycle that the current learning value sfbg is smaller than (sfbg1−α), since the decrease flag has been set, the routine jumps from step S65 to step S68. Therefore, at this time, the action of incrementing the count value NF is not performed. That is, in the example shown in FIG. 22, even if the learning value sfbg continues to be decreased by (sfbg1−α) or more several times, the count value NF is only incremented by exactly 1.

When it is judged at step S69 that a preset set time has been exceeded from when the engine has started operating, the routine proceeds to step S70 where it is judged if the count value NF is larger than a predetermined count value NFO. When the count value NF is larger than the predetermined count value NFO, the routine proceeds to step S71 where it is judged that the downstream side air-fuel ratio sensor 41 is abnormal. Next, the processing cycle is ended.

Figure 23:
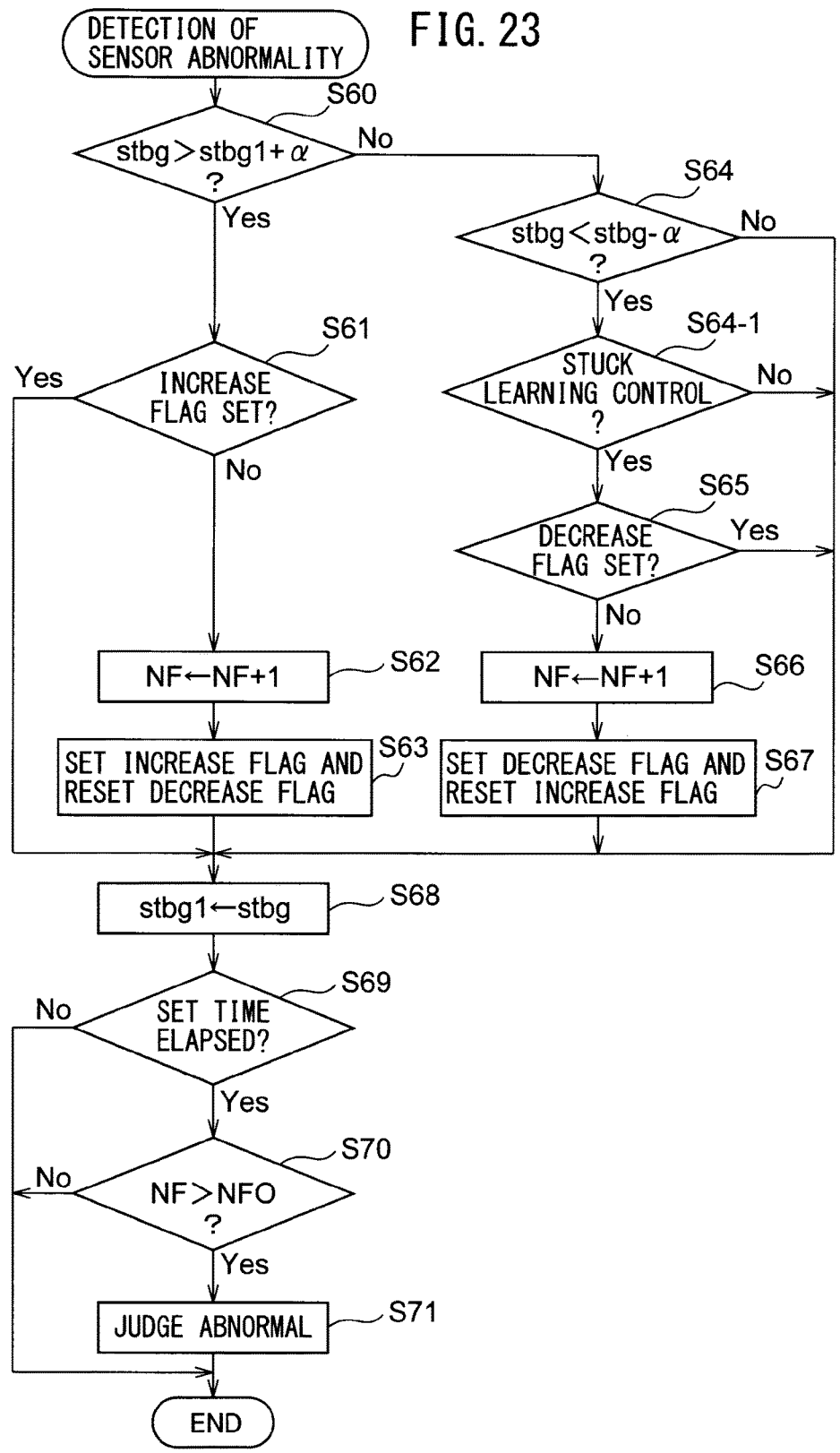
FIG. 23 is a flow chart which shows an abnormality detection routine of the downstream side air-fuel ratio sensor.

FIG. 23 shows a second embodiment of the routine for detection of an abnormality of the air-fuel ratio sensor. This routine is also executed by interruption every certain time interval.

The routine shown in FIG. 23, compared with the routine shown in FIG. 22, differs by just the addition of step S64-1. The other steps are the same as the corresponding steps of the routine shown in FIG. 22. Therefore, below, only the part which is related to this step S64-1 will be explained.

If referring to the routine shown in FIG. 23, when it is judged at step S64 that the current learning value sfbg is smaller than (sfbg1−α), the routine proceeds to step S64-1 where it is judged if stuck learning control has been performed. When stuck learning control is not being performed, the routine jumps to step S68. As opposed to this, when it is judged that stuck learning control has been performed, the routine proceeds to step S65 where it is judged if the decrease flag is set. When the decrease flag is not set, the routine proceeds to step S66 where the count value NF is incremented by exactly 1.

That is, in the example shown in FIG. 23, when the learning value sfbg is decreased by a certain value α or more by the stuck learning control, the count value NF is incremented by exactly 1, while when the learning value sfbg is decreased by a certain value α or more for some reason other than stuck learning control, the action of incrementing the count value NF is not performed. That is, as explained above, sometimes the learning value sfbg repeatedly increases and decreases so that the learning value sfbg does not easily converge. In this example, in such a case, to prevent the action of increasing the count value NF from being performed, the action of increasing the count value NF is performed only when a certain value or more of decrease of the learning value sfbg is performed by stuck control.

REFERENCE SIGNS LIST 1 engine body
5 combustion chamber
7 intake port
9 exhaust port
19 exhaust manifold
20 upstream side exhaust purification catalyst
24 upstream side exhaust purification catalyst
31 ECU
40 upstream side air-fuel ratio sensor
41 downstream side air-fuel ratio sensor

The invention claimed is:

1. A method of detecting an abnormality of an air-fuel ratio sensor, comprising:
   alternately switching a target air-fuel ratio of exhaust gas flowing into an exhaust purification catalyst which has an oxygen storage ability, between a rich set air-fuel ratio, which is richer than a stoichiometric air-fuel ratio, and a lean set air-fuel ratio, which is leaner than the stoichiometric air-fuel ratio;
   detecting the air-fuel ratio of the exhaust gas flowing out from the exhaust purification catalyst by a downstream side air-fuel ratio sensor which is arranged at a downstream side of the exhaust purification catalyst;
   learning an air-fuel ratio correction value which is required for making the air-fuel ratio of the exhaust gas flowing into the exhaust purification catalyst approach said target air-fuel ratio based on the air-fuel ratio which was detected by the downstream side air-fuel ratio sensor;
   controlling the air-fuel ratio of the exhaust gas flowing into the exhaust purification catalyst to the target air-fuel ratio by feedback control by using the learning value of the air-fuel ratio correction value which was obtained by learning;
   when the target air-fuel ratio is set to said rich set air-fuel ratio, if the air-fuel ratio detected by the downstream side air-fuel ratio sensor is maintained lean for a predetermined time period, performing stuck leaning control for lowering said learning value so as to make the air-fuel ratio of the exhaust gas flowing into the exhaust purification catalyst smaller;
   performing leaning value update control for making said learning value increase when it is judged that the air-fuel ratio of the exhaust gas flowing into the exhaust purification catalyst deviates from the target air-fuel ratio to the rich side, and making said learning value decrease when it is judged that the air-fuel ratio of the exhaust gas flowing into the exhaust purification catalyst deviates from the target air-fuel ratio to the lean side as learning value update control, based on the air-fuel ratio which was detected by the downstream side air-fuel ratio sensor; and
   judging the downstream side air-fuel ratio sensor is abnormal when a certain value or more of decrease of said learning value and a certain value or more of increase of said learning value are repeated.

2. The method of detecting an abnormality of an air-fuel ratio sensor according to claim 1, wherein when the air-fuel ratio detected by the downstream side air-fuel ratio sensor has become a predetermined lean judged air-fuel ratio or more, it is judged that the air-fuel ratio detected by the downstream side air-fuel ratio sensor has become lean, and wherein said stuck learning control makes said learning value decrease, if, when the target air-fuel ratio is set to said rich set air-fuel ratio, the air-fuel ratio detected by the downstream side air-fuel ratio sensor is maintained to said lean judged air-fuel ratio or more for a predetermined time period.

3. The method of detecting an abnormality of an air-fuel ratio sensor according to claim 2, wherein when the air-fuel ratio detected by the downstream side air-fuel ratio sensor has become a predetermined rich judged air-fuel ratio or less, it is judged that the air-fuel ratio detected by the downstream side air-fuel ratio sensor has become rich, and wherein said stuck learning control makes said learning value decrease so as to make the air-fuel ratio of the exhaust gas flowing into the exhaust purification catalyst smaller, even if, when the target air-fuel ratio is set to said rich set air-fuel ratio, the air-fuel ratio detected by the downstream side air-fuel ratio sensor is maintained between said rich judged air-fuel ratio and said lean judged air-fuel ratio for a predetermined time period.

4. The method of detecting an abnormality of an air-fuel ratio sensor according to claim 1, wherein when the air-fuel ratio detected by the downstream side air-fuel ratio sensor has become a predetermined rich judged air-fuel ratio or less, it is judged that the air-fuel ratio detected by the downstream side air-fuel ratio sensor has become rich, said target air-fuel ratio is switched to said lean air-fuel ratio when the air-fuel ratio detected by the downstream side air-fuel ratio sensor becomes said rich judged air-fuel ratio or less, and said target air-fuel ratio is switched to said rich set air-fuel ratio when the oxygen storage amount of the exhaust purification catalyst has become a predetermined switching reference storage amount, which is smaller than the maximum storable oxygen amount, or more, and said learning value update control is performed when the air-fuel ratio detected by the downstream side air-fuel ratio sensor becomes said rich judged air-fuel ratio or less.

5. The method of detecting an abnormality of an air-fuel ratio sensor according to claim 4, wherein when said target air-fuel ratio is lean, if the air-fuel ratio of the exhaust gas flowing into the exhaust purification catalyst is the target air-fuel ratio, the oxygen amount which is stored per unit time in the exhaust purification catalyst is cumulatively added as the oxygen excess/deficiency, and when said target air-fuel ratio is rich, if the air-fuel ratio of the exhaust gas flowing into the exhaust purification catalyst is the target air-fuel ratio, the oxygen amount which is released per unit time from the exhaust purification catalyst, is cumulatively added as the oxygen excess/deficiency, and wherein said learning value update control updates the learning value so that the difference between the cumulative value of the oxygen excess/deficiency which is cumulatively added from when the target air-fuel ratio is switched to the lean set air-fuel ratio to when the oxygen storage amount of the exhaust purification catalyst becomes said switching reference storage amount or more and the cumulative value of the cumulative oxygen excess/deficiency which is cumulatively added from when the target air-fuel ratio is switched to the rich set air-fuel ratio to when the air-fuel ratio detected by the downstream side air-fuel ratio sensor becomes the rich judged air-fuel ratio or less, becomes smaller.

6. The method of detecting an abnormality of an air-fuel ratio sensor according to claim 1, wherein when a certain value or more of decrease of said learning value and a certain value or more of increase of said learning value are repeated, it is judged the downstream side air-fuel ratio sensor is abnormal.

7. The method of detecting an abnormality of an air-fuel ratio sensor according to claim 1, wherein when a certain value or more of decrease of said learning value is performed by said stuck learning control, it is judged the downstream side air-fuel ratio sensor is abnormal.

* * * * *